(12) United States Patent
Gelerman

(10) Patent No.: US 8,762,233 B2
(45) Date of Patent: Jun. 24, 2014

(54) SINGLE OR MULTI-COMPANY BUSINESS ACCOUNTING SYSTEM AND METHOD FOR SAME INCLUDING ACCOUNT NUMBER MAINTENANCE

(75) Inventor: Roy H. Gelerman, Weston, CT (US)

(73) Assignee: Hantz Software, LLC, Southfield, MI (US)

(*) Notice: Subject to any disclaimer, the term of this patent is extended or adjusted under 35 U.S.C. 154(b) by 655 days.

(21) Appl. No.: 12/854,402

(22) Filed: Aug. 11, 2010

(65) Prior Publication Data

US 2010/0306088 A1  Dec. 2, 2010

Related U.S. Application Data

(63) Continuation-in-part of application No. 12/534,620, filed on Aug. 3, 2009.

(60) Provisional application No. 61/085,618, filed on Aug. 1, 2008.

(51) Int. Cl.
*G07B 17/00* (2006.01)
*G06Q 40/00* (2012.01)

(52) U.S. Cl.
USPC .............................................. 705/30; 705/35

(58) Field of Classification Search
None
See application file for complete search history.

(56) References Cited

U.S. PATENT DOCUMENTS

| | | | |
|---|---|---|---|
| 5,189,608 A | 2/1993 | Lyons et al. | |
| 5,678,046 A * | 10/1997 | Cahill et al. | 707/829 |
| 5,911,143 A | 6/1999 | Deinhart et al. | |
| 6,014,666 A | 1/2000 | Helland et al. | |
| 6,356,880 B1 | 3/2002 | Goossens et al. | |
| 6,397,195 B1 | 5/2002 | Pinard et al. | |
| 6,519,647 B1 | 2/2003 | Howard et al. | |
| 6,584,453 B1 | 6/2003 | Rahman et al. | |
| 6,684,382 B2 | 1/2004 | Liu | |
| 6,684,384 B1 | 1/2004 | Bickerton et al. | |
| 6,847,942 B1 | 1/2005 | Land et al. | |
| 7,181,420 B2 | 2/2007 | Gonen-Friedman et al. | |
| 7,206,768 B1 | 4/2007 | deGroeve et al. | |
| 7,233,918 B1 | 6/2007 | Ye et al. | |
| 7,236,950 B2 | 6/2007 | Savage et al. | |
| 7,243,334 B1 | 7/2007 | Berger et al. | |

(Continued)

OTHER PUBLICATIONS

USPTO Office Action for U.S. Appl. No. 12/534,475 dated May 16, 2011.

(Continued)

*Primary Examiner* — Asfand Sheikh
(74) *Attorney, Agent, or Firm* — Ingrassia Fisher & Lorenz, P.C.

(57) ABSTRACT

A computer implemented method for account number maintenance used within a single or multi-company accounting system is provided. The method comprises at a processor, performing the account number maintenance on at least one of a plurality of accounts. Each of the accounts has a plurality of account segments. Performing the account number maintenance includes at least one of i) renaming the account segment of at least one of the accounts; ii) changing a length the account segment of at least one of the accounts from a first defined length having a first number of characters to a new defined length having a second number of characters; iii) changing the account segment of at least one of the accounts; iv) merging two or more of the accounts into one of the accounts; and v) splitting one of the accounts into two different accounts.

9 Claims, 35 Drawing Sheets

(56) References Cited

U.S. PATENT DOCUMENTS

| | | | |
|---|---|---|---|
| 7,340,421 B1 | 3/2008 | Marcial et al. | |
| 7,546,633 B2 | 6/2009 | Garg et al. | |
| 7,599,865 B2 | 10/2009 | Hahn et al. | |
| 7,661,587 B1 * | 2/2010 | Mok et al. | 235/380 |
| 7,752,562 B2 | 7/2010 | Mohanty et al. | |
| 7,756,907 B2 | 7/2010 | Stolte et al. | |
| 7,783,591 B2 | 8/2010 | Long et al. | |
| 7,805,365 B1 | 9/2010 | Slavin et al. | |
| 7,822,654 B2 | 10/2010 | Block et al. | |
| 7,856,366 B2 | 12/2010 | Dettinger et al. | |
| 7,881,948 B2 | 2/2011 | Carr et al. | |
| 7,917,435 B2 * | 3/2011 | Hall et al. | 705/40 |
| 7,979,286 B2 | 7/2011 | Manning et al. | |
| 8,103,566 B1 | 1/2012 | Petruzzi | |
| 2001/0051902 A1 * | 12/2001 | Messner | 705/26 |
| 2003/0041076 A1 | 2/2003 | Lucovsky et al. | |
| 2003/0216984 A1 | 11/2003 | Wang | |
| 2004/0059651 A1 | 3/2004 | MaGuire, III et al. | |
| 2004/0088232 A1 | 5/2004 | Minnis, Jr. | |
| 2004/0199539 A1 | 10/2004 | Richardson et al. | |
| 2005/0038721 A1 | 2/2005 | Goeckel et al. | |
| 2005/0055289 A1 | 3/2005 | Mehldahl | |
| 2005/0278295 A1 | 12/2005 | Bernet et al. | |
| 2006/0059004 A1 * | 3/2006 | Ussery et al. | 705/1 |
| 2006/0190374 A1 * | 8/2006 | Sher | 705/35 |
| 2007/0136155 A1 | 6/2007 | Chape et al. | |
| 2008/0140620 A1 | 6/2008 | Bender | |
| 2008/0183714 A1 | 7/2008 | Nakhjiri | |
| 2009/0007229 A1 | 1/2009 | Stokes | |

OTHER PUBLICATIONS

USPTO Final Office Action for U.S. Appl. No. 12/534,515 dated May 12, 2011.

USPTO Final Office Action for U.S. Appl. No. 12/534,545 dated May 11, 2011.

USPTO Office Action for U.S. Appl. No. 12/534,582 dated Apr. 4, 2011.

USPTO Office Action for U.S. Appl. No. 12/534,620 dated Dec. 21, 2011.

USPTO Office Action for U.S. Appl. No. 12/534,460 dated Dec. 14, 2011.

USPTO Final Office Action for U.S. Appl. No. 12/534,475 dated Oct. 31, 2011.

USPTO Final Office Action for U.S. Appl. No. 12/534,582 dated Oct. 31, 2011.

* cited by examiner

| Type | Group Header | Accounts |
|---|---|---|
| Revenue | Commissions | 51000, 51001, 51002, 51003, 51004, 51005, 51006, 510 |
| Revenue | Investment & Advisory Fees | 51010, 51011, 51012, 51015, 51016, 51020, 51024, 510 |
| Revenue | Other Income | 51130, 51131 |
| Expense | COGS | 60000, 60002, 60005, 60006, 60007 |
| Expense | Employee Comp & Benefits | 61002, 61003, 61004, 61010, 61011, 61012, 61013, 610 |
| Expense | Contractors Expense | 61030, 61032 |
| Expense | Occupancy | 62000, 62001, 62010, 62020, 62030, 62040, 62050, 620 |
| Expense | Management Fees | 61001, 63160 |
| Expense | Communications & Data Processi | 63140, 63300, 63320, 63327, 63337, 63340 |
| Expense | Legal & Professional Fees | 63205, 63270, 63271 |
| Expense | Lease Expense, Repairs & Maint - Equipment, | 63000, 63013, 63015, 63016, 630 |
| Expense | Software Purchases, System Fees, | |
| Expense | I/C Technology Expense, Telephone | 51141, 51142, 51143, 51144, 51145, 511 |
| Expense | Related Company Expense | 75000, 75010, 75020, 75030, 75040, 75050, 75055, 750 |
| Expense | Operating Income | |
| Expense | Interest Income | 51120 |
| Expense | Interest Expenses | 63130 |
| Expense | Income/(Loss) before taxes | |
| Expense | UBG sub income/(loss) | 51297 |
| Expense | Income Taxes | 72000 |
| Expense | Net Income / Loss from Operatio | |

FIG. 31

SINGLE OR MULTI-COMPANY BUSINESS ACCOUNTING SYSTEM AND METHOD FOR SAME INCLUDING ACCOUNT NUMBER MAINTENANCE

CROSS REFERENCE TO RELATED APPLICATIONS

This application is related to and claims all available benefit of and priority to U.S. patent application Ser. No. 12/534,620 filed Aug. 3, 2009, which claims priority to provisional patent application 61/085,618 filed Aug. 1, 2008, the entire contents of which are herein incorporated by reference.

BACKGROUND OF THE INVENTION

1. Field of the Invention

The present invention relates generally to business methods and their corresponding systems, and more specifically, to a single or multi-company business accounting system configured for operating on a computer arrangement and corresponding methods of accounting for a single or multi-company business including account number maintenance.

2. Background

A multi-company business is a business that operates financially within several companies. The companies may be centralized or decentralized and geographically disbursed. In order to operate the multi-company business it is necessary to track money into and out of the consolidated group of companies.

Accountants generally enter information into modules within the accounting system. The main modules are Accounts Receivable (AR), Accounts Payable (AP), and Journals. AR and AP module data is moved to a sub system journal. The AR and AP sub system journals, and the entries made directly to the Journal module are posted to a General Ledger, described below.

Accounting systems track the flow of money within an organization. The Balance Sheet and the Income Statement are two main Financial Reports that the accounting system produces.

The Balance Sheet is a snapshot at one date for a company, or a list of companies. The equation for a Balance Sheet is as follows:

Assets=Liability+Owner Equity.

The Income Statement shows profitability between a starting date and an ending date. The equation for an Income Statement is as follows:

Revenue−Expenses=Income.

The Financial Reports are generated from data stored in the General Ledger (GL). The GL stores a line for each entry made to the system. Each GL line contains the GL Account, the amount of money stored as a Debit or a Credit, and a GL Date. Each GL Account defines:

Account Type—e.g., Asset, Liability, Owner Equity, Revenue, Expense;
Company Balancing Segment; and
Any number of Business Segments such as office, region, department, sales channel, and/or etc.

An Income Statement can be generated for any combination of Account Segment selections. For example, an Income Statement can be for an office, a region, or an office for a specific list of companies.

A Balance Sheet is generated using the Company Segment. The total activity for Assets, Liabilities, and owner Equity accounts will only balance for a company as a whole. The activity will not balance for the other segments, such as an office or region. For example, a company may purchase new furniture for multiple offices. The Bank Account is reduced (credited) one time for the cost of the furniture, each office has its Furniture Asset Account increased (debited) by the value of the furniture placed in that office. Another example is that Revenue and Expenses are usually tracked by office and other Business Segments, but the company only has one Bank Account and Retained Earnings Account.

Existing systems that claim to be multi-company mean that they share the customers and vendors. More advanced existing multi-company systems share one GL for storing the information, but they only allow a user to report on either one company at a time or all of the companies in the group or system as a consolidated whole.

The existing accounting systems force the accountant to manually enter the inter-company "Due To/Due From" entries to keep each company in balance. This is a huge burden, as nearly 30% of the accounting entries are inter-company balancing entries.

The existing accounting systems do not allow a single AR Invoice or AP Voucher to have accounts using different companies on the detail lines of the Invoice or Voucher. Moreover, providing various levels of secured access to different accountants and other users of the accounting system can be problematic especially for an accounting system configured for a multi-company group. Accordingly, further improvements and enhancements are needed for accounting methods and associated systems that can be used for a single or multi-company business.

SUMMARY OF THE INVENTION

In at least one embodiment of the present invention, a computer implemented method for account number maintenance used within a single or multi-company accounting system that operates on a computer arrangement and which is accessible by one or more persons defining an interface user is provided. The method comprises at a processor, performing the account number maintenance on at least one of a plurality of accounts within the single or multi-company accounting system. Each of the accounts has a plurality of account segments defining the account including a natural account segment, a company segment, and one or more business segments. The natural account segment defines a specific type of one of an asset, a liability, an owner equity, a revenue and an expense. The company segment is associated with one of one or more companies that is associated with the accounting system. The one or more business segments each has a definable category for tracking money within the accounting system. Performing the account number maintenance includes at least one of i) renaming the account segment of at least one of the accounts to define a renamed account segment; ii) changing a length the account segment of at least one of the accounts from a first defined length having a first number of characters to a new defined length having a second number of characters that is different than the first number of characters; iii) changing the account segment of at least one of the accounts; iv) merging two or more of the accounts into one of the accounts; and v) splitting one of the accounts into two different accounts that includes an old account and a new account.

In one aspect, the step of renaming the account segment includes renaming one of the natural account segment, the company segment, and the one or more business segments. If the natural account segment is renamed, then the single or multi-company accounting system allows the interface user to redefine the natural account segment to any one of the asset, liability, owner equity, revenue and expense specific types of accounts.

In another aspect, the step of renaming the account segment includes the single or multi-company accounting system automatically changing all of the account numbers for the associated accounts having the same value for the corresponding account segment by replacing the same value in the corresponding account segment with the value of the renamed account segment.

In one other aspect, the step of renaming the account segment includes the single or multi-company accounting system automatically checking that the value of the renamed account segment does not duplicate an existing value for the corresponding account segment.

In yet another aspect, the step of renaming the account segment does not change the general ledger.

In one aspect, the step of changing a length of one of the account segments includes the single or multi-company accounting system allowing the interface user to change the length of the account segment such that the second number of characters is less than the first number of characters. The single or multi-company accounting system automatically checks that the value of the renamed account segment does not duplicate an existing value for the corresponding account segment of the accounts and if so, then the single or multi-company accounting system blocks the interface user from changing the length to produce a duplicated value.

In one other aspect, the step of changing a length of one of the account segments includes the single or multi-company accounting system allowing the interface user to change the length of the account segment such that the second number of characters is greater than the first number of characters. The single or multi-company accounting system automatically adds default characters for characters added to the first number of characters to define the second number of characters.

In another aspect, the step of changing a length of one of the account segments does not change the general ledger.

In yet another aspect, the step of changing the account segment includes changing one of the natural account segment and the one or more business segments. The single or multi-company accounting system does not allow changes to the company segment.

In one other aspect, the single or multi-company accounting system automatically checks that a duplicate account to one of the existing accounts is not being created when the business segment is being changed and if so, then the single or multi-company accounting system blocks the interface user from changing the business segment.

In one aspect, the step of changing the account segment does not change the general ledger.

In one other aspect, the step of merging two or more of the accounts includes the interface user entering into the single or multi-company accounting system via the computer arrangement a first existing segment value to replace a second existing segment value of the natural account segments. The first existing segment value corresponds to a first plurality of accounts and the second segment value corresponds to a second plurality of accounts. The interface user enters into the single or multi-company accounting system via the computer arrangement a specified criteria for merging the accounts. The single or multi-company accounting system merges the second accounts in with the first accounts based on the specified criteria including replacing the second existing segment value for each of the second accounts with the first existing segment value of the natural account segment to define merged first accounts. The specified criteria comprising the natural account segment, the company segment, the one or more business segments, a time period, or a combination thereof.

In another aspect, the step of merging two or more of the accounts changes the general ledger.

In one other aspect, the step of merging two or more of the accounts includes the interface user entering into the single or multi-company accounting system via the computer arrangement a first existing segment value to replace a second existing segment value of a first business segment. The first existing segment value corresponds to a first plurality of accounts and the second segment value corresponds to a second plurality of accounts. The interface user enters into the single or multi-company accounting system via the computer arrangement a specified criteria for merging the accounts. The single or multi-company accounting system merges the second accounts in with the first accounts based on the specified criteria including replacing the second existing segment value for each of the second accounts with the first existing segment value of the first business segment to define merged first accounts. The specified criteria comprises the natural account segment, the company segment, the one or more business segments, a time period, or a combination thereof.

In yet another aspect, the step of splitting one of the accounts into two different accounts includes the interface user entering into the single or multi-company accounting system via the computer arrangement a new segment value to replace an old segment value of the natural account segment. The interface user entering into the single or multi-company accounting system via the computer arrangement a specified criteria for splitting the accounts. The single or multi-company accounting system converting the old account to a new account based on the specified criteria including replacing the old segment value for the old account with the new segment value of the natural account segment to define the new account. The specified criteria comprises the natural account segment, the company segment, the one or more business segments, a time period, or a combination thereof. If the specified criteria includes the time period, then prior to the time period specified the old account exists in the single or multi-company accounting system and for the time period specified the new account exists in the single or multi-company accounting system.

In one aspect, the step of splitting one of the accounts changes the general ledger.

In another aspect, the single or multi-company accounting system automatically creates the new account if the new account did not already exist.

In one other aspect, one of the business segments can be specified to merge at least one additional account into the new account.

In another aspect, the step of splitting one of the accounts into two different accounts includes the interface user entering into the single or multi-company accounting system via the computer arrangement a new segment value to replace an old segment value of a first business segment. The interface user enters into the single or multi-company accounting system via the computer arrangement a specified criteria for splitting the accounts. The single or multi-company accounting system converts the old account to a new account based on the specified criteria including replacing the old segment value for the old account with the new segment value of the first business segment to define the new account. The specified criteria comprises the natural account segment, the company segment, the one or more business segments, a time period, or a combination thereof. If the specified criteria includes the time period, then prior to the time period specified the old account exists in the single or multi-company accounting system and for the time period specified the new account exists in the single or multi-company accounting system.

In yet another aspect, the single or multi-company accounting system automatically creates the new account if the new account did not already exist.

In one aspect, a second business segment can be specified to merge at least one additional account into the new account.

In at least one other embodiment, a single or multi-company accounting system for providing a computer implemented method for account number maintenance and which is accessible by one or more persons defining an interface user is provided. The system comprises a computer arrangement operative to perform the account number maintenance on at least one of a plurality of accounts within the single or multi-company accounting system. Each of the accounts has a plurality of account segments defining the account including a natural account segment, a company segment, and one or more business segments. The natural account segment defines a specific type of one of an asset, a liability, an owner equity, a revenue and an expense. The company segment is associated with one of one or more companies associated with the accounting system. The one or more business segments each has a definable category for tracking money within the accounting system. Performing the account number maintenance includes at least one of i) renaming the account segment of at least one of the accounts to define a renamed account segment; ii) changing a length the account segment of at least one of the accounts from a first defined length having a first number of characters to a new defined length having a second number of characters that is different than the first number of characters; iii) changing the account segment of at least one of the accounts; iv) merging two or more of the accounts into one of the accounts; and v) splitting one of the accounts into two different accounts that includes an old account and a new account.

In at least one other embodiment, a computer-readable storage medium comprising a set of instructions for providing a computer implemented method for account number maintenance used within a single or multi-company accounting system which is accessible by one or more persons defining an interface user is provided. The set of instructions are to direct a processor to perform acts of performing the account number maintenance on at least one of a plurality of accounts within the single or multi-company accounting system, each of the accounts having a plurality of account segments defining the account including a natural account segment, a company segment, and one or more business segments. The natural account segment defines a specific type of one of an asset, a liability, an owner equity, a revenue and an expense. The company segment is associated with one of one or more companies associated with the accounting system. The one or more business segments each has a definable category for tracking money within the accounting system. Performing the account number maintenance includes at least one of i) renaming the account segment of at least one of the accounts to define a renamed account segment; ii) changing a length the account segment of at least one of the accounts from a first defined length having a first number of characters to a new defined length having a second number of characters that is different than the first number of characters; iii) changing the account segment of at least one of the accounts; iv) merging two or more of the accounts into one of the accounts; and v) splitting one of the accounts into two different accounts that includes an old account and a new account.

Further objects, features, and advantages of the present invention will become apparent from consideration of the following description and the appended claims when taken in connection with the accompanying drawings.

BRIEF DESCRIPTION OF THE DRAWINGS

FIG. 18 is a first screen shot of an example of the present invention;

FIG. 23 is a sixth screen shot of another example of the present invention;

FIG. 31 is a twelfth screen shot of an example of the present invention;

DETAILED DESCRIPTION OF THE INVENTION

Detailed embodiments of the present invention are disclosed herein. It is understood however, that the disclosed embodiments are merely exemplary of the invention, which may be embodied in various and alternative forms. The figures may be configured to show the details or highlights of a particular method and system and therefore, specific details disclosed herein are not to be interpreted as limiting but merely as a representative basis for the claims and for teaching one skilled in the art to practice the present invention.

Multi-Company Process Technical Overview

Figure 5A:
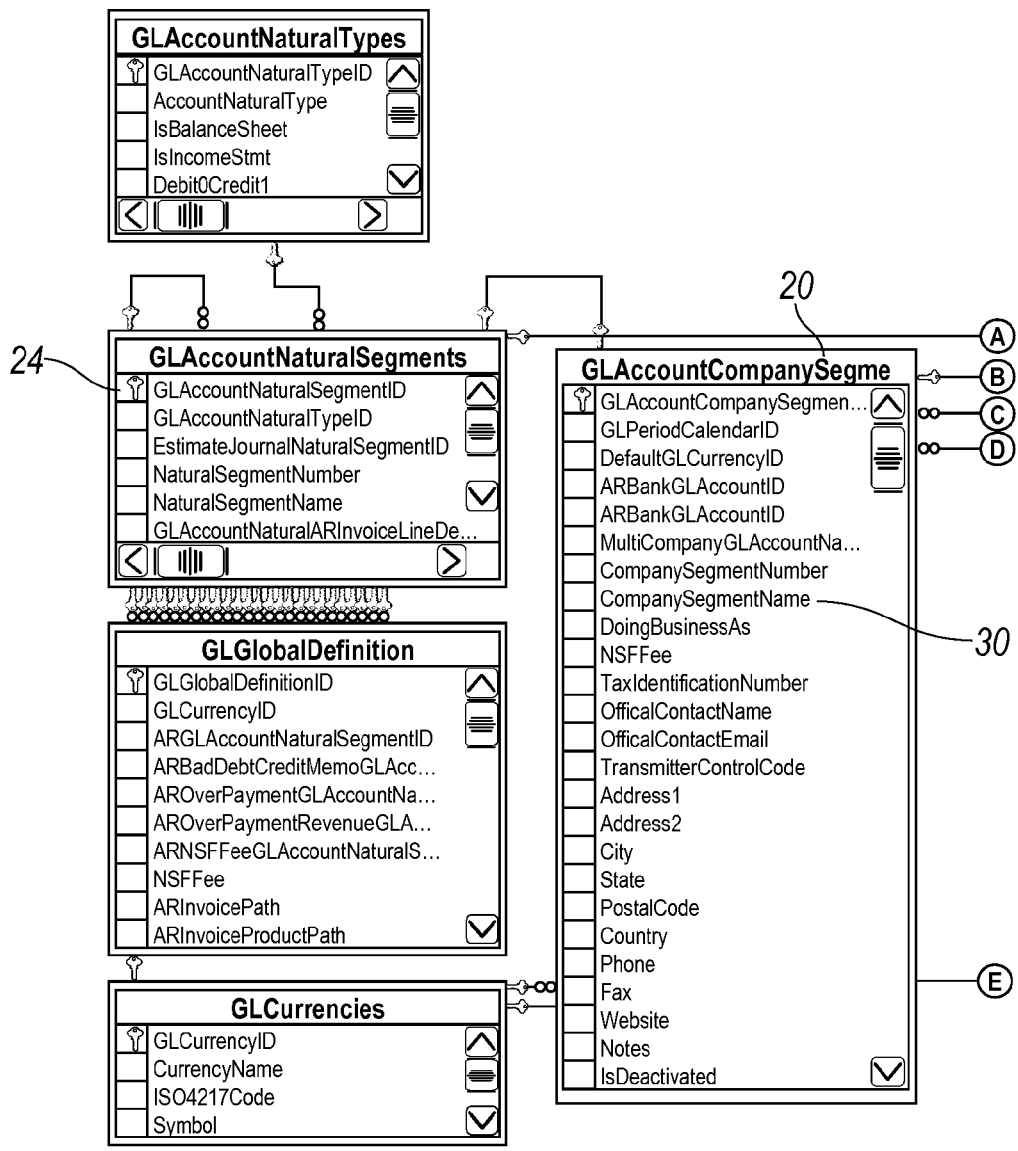
FIGS. 5a and 5b are an Entity-Relationship diagram in accordance with a embodiment of the present invention.
Figure 5B:
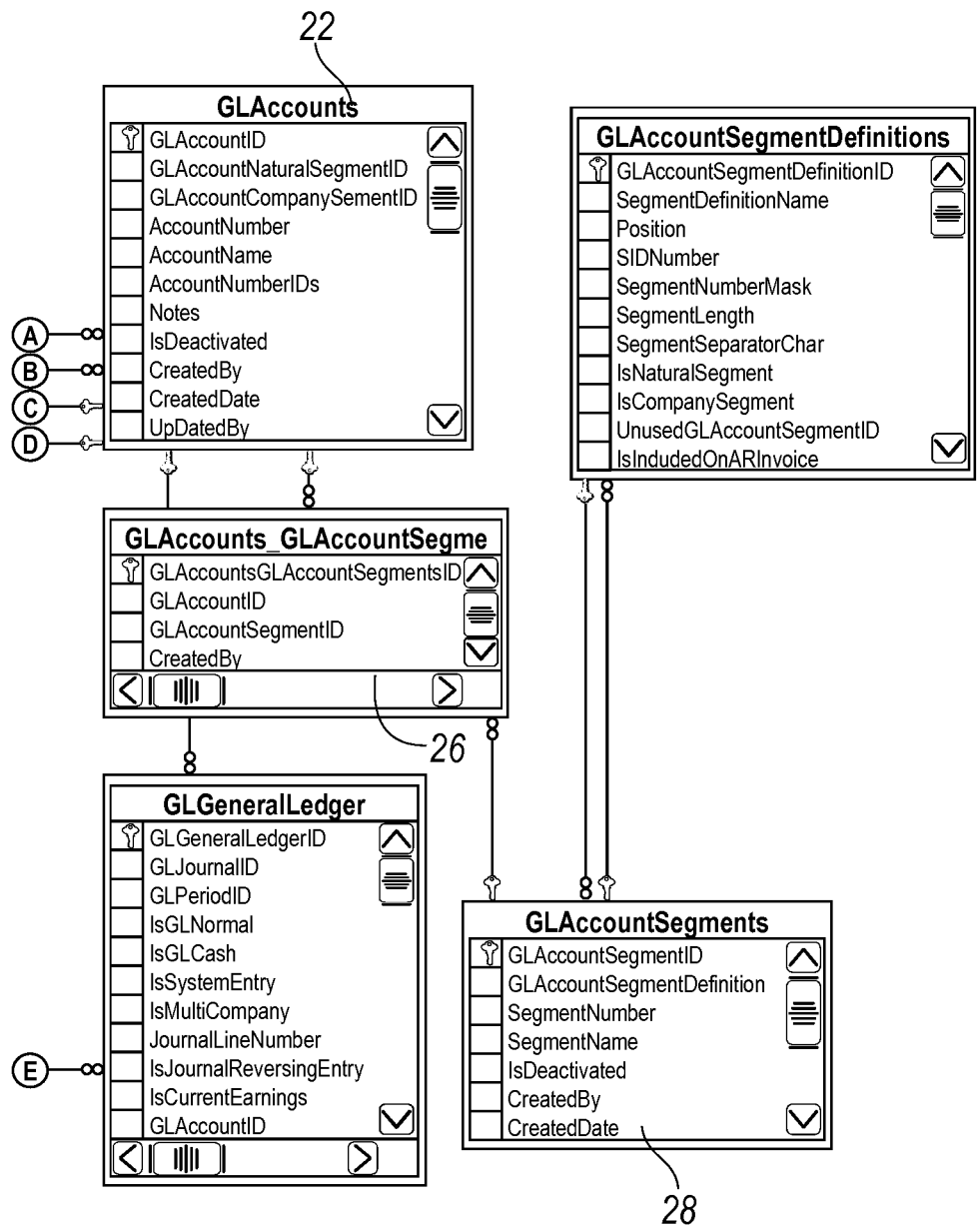

In at least one embodiment of the present invention and with reference to FIGS. 5a-5b, each company at 12 and 14 of a Multi-Company group at 16 is assigned a distinct Company Segment at 20 that identifies the particular company. Each account at 22 within the accounting system (e.g. Multi-Company accounting methods embedded in software or any other suitable form operating on a computer arrangement to define the system) is made up of a Natural Account Segment at 24, the Company Segment at 20 and any number of Business Segments at 26 and 28. The Natural Account Segment identifies the specific type of account as one of an Asset, Liability, Owner Equity, Revenue or Expense. The Business Segments are associated with a particular channel for tracking money flow, such as for example, an office, region, department, sales channel, and/or etc.

Each company of the Multi-Company group is also assigned a special Multi-Company Natural Account Segment at 30, which is a Natural Account Segment at 20 defining an Asset type account (or alternatively a Liability type account) and is used when "Due To/Due From" intercompany entries are needed. This special Multi-Company Natural Account Segment, combined with the Company Segment, allows a GL Account at 22 to belong to one company, while specifically referencing another company involved in a multi-company entry. A multi-company "Due To/Due From" entry relates both companies involved in a Multi-Company transaction. The Company Segment defines one of the companies, and the special Multi-Company Natural Segment defines the other.

For example, suppose the company under consideration is a national conglomerate company called National Financial Group (NFG). This parent group contains 3 companies, a Financial Services Company (with Company Segment—FIN), a Mortgage Company (with Company Segment—MRT), and a Tax preparation company (with Company Segment—TAX). The accounting system would have 4 companies defined with the following Multi-Company Natural Segments (MC segment):

1. National Financial Group (NFG) with MC segment 14010
2. Mortgage Company (MRT) with MC segment 14011
3. Financial Services Company (FIN) with MC segment 14012
4. Tax Preparation (TAX) with MC segment 14013

The group of companies may use an Accounting chart of accounts, having 5 digits for the Type of Account (e.g. Natural Account Segment), 3 alpha-numeric digits for the Company Segment, and uses a Business Segment for Office which is 3 characters representing the city where the office is located. The example company could have used any number of Business Segments, but in this example the Business Segment is being limited to just the city where the office is located.

The Natural Accounts Segments may use the convention of starting an Asset with a 1, a Liability with a 2, Owner Equity with a 3, Revenue with a 4, and Expense with a 5. For example, various Natural Account Segments may be defined as follows:

11000 is General Checking
11200 is Accounts Receivable
14010 is Multi-Company Due From To NFG
14011 is Multi-Company Due From To MRT
14012 is Multi-Company Due From To FIN
14013 is Multi-Company Due From To TAX
21200 is Accounts Payable
30300 is Current Earnings
30400 is Retained Earnings
41000 is Services revenue
51000 is Rent expense
52000 is Payroll expense.

The typical GL Accounts (e.g. Natural Account Segment-Company Account Segment-one or more Business Segments) may appear as:

11000-NFG-_ for General Checking-National Financial Group-No City
11000-MRT-_ for General Checking-Mortgage-No City
11200-MRT-_ for Accounts Receivable-Mortgage-No City
30300-MRT-_ for Current Earnings-Mortgage-No City
41000-MRT-NYC for Services Revenue-Mortgage-New York City
41000-MRT-DET for Services Revenue-Mortgage-Detroit. Any other suitable convention or arrangement of accounts may be substituted as well.

As shown above, each GL Account is made up of one Natural Account Segment, one Company Segment, and one Business Segment. Also, the Balance Sheet Accounts (e.g. Asset, Liability, or Owner Equity accounts) may use a Business Segment that uses a default value meaning no particular segment or unspecified.

Initially, no multi-company GL Accounts are assembled using the Special Multi-Company Natural Segments defined above. This is because a pair of companies may not have participated in a multi-company transaction. Each time a multi-company transaction (e.g. AP Voucher, AR Invoice, Journal, Check, Deposit, etc.) is entered, the system determines the need for balancing multi-company entries, and creates the pair of accounts (e.g. one account in each company) if they were not created already.

The system keeps track of the multi-company "Due To/Due From" using the Multi-Company matrix (represented below):

TABLE

Multi-Company Matrix:

| NFG | MRT | FIN | TAX |
|---|---|---|---|
|  | 0-MRT-_ | 14010-FIN-_ | 14010-TAX-_ |
| 14011-NFG-_ |  | 14011-FIN-_ | 14011-TAX-_ |
| 14012-NFG-_ | 2-MRT-_ |  | 14012-TAX-_ |
| 14013-NFG-_ | 3-MRT-_ | 14013-FIN-_ |  |

In one example, if an accountant wants to transfer $100.00 from General Checking for the Mortgage company to General Checking for the parent Group company, the accountant would enter into a Journal 32 only 2 entries:
Credit 11000-MRT-_ for $100 (reduces the MRT bank by 100)
Debit 11000-NFG-_ for $100 (increases NFG bank by 100).
The system will automatically notice that the accountant's entries require 2 multi-company lines to track the money, and to keep each of the companies in balance. The system will automatically add the following multi-company lines:
Debit 14010-MRT for $100 (means MRT is owed 100 by NFG)
Credit 14011-NFG for $100 (means NFG owes MRT 100).

Multi-Company Journal Details

Figure 4:
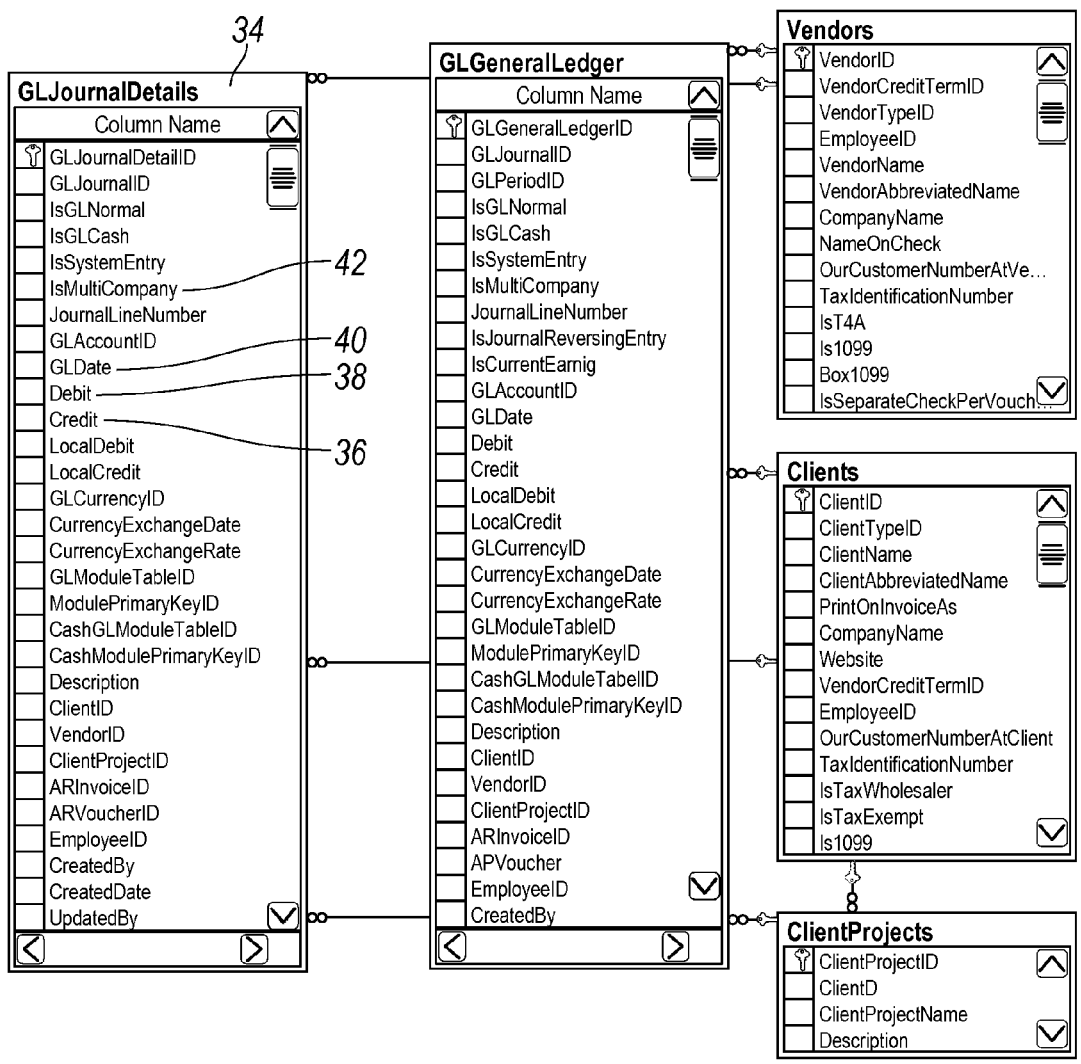
FIG. 4 is an Entity-Relationship diagram in accordance with another embodiment of the present invention.

Referring also to FIG. 4, journal entries at 34 are used by accountants for general purpose accounting entries. The detail lines of a Journal must be in balance meaning that the Debits=Credits at 36 and 38 by GL Date at 40.

In at least one embodiment of the present invention, each journal has one main company. If the detail lines contain accounts using different companies, the system will automatically generate a pair of multi-company lines. The system will sum the money on all of the detail lines, grouping the sum by company and GL Date. Added to the pair of multi-company lines will be each GL Date for each company. The multi-company pair is between the main company for the Journal, and one of the other companies associated with the detail lines.

Most Journals are single company, so the system may have a multi-company check box 42 allowing the accountant to limit the detail line account choices to the main company of the Journal.

An Example of Creating a New Journal

Figure 11:
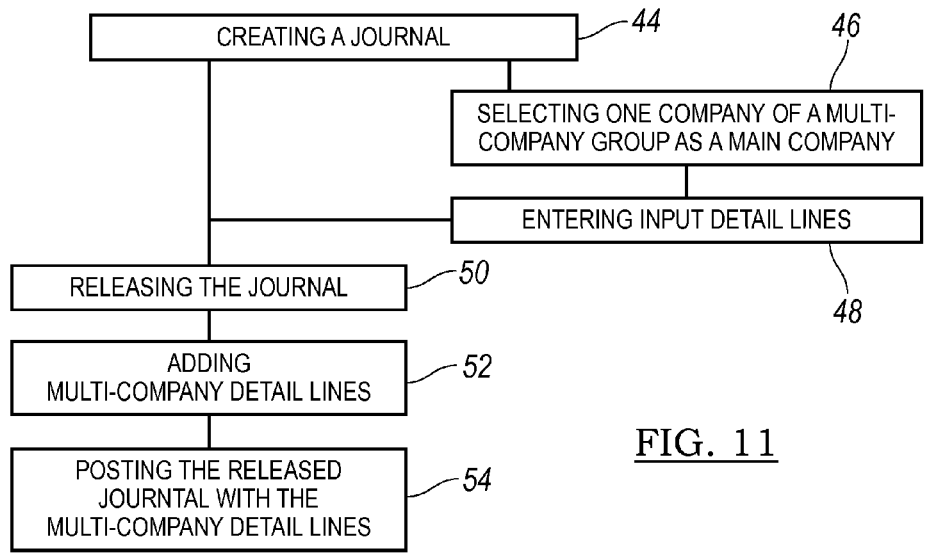
FIG. 11 is a flow chart of a method for creating a Journal using a multi-company accounting system in accordance with an example of the present invention.
Figure 12:
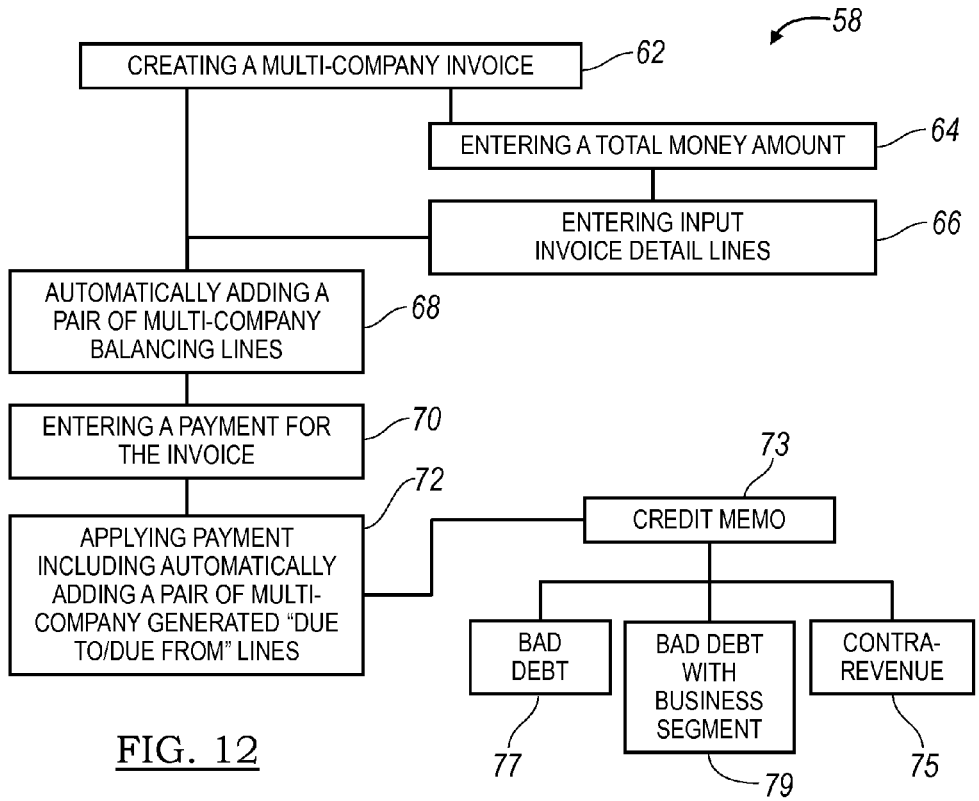
FIG. 12 is a flow chart of a method of Account Receivable using a multi-company accounting system in accordance with one example of the present invention.

Referring to FIG. 11, in one example the following steps are performed for creating a new Journal at 44:
1) The accountant selects a main company at 46 for the Journal.
2) The accountant selects a main GL Date for the detail lines of the Journal.
3) The accountant enters detail lines at 48 for the Journal. Each detail line has a GL Account, and a Debit and Credit Amount. Specific GL Dates can be entered for each of the detail lines, if the journal will specify more than one GL Date.

An Example of Saving a New Journal

The system in one example does the following steps for saving a new Journal comprising:
1) Check if a main company has been selected.
2) Check if a main GL Date has been selected.
3) Check if the Journal has already been released.
4) Check that each Detail Line has an account, and a Debit or Credit.
5) Check that the Journal has at least one detail line.
6) If the Journal is a special year end closing journal, then each detail line must be the same GL Date.
7) The system assigns the next available Journal Number to the Journal
8) The Journal data is saved to the database (e.g. maintained on the server of the computer arrangement) as a draft journal.
9) The journal may not be saved to the General Ledger until it is verified and posted. No multi-company checks or modifications are done at this time. This allows an accountant to save the work, and complete it at a later point in time. This also allows a junior accountant to enter the data for the Journal, then have a senior accountant review the Journal and post the Journal to the General Ledger.

An Example of Saving an Edited Journal

Saving an Edited Journal includes the same steps as Saving a New Journal illustrated above and includes the following additional steps:
1) Check if someone else has edited and saved the journal while it was being edited.
2) Check if someone else has deleted the journal while you were editing it.
3) Check if someone else released the journal while you were editing it.
4) Check if this is a special AR or AP sub system journal. If so, disallow changing money amounts.
5) If the journal has been released, disallow changing Debit and Credit amounts.
6) If the journal has been released, disallow adding or deleting detail lines.

An Example of Releasing a Journal

Releasing a Journal at 50 includes:
1) Check if someone else has already released the journal.
2) Check if the journal has already been posted to the General Ledger.
3) Validate the Journal

An Example of Validating a Journal

Validating a Journal includes at least one of general validations and balanced validations as outlined below.

General Validations

In one example, general validations includes:
1) Check that the Journal has detail rows.
2) Check that the Journal is released.
3) Check that the Journal is not already posted to the General Ledger.
4) Optionally check if the Journal is using any deactivated accounts.

5) Optionally check if the Journal is using the Accounts Receivable Account and is not an AR sub system journal. Accounts Receivable balances should be maintained by the AR sub system, using AR Invoices and AR Payments.
6) Optionally check if the Journal is using the Accounts Payable Account and is not an AP sub system journal. Accounts Payable balances should be maintained by the AP sub system, using AP Vouchers and AP Payments.
7) Optionally check if the Journal is directly using the Current Earnings or Retained Earnings Accounts. These accounts are supposed to be system generated by the summation of all past Revenue—all past Expense for each company.
8) Check if the Journal is using a GL Date in a closed period.

Balance Validations

In one example, balance validations includes:
1) Check that the total Debits=total Credits.
2) Check that the total Debits=total Credits for each GL Date in the Journal.
3) Check that no line uses an entry specifying money in an increment less than 1 cent.
4) If a Zero Balance Account is used, check that the summation of Debits=Credits by Natural Account Segment, by Company and by GL Date for the entries using the Zero Balance Natural Account. A Zero Balance Natural Account may be used to allocate money across Business Segments, such as across offices, while making sure that the total balance for the Natural Account within a company for a GL Date remains zero.

Add Multi-Company Entries before Posting the Journal

An example of the system automatically adding Multi-Company entries at 52 includes:
1) Delete any detail lines using the special Multi-Company Natural Accounts. If an accountant tries to enter these accounts manually, the manual entries may be deleted so that the system can guarantee that the multi-company accounts are exactly accurate and add to 0.00 across all companies.
2) Check that there are detail lines remaining after deleting the multi-company lines.
3) Validate the Journal again, doing all of the steps in Validating a Journal.
4) Count the distinct Company Segments used in the journal detail lines.
5) If every detail line in the Journal is for the same company, then:
   a) If the main company of the journal is a different company, then:
      I. Show the user an error that the Journal has detail lines for only one company, and the main company should be specified as the company that the detail lines use. It does not make sense to have a multi-company Journal if all the detail lines use the same company.
6) If there are exactly 2 distinct companies used in the journal detail lines, then:
   a) If the main company of the Journal is not one of the 2 companies used in the detail lines, then:
      I. Show the user an error that the Journal has detail lines for exactly 2 companies. The main company should be specified as one of the companies that the detail lines use.
      II. It may have been possible to change the main company to one of the companies used in the detail lines; however, an error is raised instead, letting the accountant know he may have made an error.
7) If there are more than 2 distinct companies used in the journal detail lines, then:
   a) Show the user an error if the main company for the journal is not one of the companies used in the detail lines.
8) The system creates the Multi Company Matrix (e.g. maintained on the server) for the companies used. The matrix (Table—Multi-Company Matrix shown above) is represented above as a table with the Special Multi-Company Natural Segments, and the empty diagonal gray boxes representing that a company does not do multi-company entries with itself.
   a) The matrix has each of the GL Account Company Segments used. Each cell represents the GL Account that is made from the Special Multi-Company Natural Segment, the Company Segment, and a default (e.g. usually underscores or zeros) value for each of the business segments defined. This means the multi-company Due To/Due From accounts do not try to capture intra-company activity at the business segment level, such as region, office, city, etc., because the Multi-Company accounts are Balance Sheet accounts.
   b) Sum the Debits—Credits by Company Segment and GL Date for the Journal Detail lines that do not use the main Company Segment of the Journal.
   c) If the Multi-Company account is not already in the Multi-Company Matrix (the system has not seen this company pair used before), then:
      I. The system creates two new Multi-Company accounts using both combinations of the Special Multi-Company Natural Segment for one company, and the Company Segment of the other company, and uses the default business segment (usually zeros or underscores) for each of the Business Segments defined.
   d) For each sum of Debits—Credits by Company and GL Date that is not 0.00, then the system will add two new lines to the Journal details using the Multi-Company Matrix accounts. The two new lines will keep in balance that Company A (e.g. hypothetically part of a multi-company group including Company A and Company B) is owed money by Company B, and Company B owes money to Company A. The two new rows will also be marked with a special flag called IsMultiCompany that indicates that these rows are system generated multi-company rows.
9) Validate the Journal one more time doing all of the steps defined above in Validating a Journal.
10) If new Multi-Company Matrix accounts were created, update the security model (described later in detail) to allow the user to see the Multi-Company Matrix accounts.

An Example of Posting the Journal to the General Ledger

Figure 6:
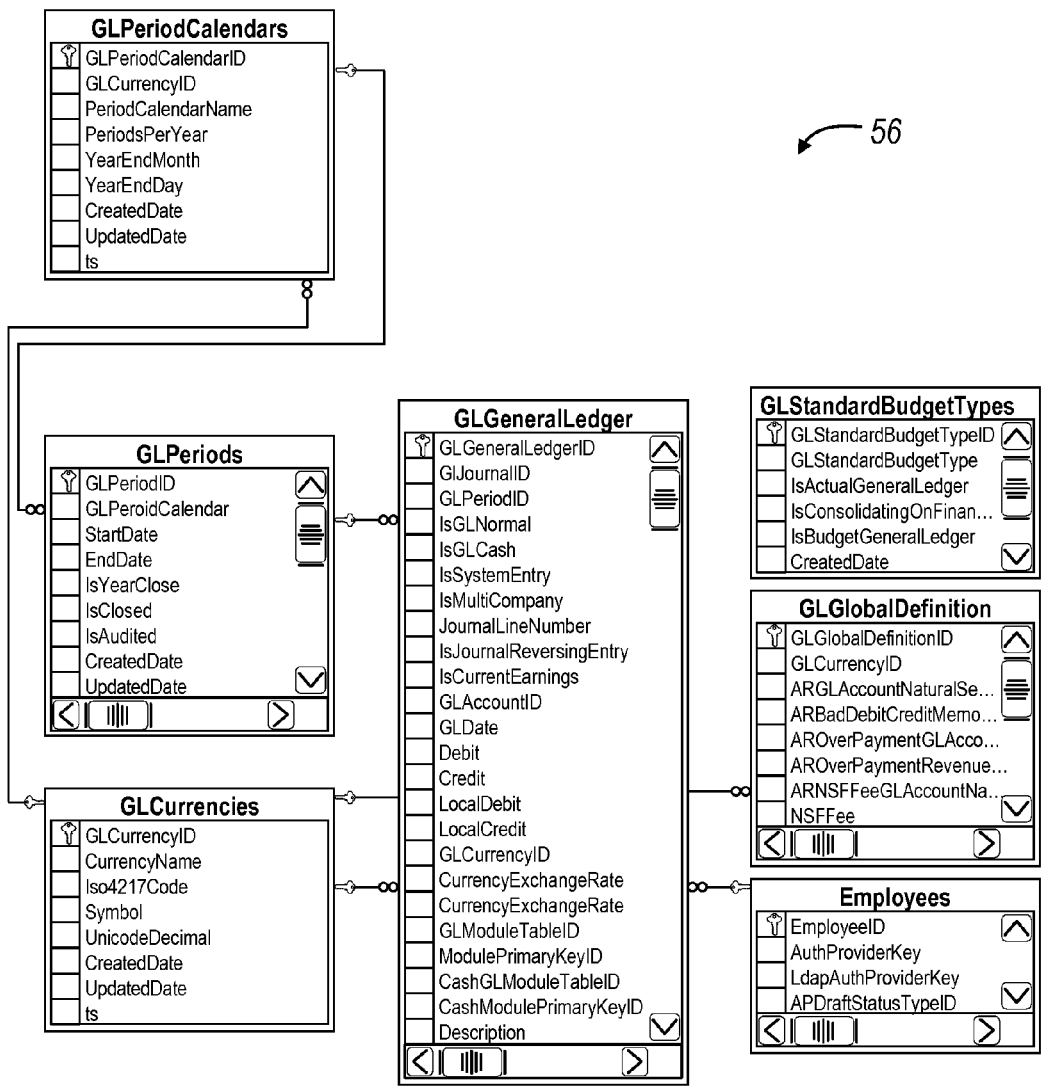
FIG. 6 is an Entity-Relationship diagram in accordance with another embodiment of the present invention.

Referring also to FIG. 6, an example of posting the Journal at 54 comprising:

1) Write the Journal detail lines to the General Ledger at 56.
2) Update the Journal to mark it as posted. Record who posted it, and when it was posted.
3) Delete the Journal detail Lines. They are no longer needed because the data is now in the General Ledger.

AR Module

With reference to FIGS. 1, 3a-3b, and 12 in at least one embodiment of the present invention, the Accounts Receivable (AR) Module at 58 differs from the Journals because the AR and Accounts Payable (AP) modules at 60 track Accrual and Cash separately and also keep track of Account Receivable and Accounts Payable before the invoice or voucher is paid. The AR Invoices 61 keep track of the multi-company entries, but they do it using a different approach than Journals. Because the Invoices are not yet paid, for normal Accrual accounting, it is much more accurate and useful to keep the multi-company entries using the Natural Account Segment, which in this embodiment is the Accounts Receivable account, for each company. When an Invoice gets paid, the Accounts Receivable accounts are brought back to zero, the check is deposited to one of the company's bank accounts, and the system then uses the Multi-Company Matrix "Due To/Due From" accounts to track the entries and keep each company in balance. For cash accounting, no "Due To/Due From" entry is made when the invoice is created. When the Invoice is paid, the check goes to un-deposited funds and then to the bank. Instead of bringing Accounts Receivable back to zero, the money may be proportionally applied to the accounts that were used on the Invoice details. If the Invoice was a multi-company invoice, and it is short paid by the client, the system allows you to proportionally apply the payment to all companies involved on the invoice, or optionally to pay specific amounts of money for each company.

For example, if a $1000 invoice is issued to a client with $600 for company A and $400 for company B, the client may say he liked the work done by company A but was disappointed in the work done by Company B, so he only pays $900, which short pays the Invoice by $100. In this example, the accountant would apply $600 of the payment to the invoice for Company A and $300 for Company B. The Multi-Company pair of rows would be written both for Accrual and Cash saying that Company B is owed $300 by Company A (assuming the $900 check was deposited to Company A) and Company A owes $300 to Company B. The Invoice would show an outstanding balance of $100. When the accountant does a Credit Memo for Bad Debt for $100 for the invoice, the system recognizes that Company A was fully paid, and Company B has to absorb the entire $100 Bad Debt expense. The system will keep track how much money the accountant says belongs to each company. If the accountant tried to apply $700 to Company A and $200 to Company B, the system would raise an error saying that Company A only had $600 worth of Invoice details, so the maximum that can be applied to Company A is $600.

AR for Typical Multi-Company Accounting Systems

Existing systems that claim to be multi-company share their customers. This means each company must send a separate invoice to a common client. However, these systems do not allow Multiple Company detail lines (usually revenue type detail lines) on a single Invoice.

Examples of AR Multi Company Strategies

Four possible AR Multi-Company strategies are as follows:

1) Force the accountant to manually enter the Multi-Company rows for an Invoice.
2) Do not enter Multi-Company rows for an Invoice. When the AR information is sub system journaled, add aggregate Multi-Company rows to balance the sub system journal.
3) Add Multi-Company "Due To/Due From" entries to each invoice.
4) Track Multi-Company data at the Accounts Receivable level for normal Accrual accounting before the Invoice is paid. Use "Due To/Due From" accounts when the Invoice is paid. For the cash General Ledger, do nothing before the Invoice is paid. Proportionally apply the payments to the invoice detail company revenue accounts when the invoice is paid. Use "Due To/Due From" accounts to balance the books when a customer check is recorded to undeposited funds of one of the company's bank accounts.

In at least one embodiment of the present invention, the system and method employ the concept disclosed in the foregoing fourth strategy, which is preferably the most comprehensive. It is also believed to be advantageous for the accountants. The detailed explanation that follows will review at least one embodiment in accordance with the present invention.

AR Multi-Company Detail Process

Some examples of Multi-Company processing work are sub system journaling Invoices, receiving payments for Invoices, and creating credit memos for Invoices. AR activity such as creation of Invoices, applying payments to Invoices, credit memos, and deposit slips are done in the AR module. The AR module ensures that the Debits and Credits for each entry are in balance. The AR module does not handle the Multi-Company processing balancing issues, but it does allow Multi-Company detail lines to be on an Invoice, and it does allow a check paid to a Multi-Company Invoice to have its company amounts specified, or proportionally applied. All AR activity is written to the General Ledger. AR activity is sub-system journaled, and the Journal is posted to the General Ledger. The sub system journal does its own checks for out of balance conditions, and also does the Multi-Company business processing for balancing.

AR Module Multi-Company AR Invoice Creation

Figure 8:
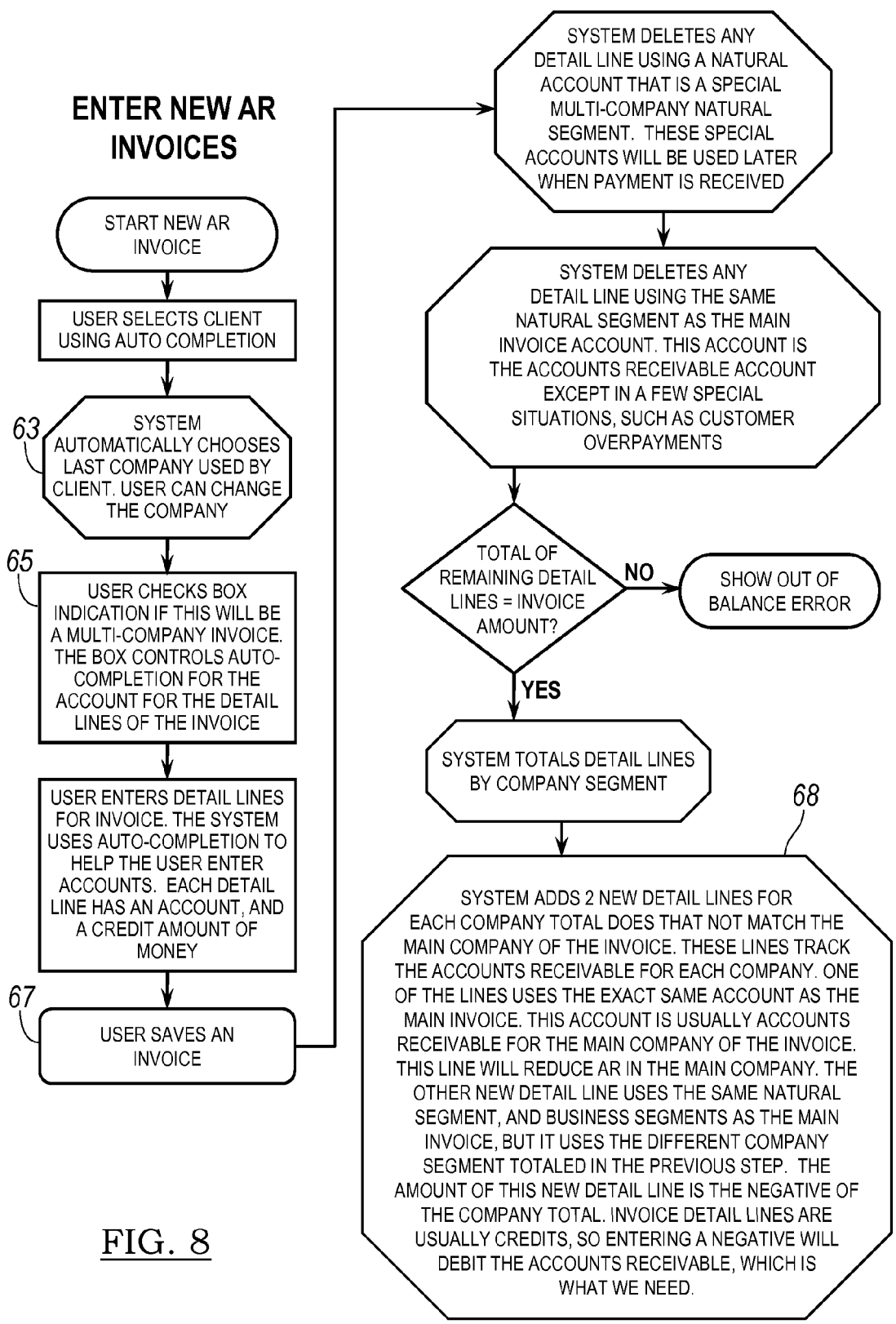
FIG. 8 is a flow chart of a method for generating Account Receivable invoices in accordance with an example of the present invention.

With reference also to FIG. 8 in at least one embodiment of the present invention, the accountant chooses a client address for creating the invoice at 62. The system searches for the most recent Invoice entered for that client address. If no Invoices are found for that client address, the system chooses the most recent invoice at 63 for that client (a client may have more than one address). If an Invoice is found, the main company of the existing Invoice is used as the default for the new invoice. When the company is changed, the system chooses the Accounts Receivable account for that company as the main Accounts Receivable for the invoice. If this is a Multi-Company Invoice at 65, each company will track its own Accounts Receivable using system generated multi-company detail lines. The detail lines will be added in pairs using negative (Credit) Accounts Receivable for the main company, and positive (Debit) Accounts Receivable lines for the other company.

The accountant enters an Invoice total at 64, any discount terms, and then enters Invoice detail lines at 66. Discount terms are optional. For example, the Invoice may offer a 2% discount if paid within 10 days, with the balance due in full in 30 days. This is called "2 ten net 30". The system supports multiple discounts, with each discount described as a percent or a specific amount of money. Each detail line has a GL Account (usually a Revenue GL Account with full business segmentation defined), a Credit amount of money (Credits are positive for Revenue), and optionally a description and other attributes such as tying the detail line to a specific client project or employee, or a pass through revenue. Pass through revenue is used if this work will be done by an outside vendor that must get paid when the Invoice payment is received.

Saving and/or Editing an Invoice

In at least one embodiment of the present invention, the system performs the following steps for saving and/or editing an invoice at 67:
1) Checks if a main company has been selected for the invoice.
2) Checks if an Invoice total has been entered.
3) Checks if the user entered at least one detail line.
4) Checks if all detail lines have a GL Account and a money amount.
5) Checks if all optionally entered discounts have a discount date and amount.
6) Checks if the sum of detail lines adds to the Invoice total.
7) Checks if an Invoice description has been entered.

Each invoice detail line may be taxable, either at the state level, or at the Federal level if Federal Excise Tax ("FET") is used. Each company has a setup option indicating if it collects sales tax. The Sales Tax and Federal Excise Tax Natural Account Segments are globally set up for all companies in the system. Each company has its own tax GL Accounts made up of the Sales Tax or Federal Excise Tax Natural Segment, and its own Company Segment.

The system will add up the taxable detail lines for each company and add new aggregate system generated detail lines to the Invoice for the correct tax amount. One line will be added for each company's State or FET tax as needed. The State tax can be calculated using either State Tax Rates, or County Tax Rates based on the State of the client address used for the invoice.

The following additional steps may be performed for saving and/or editing an invoice:
8) If Editing an Invoice, check that no other accountant changed the data while the accountant was editing the invoice. Another accountant may have added, edited or deleted information on the same invoice.
9) If Editing an Invoice, the Invoice may have already been "released". If it has been released, the accountant cannot change accounting data that would affect the General Ledger. This includes:
    a) Check if the main Debit account of the Invoice has changed.
    b) Check if the Invoice Total has changed.
    c) Check if any detail line total has changed.
    d) Check if any detail line has been deleted or added.
    e) Check if any account has changed on a detail line.
10) Check if the accountant is entering a possible duplicate invoice. Check the invoice amount and PO number. If it is a possible duplicate number, warn the accountant and let the accountant specify if the system should continue to save the invoiced.

In this embodiment, the safety checks of an Invoice are done. However, it may be possible that the accountant changed the main company for the invoice. Thus, the following additional steps may be performed for saving and/or editing the Invoice:
11) Get the Natural Account Segment and Company Segment for the main account of the Invoice. This is usually the Accounts Receivable Account for the main company of the Invoice. This account will be used for the Debit to the General Ledger for the Invoice total.
12) If editing an Invoice, the accountant may have changed the main company. If the main company has changed, a new invoice number will be needed. Each company maintains a sequential list of invoice numbers. The invoice number also includes the Company Segment as part of the number.
13) If this is a new invoice, then a new invoice number is needed.
14) If a new invoice number is needed, then use the next AR Invoice Number for the main company of the Invoice. Each company stores its own invoice number sequence counter for generating an Invoice Number.
15) Save the Invoice to the database.

No Multi-Company processing has taken place yet. The Invoice is saved with detail lines that may span multiple companies. At this point, the Invoice is only in the AR sub system. It is not in the General Ledger. In this example, the system will handle Multi-Company processing when the Invoice is sub system journaled. However, in other examples, some of the Multi-Company processing (e.g. adding Multi-Company balancing lines) may be handled during saving, releasing or posting the AR journal.

Sub System Journal AR Invoices

In at least one embodiment of the present invention, all AR activity, such as for example Invoices, Credit Memos, Received Checks, Deposits, happen in the AR sub system of the accounting database. The AR sub system is not in the General Ledger. Financial reports, such as the Balance Sheet and the Income Statement come from the General Ledger (GL). The GL is only populated from Journals, by "posting" Journals to the GL. AR activity is sub-system journaled so the Journal can be posted to the General Ledger. The sub system journal process also adds the Multi-Company balancing lines at 68. It will add pairs of Accounts Receivable lines to the Invoice Details, to keep each company Accounts Receivable in balance. When the Invoice is paid at 70, the system will use the Multi-Company matrix to add pairs of Multi-Company "Due To/Due From" lines at 72 to the check payments for example. This is because the check gets deposited to the main company of the Invoice, but some of the Revenue may come from the other companies.

Examples of AR Sub System General Accounting Entries

The following are some examples of the AR sub system general accounting entries and/or results:
The AR Invoices (many side ARInvoiceDetails)
Accrual GL—increase Accounts Receivable, increase Revenue.
Cash GL—nothing.
AR Invoice Checks (many side ARInvoicePayments).
Accrual GL—increase undeposited funds, reduce Accounts Receivable.
Cash GL—increase undeposited funds, increase revenue.
AR Invoice Check Deposits (many side ARInvoiceChecks).

Accrual GL and Cash GL—increase bank, reduce undeposited funds.

Multi-Company AR Invoices are handled by the sub system journal by adding new rows to the AR Invoice Details. The new rows have the same Natural Segment as the one side of the Invoice (e.g. main account of the Invoice—usually Accounts Receivable) and the Company Segment as needed to keep Accounts Receivable in balance at all times. There is no need to have "Due To/Due From" entries at this point, because money has not yet come in. The system will use the Multi-Company matrix as needed for AR Invoice Checks. If this is the first time a Multi-Company entry is being made between the two companies, the system will add two new entries to the Multi-Company matrix.

AR Sub System Journal Detail Process

In at least one embodiment of the present invention, the system first identifies the exact AR entries that will be sub system journaled. The system decides what entries to use based on:
1) AR entries that have not already been sub system journaled.
2) AR entries that are released.
3) AR entries that the accountant can see given his security.
4) AR entries with a GL Date in a date range entered by the accountant.
5) AR entries using the main company in a list of companies specified by the accountant.

A logical blank Multi-Company Matrix is created. The matrix holds a GLAccountID, a CompanyID for the Account, and the matrix (other) CompanyID for the Account. The matrix will be filled as needed. If the needed Multi-Company accounts do not exist (this pair of companies had not previously been used in the system in an AR or AP or Journal entry), the Multi-Company accounts will be created.

Typical sub system journals are done once for each day (GL Date). When converting data, a sub system journal may be done for each year. In this case, the system will process one month at a time. This greatly increases the speed of the processing.

Journal numbers are typically globally unique across all companies. This means each company does not have its own set of Journal numbers. This is different from Invoices, where each company does have its own set of invoice numbers. The system gets the next journal number to be used for this sub system journal. A Journal has a main company, which can be used for searching. A sub system journal may span multiple companies. The system chooses the main company for the journal based on the main company of one of the sub system entries (Invoice, Check, and Deposit). This main company for the sub system journal will not be used in the Multi-Company entries added to each Invoice or Check payment.

A transaction is started, and the AR module entries to be processed are marked. This is done to protect the data if multiple accountants try to create sub system journals at the exact same time.

The system checks if any entry is in a closed period. Generally accepted accounting procedures dictate that accountants close past periods, such as a month or a year. In this example, the system will not allow changes in closed periods.

The system processes each AR module entry one at a time.

Sub System Process AR Invoices

In at least one embodiment of the present invention, the following steps are for the sub system process of AR Invoices:

1) Get the main Natural Segment (usually Accounts Receivable), Company Segment, and Invoice Amount for the invoice
2) Check that the sum of the invoice details matches the invoice amount
3) Check that the detail lines do not use one of the accounts in the Multi-Company matrix. The GL entries using the Multi-Company matrix accounts are all system generated. This ensures that the sum of activity for all Multi-Company matrix accounts will balance by summing to zero.
4) Check that the detail lines are not using the Current Earnings or Retained Earnings accounts. The system ensures that the Current and Retained earnings will always add up to exactly the sum of the Revenue minus Expense accounts for all time.

Sub System Process AR Invoices

Main Multi-Company Processing for Accrual General Ledger

In at least one embodiment, if any detail line is using a company that is different from the main company of the Invoice, then this is a Multi-Company Invoice. A pair of rows is added to the Invoice detail to keep the monies in balance. The pair will use the same Natural Segment of the main account of the invoice (usually Accounts Receivable) and the total of the detail lines for the other company other than the main company of the invoice. One of the lines will have the positive amount, and the other of the lines will have the negative amount (same amount but negative).

Figure 14:
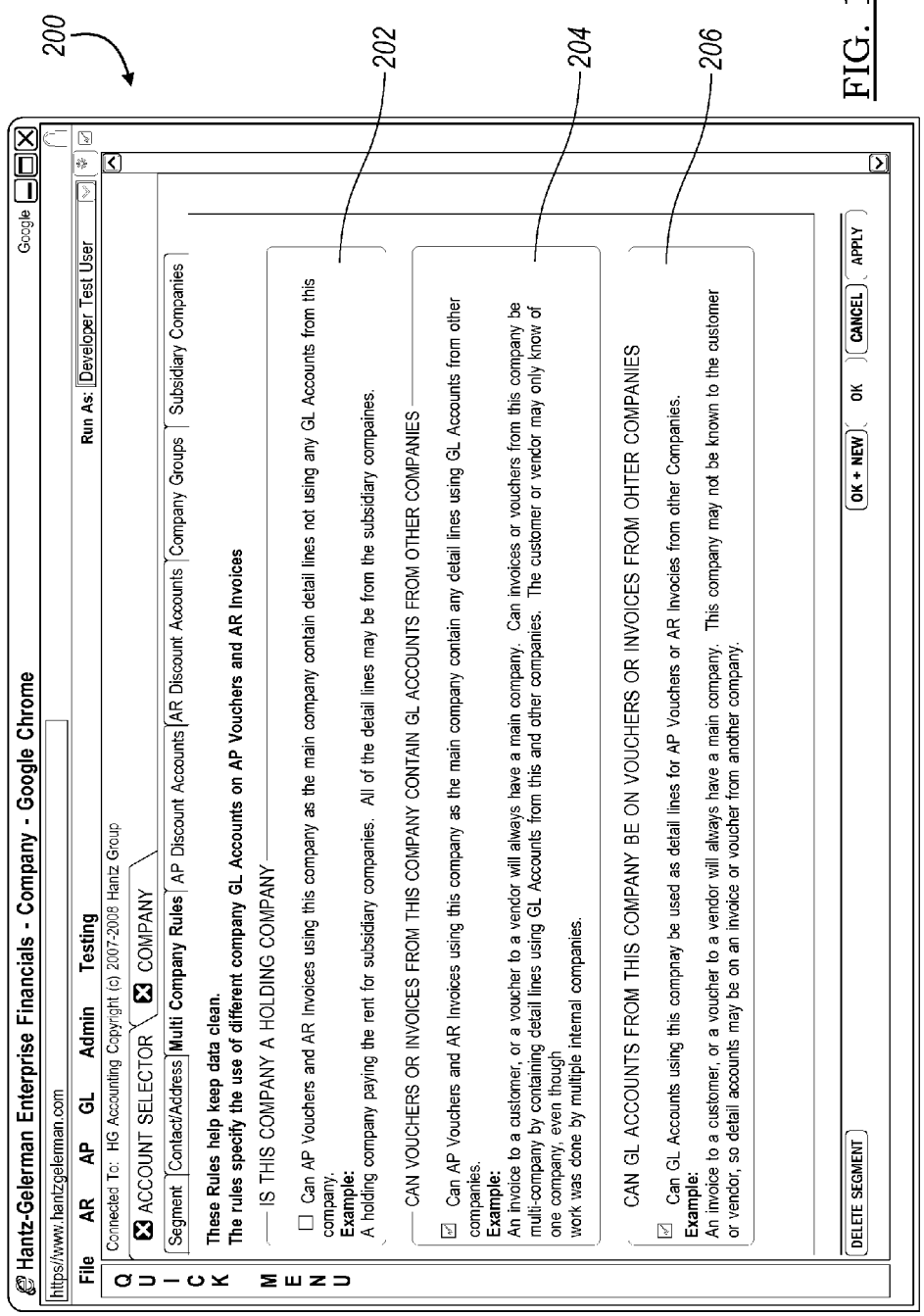
FIG. 14 is a set of rules for Account Receivable and Account Payable in accordance with one example of the present invention.

With reference also to FIG. 14, if the Invoice is Multi-Company, then system checks that the companies on the detail lines of the Invoice are allowed to be on a Multi-Company Invoice. The system allows an administrator to set rules at 200 at the company level to determine if a company is allowed to be part of a Multi-Company Invoice. Another rule that can be set at the company level is if the company can be the main company of a Multi-Company Invoice. Yet another rule that can be set is if the company is a holding company, and can be the main company of a Multi-Company invoice and not use any of its own accounts in the details of the invoice. This could be a holding company sending one Invoice to a client for work done by subsidiary companies. These rules can also apply to the Account Payable side with respect to vouchers.

These entries are for the normal Accrual General Ledger. Typically, accounting systems track data based on the normal accrual system. This means recognizing Revenue when the Invoice is sent out, not when it is paid. The present invention may also tracks a Cash General Ledger. No entries are made to the Cash GL when an invoice is created and posted. The Cash GL entries will be made when the invoice is paid. In one embodiment, the following steps are performed:

1) Get the distinct other company segments that are used on the invoice details.
2) For each "other" company, add the total of the detail lines.
   a) Get the GL Account that uses the same Natural Segment and the same Business Segments as the main company, but uses the Company Segment of the other company. The main account of an invoice usually uses Accounts Receivable as the Natural Segment, and blank or default Business Segments. This is not an account from the Multi-Company matrix. No money has been received yet for this Invoice, so the Accounts Receivable (really whatever Natural Segment was used for the main invoice) can be properly tracked for each company used on the Invoice. The system does allow any Natural or Business Segments to be used. For example, a customer overpayment does not use Accounts Receivable but rather, uses a Customer Overpayment Liability Account for a special Invoice that tracks customer overpayments.

b) Sum the Invoice Details for the "other" company. This sum will become the Accounts Receivable amount for this company for this Invoice.

c) Track Accounts Receivable for the other company. Insert a new row in the Invoice details using the GL Account from two steps above (usually Accounts Receivable). The Invoice detail row will be marked as a special Multi-Company row. The amount for the row will be the negative of the sum of the detail lines for this invoice for the "other" company (not the main company). The amount is negative because Invoice details are Credited to the General Ledger. A negative Credit is a Debit, because it is preferred to Debit the sum of the detail lines for the "other" company, as would normally happen for a single company Invoice.

d) Reduce Accounts Receivable for the main company. Insert a new row in the Invoice details using the main GL Account (usually Accounts Receivable) of the Invoice. The Invoice detail row will be marked as a special Multi-Company row. The amount for the row will be the positive of the sum of detail lines for this invoice for the "other" company. The amount is positive because Invoice details are Credited to the General Ledger. A positive Credit is a negative Debit, and it is preferred to reduce the Debit of the main Invoice account by the sum of the detail lines for the "other" company.

3) Write all of the detail lines to the sub system journal.

Entering a Check that Pays AR Invoices

In at least one embodiment of the present invention, the accountant enters the client into the system that paid the check and the system searches for all open Invoices with outstanding balances for that client. The accountant enters the check number, check date, and amount of the check. The system can apply a discount to the invoice, such as a 2% discount if paid within 10 days, with the balance due in 30 days. This is commonly referred to as "2 ten net 30". If a discount is possible, it is specified on the invoice. The accountant enters the date that is used to check if the discount will apply. If the company that is paying takes the discount, but pays 5 days after the discount period has expired, then the Invoice should not have a discount, but instead is treated as short a short payment. The system defaults the bank account that the check will be deposited to by looking at what bank account was used for past deposits for this customer. The accountant can specify the bank account for this particular check. The bank account will be the main company for the check. All Invoice detail lines with a company that is different from the company of the bank account will be treated as Multi-Company entries.

Pay Invoice Process

Entering Checks from Clients into the System

Figure 9:
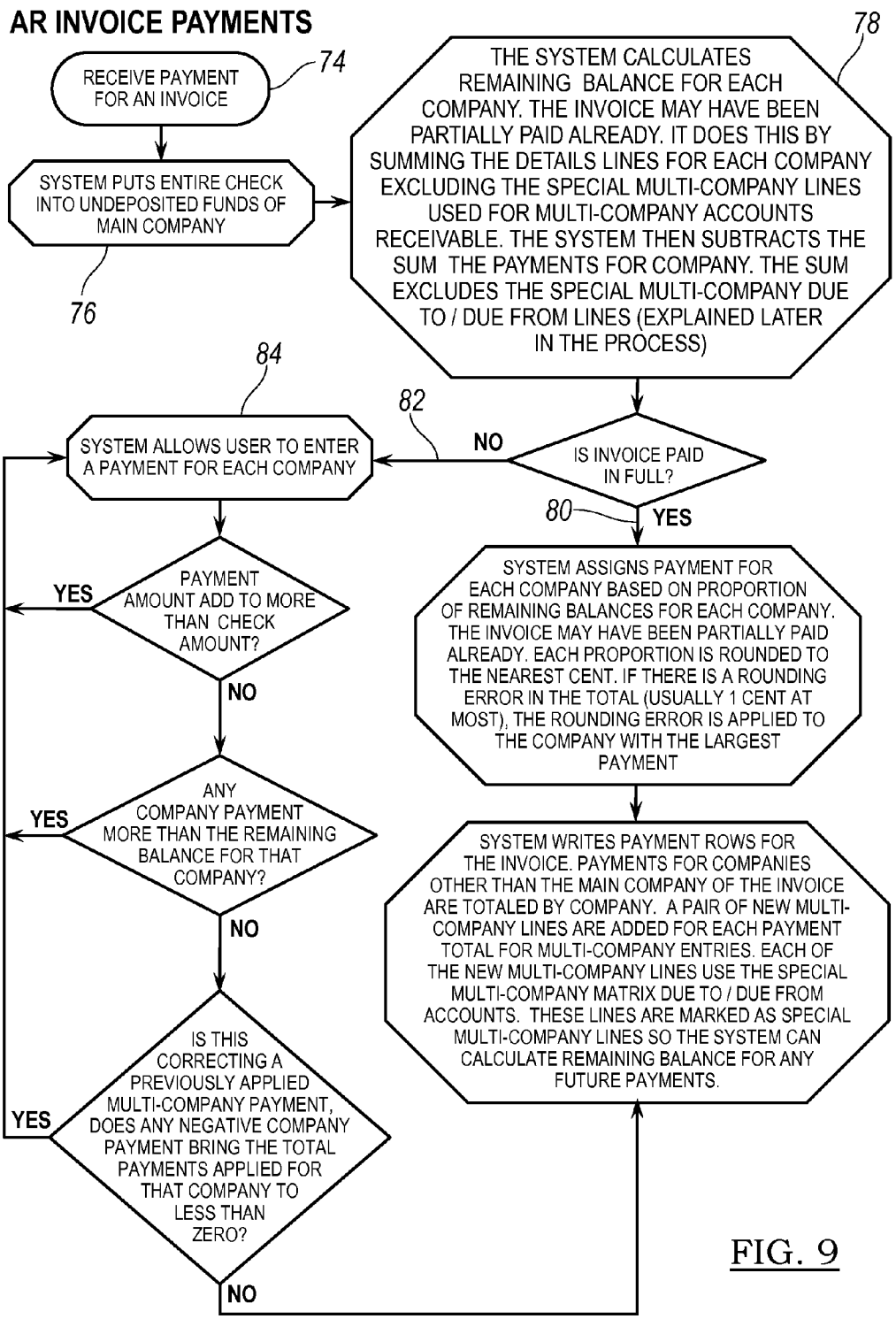
FIG. 9 is a flow chart of a method for generating Account Receivable invoice payments in accordance with an example of the present invention.

With reference also to FIG. 9 in at least one embodiment of the present invention, AR Invoice Checks are received at 74 and applied to outstanding Invoices. For normal Accrual accounting, the checks reduce the Natural Account Segment (e.g. Accounts Receivable) and increase Undeposited Funds. For Cash accounting, the checks increase Revenue and increase Undeposited Funds. At the end of the day, the checks will be put on a Deposit. The Deposit will reduce Undeposited Funds and increase Bank at 76. The checks may pay invoices that are Multi-Company Invoices. If so, the system will reduce the Natural Account Segment (e.g. Accounts Receivable) in each company, but only increase the Undeposited Funds for the main company that will get the check deposit. The system will use the Multi-Company matrix to add pairs of rows tracking the "Due To/Due From" between the companies at 78.

For example, a check may pay a Multi-Company Invoice that was for a total of $1000, and $600 was for company A and $400 for company B, and the main company on the Invoice was Company A. When the $1000 gets deposited to Company A, Company A owes Company B $400 because $400 of the Invoice detail lines (usually revenue) were for Company B. The Accounts Receivable for Company A will be reduced by $600 and the Accounts Receivable for Company B will be reduced by $400.

Most Invoices are paid in full at 80, so allowing the full payment or proportional processing of the payment greatly speeds up data entry for the accountant. The accountant only enters the check amount, the system does the rest. If an Invoice is short paid at 82, usually it will be proportionally applied. This also allows the accountant to enter just the check amount and the system does the rest. The accountant only has to enter specific amounts at 84 if he wants to control exactly how much each company should be paid.

The proportion is based on the current outstanding balances of the Invoice at the time of the check. The Invoice may have been partially paid before. Using the $1000 Invoice example from above ($600 for Company A, $400 for Company B), if Company A had already been paid $550 and Company B was already paid $250, then if a check came in for the remaining $200, Company A would get $50 applied and Company B would get $150 applied to bring each company to a zero balance.

If the check amount being applied will exactly pay off the outstanding balance of the Invoice (which is the usual case), then the system does not even do a proportional calculation. The proportional calculation could have a rounding error, causing a one cent (e.g. 1 penny) balance in one company, and a one cent overpayment in the other company. If a check exactly pays off the current outstanding balance of the Invoice, the payment is applied to the companies on the Invoices based on the exact current outstanding balance of each of the companies.

If a client company short pays the Invoice, such as paying $800 instead of $1000, the accountant can choose to proportionally apply the short payment (short $200), or to specify the amounts paid to each of the companies.

If the accountant chooses to proportionally apply the payment, then Company A gets ($600/$1000)*$800=$480 and Company B gets ($400/$1000)*$800=$320. In this case, the Accounts Receivable for Company A will receive $600−$480=$120, and the Accounts Receivable for Company B will receive $400−$320=$80.

Alternatively, maybe Company A did a great job, and the full 200 short pay should be applied to Company B. In this case, the accountant can specify that $600 goes to Company A and $200 goes to Company B. The Accounts Receivable for Company A will receive $0.00, and the Accounts Receivable for Company B will receive $400−$200=$200. Company A will owe Company B only $200, because $200 of the $800 check was due to Company B.

Figure 18:
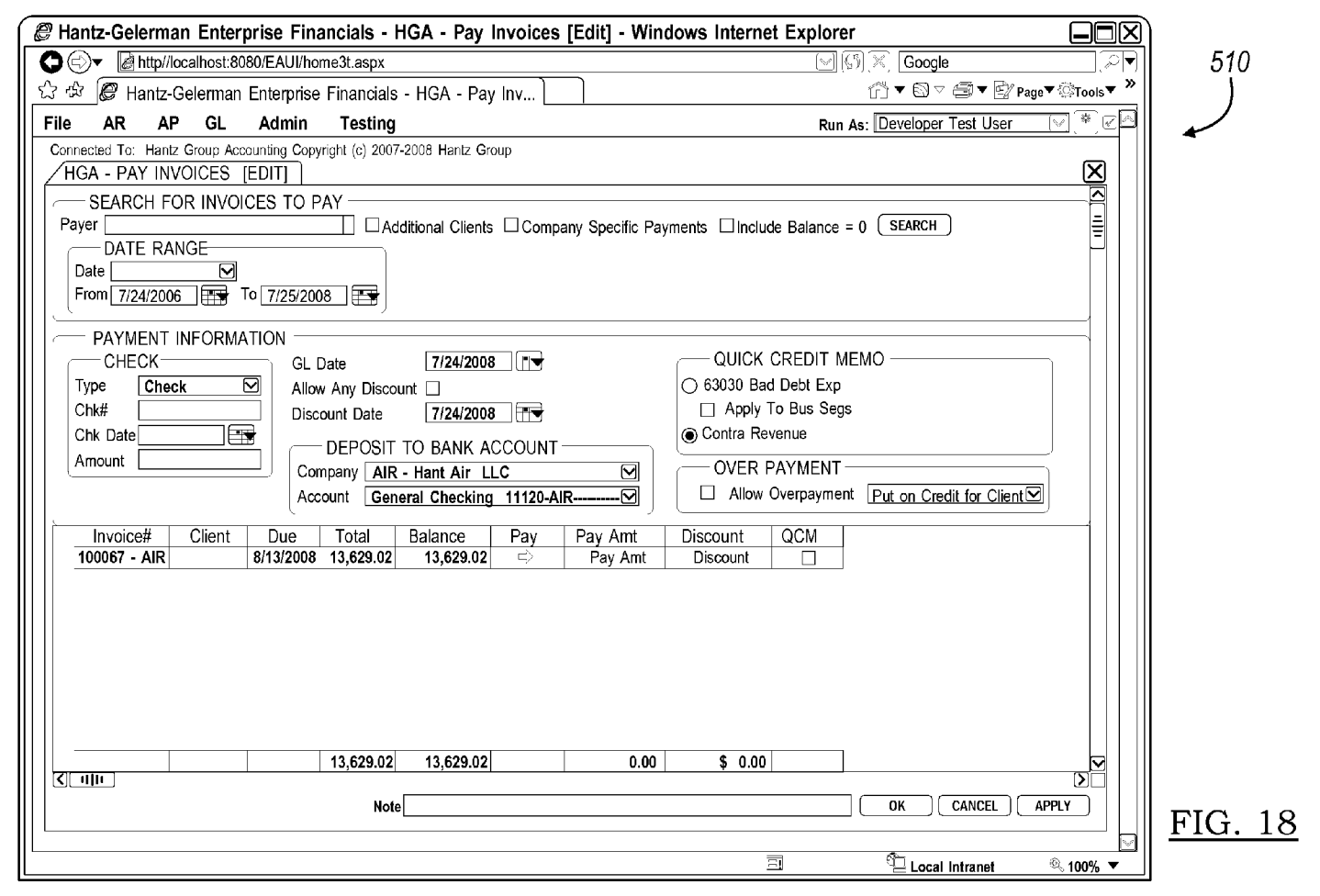

Referring also to FIG. 18 is a screen shot #1 at 510 of an example of the Enter Received Checks screen.

In one embodiment, the system performs the following steps comprising:

1) Checks if a client payer was selected, and a check number, check date and GL date were entered.
2) Checks that the total Pay Amounts (Pay Amt) applied to all Invoices (one check can pay more than one Invoice) is equal or less than the check amount. If a check payment is for more than the current outstanding balance, it cannot be fully applied, and the extra amount can be put on credit for the customer, or kept as additional revenue (used if the overpay amount is small) or returned to the client.
3) If the check payment is not fully applied, the system checks that the accountant has chosen an overpayment method.
4) The system writes (e.g. records) the Check and the applied payments to the AR Module.
5) If the accountant chose to enter specific company amounts, the system checks that each company amount does not overpay the amount currently outstanding for the company for the Invoice. In the example from above of the $1000 Invoice with $600 to Company A and $400 to Company B, if a check comes in for $800, the system will not allow the accountant to specify that all $800 should pay Company A.
6) If the accountant specifies that the client took a discount on the Invoice payment, the system checks that the discount amount was allowed on the Invoice, and that the discount date has not passed.
7) In many cases, the accountant just applies the check amount to the Invoice and does not specify how much is for each of the companies.
8) If the payment amount fully pays the remaining balance of the Invoice (the Invoice may have been partially paid before, or it may be fully paid now in one payment), the system will apply payment rows associated with the check based on the exact amount of the current outstanding balance for each company on the Invoice. The current outstanding balance is the total amount of the detail lines for a particular company on the Invoice minus the payments that have already been made to this Invoice for the particular company.
9) The payment row account uses the same Natural Account Segment (usually Accounts Receivable) and Business Segments as the main account of the Invoice. The main account of the Invoice is usually Accounts Receivable. The system uses the specific Company Segment of the applied payment. This is the step that brings down the Accounts Receivable (usually) for each company as the Invoices are paid.
10) If the accountant wants the payment to be proportionally applied based on the current outstanding balance of each company, the system will do the following:
    a) Checks that the Invoice will not be overpaid by the payment. This would create negative accounts receivable.
    b) Gets the current outstanding balance for each company of the Invoice. The current outstanding balance is the total amount of the detail lines for a particular company on the invoice minus the payments that have already been made to this Invoice for the particular company, and this is done for each of the companies on the Invoice.
    c) The system checks that the total amount of the Invoice is not zero. If it is zero, then the system tells the accountant that he must enter the company specific amounts for the payments. The system preferably does not proportionally apply money to an Invoice whose total is 0.00 because dividing by 0 is mathematically undefined.
    d) If this is the typical case of the Invoice having a balance, and applying payments to the balance, then:
        I. The system proportionally applies the payments by dividing the current amount outstanding for each company by the total amount outstanding for the Invoice. The system rounds the result to two decimal places.
        II. The rounding to two decimal places (e.g. 1 cent) may have introduced a rounding error in the total payments applied. The system will sum the proportional payments and check the sum against the original payment amount. If the amounts are different, then there is a rounding error. The rounding error is typically 1 cent at most, although each company could introduce up to a 1 cent error, so if there are four companies, there could be up to a 4 cent error. The system will take the rounding error and apply it to the company with the largest amount of the payment applied to its current outstanding balance. This resolves the rounding error, and the rounding error is applied to the largest number, so it has the least percent effect.
    e) If the Invoice was already paid in full, then the current outstanding balance is zero. The accountant may also reverse a payment. If this is being done, the system will use the company totals for the original Invoice amounts to proportionally apply the payment reversal so as to not divide by zero.
11) If any Invoice was short paid, and the short pay amount will be forgiven via a Credit Memo (e.g. QCM Quick Credit Memo check box selected), the system will write the Credit Memo. The Credit Memo is written after the check payment is applied to the Invoice. The system will allocate Credit Memo detail lines based on the amount outstanding for each company. The system will write Credit Memo detail line accounts based in the Credit Memo options of Bad Debt or Contra Revenue. If a Bad Debt Credit Memo is being written, the system can use the Business Segments of the account (examples are office, region, department) to be added to the Bad Debt Account to define a Bad Debt with Business Segments Credit Memo. The Credit Memo may be very complicated for Multi-Company. Credit memo is discussed in more detail below. The system code for Credit Memo is in wsInvoice.GetInvoiceCreditMemo.

At this point the check payment is saved to the database. The Multi-Company matrix "Due To/Due From" has not yet been used but will be used in the Sub System Pay Invoices Journal described below.

Sub System Pay Invoices

Main Multi-Company Processing for Accrual and Cash General Ledger

In at least one embodiment of the present invention, the system first gets the total amount of the check, and the main company for the check. The main company is the company on the undeposited funds (same company associated with the bank account for deposit) that the check will be deposited into. In one example, the system performs the following steps comprising:

1) Checks if the check payments to multiple companies, or to over payment credits exactly adds to the check amount.
2) Checks if the accountant tried to use one of the Multi-Company matrix accounts directly. These are automatically maintained by the system.
3) Checks if the accountant tried to use Retained Earnings or Current Earnings directly. These as automatically maintained by the system.
4) The system identifies if there are any applied payments that use a different company than the main company of the check payment.
   a) If there are no different companies used, then this is not a Multi-Company check, and the system can use much simpler processing.
   b) If there are applied payment accounts that use a different company, the system uses the Multi-Company matrix to add in "Due To/Due From" inter-company accounts.

If the Check is a Multi-Company Check, the system preferably also performs the following steps comprising:

1) The system deletes Special Multi-Company rows that use accounts in the Multi-Company matrix. Normally there would not be any of the Special Multi-Company rows at this point, but this may be an edit of a previously journaled check.
2) The system totals the payments grouping by company. The totals are for the Multi-Company payments. Payments made to the main company of the check are not included. These totals for the Multi-Company payments will become the amounts that are needed for the pairs of Multi-Company lines.
3) The system removes any company total that exactly equals 0.00. There is no need for a multi-company entry for a total that equals 0.00.
4) The system checks that each remaining total has accounts in the Multi-Company matrix for the pair of companies that may be needed. The pair is the main company of the check, and the grouped company of the total applied payments.
5) If the Multi-Company matrix accounts do not yet exist, then this is the first time the system is encountering a Multi-Company entry between these two companies. Accordingly:
   a) The system will make sure each of the companies involved has a Multi-Company Natural Account Segment defined. (e.g. represented by one of the axis on the Multi-Company matrix).
   b) The system will create the pair of Multi-Company matrix accounts using the Company Segment and the Special Multi-Company Natural Segment for the other company and the default Business Segments.
6) The system adds a pair of lines (marked as Is Multi Company) to the applied check amounts using the Multi-Company matrix "Due To/Due From" accounts. The main company of the check gets the Credit (liability) because it owes money to the other company. The other company gets the Debit because it is owed money from the main company. The amount of the Debit or Credit is equal to the total of the company applied amount for the other company.

The system writes the Undeposited Funds and Payment rows to the normal Journal Details of the sub system journal. These will be written to the General Ledger when the sub system journal is posted.

The Cash General Ledger did not record the original invoice so it was not entered to the General Ledger. Accounts Receivable was not increased, and Revenue was not recognized. Now that the Invoice has been paid, the Invoice Detail lines (usually revenue) can be recognized. The company amounts paid can be proportionally applied to the invoice detail lines for the company for that Invoice.

The customer may have taken a discount, so the amount the customer paid can be proportionally applied to the Invoice detail lines. The Discount may be directly applied to the Journal.

In one embodiment, the system performs the following steps for each payment row comprising:

1) If the payment is not to the same Natural Account Segment used in the main account of the Invoice (e.g. typically Accounts Receivable), then write the payment directly to the cash journal detail lines.
2) If the payment is to the same Natural Account Segment used in the main account of the Invoice, then proportionally apply the payment to the invoice detail lines.
   a) Get the Company Segment for the payment.
   b) Sum the invoice detail lines that use an account with the same company as the payment. This will be less than all of the invoice detail lines for a Multi-Company invoice. Preferably, do not include the special Multi-Company rows that were put in the Invoice when it was saved to keep track of the Accounts Receivable for each company.
   c) Proportionally apply the payment using the accounts of the company specific invoice detail lines. Round each amount to two decimal places (e.g. 1 cent).
   d) Fix any rounding error by adding all of the lines just entered to make sure they add to the payment amount. If there is a rounding error (e.g. typically 1 cent), apply the error to the detail line with the highest total, so as to minimize the effect of the rounding error.
   e) Write all detail lines to the Cash Journal Details for later posting to the Cash General Ledger.

Multi-Company Credit Memos

In at least one embodiment of the present invention, a Credit Memo at 73 (see FIG. 12) is issued when a client has been invoiced, and the client will not pay the invoice. The Credit Memo is used to bring down the outstanding balance of existing Invoices. If the client was invoiced by mistake, either the wrong client, or a duplicate Invoice, then a Credit Memo may be applied to the Invoice. The Invoice originally increased Accounts Receivable and Revenue Accounts. In the case of a mistake, the accountant may want the Credit Memo at 73 to be a Contra-Revenue Credit Memo at 75, basically reversing the invoice detail accounts (usually revenue). Another reason for a Credit Memo is bad debt. Maybe the client has gone out of business. In this case, Generally Accepted Accounting Principles (GAAP) dictates that the loss be taken as a bad debt expense, instead of reducing the previously recorded revenue.

The system of the present invention uniquely offers Bad Debt at 77, Bad Debt using business segments at 79 and/or Contra-Revenue Credit Memos at 75.

If Bad Debt is chosen as the type of Credit Memo, then the accountant can chose to use a Bad Debt Expense Account Segment (for the Natural Company Segment) and the Company Segment with default Business Segments. The default Business Segments may be all 0's or all underscores for example. The 0's or underscores mean no specified segment for the business segment, such as for example, no office, no region or no department. Balance Sheet Accounts typically use only the Natural Account Segment and the Company Segment. The system of the present invention preferably also allows the accountant to optionally specify that the Business Segments are to be used with the Bad Debt expense for a Credit Memo. This way, the accountant can track Bad Debt down to the office, region, department and/or whatever other level may be desirable. If the Bad Debt GL Account for the specific company, using the specific business segments does not exist, the system will automatically create the account.

Multi-Company plays an important role regarding Credit Memos. The Invoice may be a Multi-Company invoice, and the Invoice may have already been partially paid. For the Credit Memo, the current outstanding balance for each of the companies on the Invoice is first determined and then, proportionally applies the outstanding amount to the invoice detail lines of the Invoice that is having a credit memo created against it.

When paying an Invoice, the client will sometimes short pay by a very small amount, such as for example, by a dime, or a few cents. In this case, the system offers a Quick Credit Memo, where just checking a box will create the Credit Memo against the Invoice, and apply the Credit Memo to the invoice. Other systems typically have trouble handling short payments of only a small amount.

To Create a Credit Memo, the accountant chooses the Invoice that has an outstanding balance and tells the system what type of credit memo to create. The types of Credit Memos are Bad Debt, Bad Debt with business segments, or Contra Revenue. The accountant also tells the system how much money the Credit Memo should be for. This amount can be between negative 1 cent and negative of the remaining outstanding amount of the Invoice. Maybe the customer was invoiced for $1000, and the customer has already paid $800. Further, maybe on negotiation, $75 was forgiven, and the customer needs to only pay another 125. In this case, the Credit Memo would be for $75.

The system copies the information from the existing Invoice to the new Credit Memo. The GL Date of the new Credit Memo is defaulted to the current date (e.g. today). The invoice number of the Credit Memo is the original invoice number plus "–C" to denote a Credit Memo. The system writes a special associated field on the Credit Memo, so that the original Invoice and the Credit Memo are associated for future investigations.

The system gets the current outstanding balance for each company on the invoice. If partial payments have been made to the Invoice, some of the past payments may have fully paid one of the companies on the invoice. The system discards any company with a 0.00 balance.

The system creates new detail lines for the Credit Memo by proportionally applying each company balance to the detail lines of that particular company on the original Invoice. The system copies the GL accounts and descriptions from the original Invoice to the detail lines of the Credit Memo. The system rounds each detail line to 1 cent, and then fixes any rounding error by applying the rounding error to the line with the greatest absolute value of money.

If the Credit Memo is a Bad Debt Credit Memo, or a Bad Debt with Business Segments Credit Memo, the system makes a pass through the detail lines, changing the GL Account Natural Account Segment to the Bad Debt GL Account Natural Segment. The system checks that the Bad Debt Natural Segment is defined for the Accounting system. If it is not defined, the system notifies the accountant that he must set up a Bad Debt Natural Account using the GL Setup administration screens. If the Business Segments are also being copied, then the system uses those same Business Segments defined in the GL Accounts. If the GL Account does not exist with the exact Natural Segment, Company Segment, and Business Segments, then the system creates the new GL Account on the fly.

The system then makes a pass through the resulting detail lines and groups them by GL Account and Description. If two lines have the same GL Account and Description, then there is no need to have them listed separately. This combining of detail lines preferably keeps the books clean.

The accountant can also modify the Credit Memo after it is created.

When the Credit Memo is released, the system checks the company total for each company on the Credit Memo. Each company total is compared to the corresponding company outstanding balance of the associated Invoice. If one of the companies is trying to Credit Memo more than the outstanding company balance of the associated Invoice, the system will not allow this and it will report an error to the user.

When releasing a Credit Memo, the system will create a new special "zero check", and apply the Credit Memo and the associated invoice against the zero check. The check will be for 0.00 because the Credit Memo amount will automatically exactly offset the Invoice amount.

Accounts Payable

In at least one embodiment of the present invention, Accounts Payable is substantially similar to Accounts Receivable. The Debits and Credits are reversed. An Invoice on the AR side is similar to a Voucher on the AP side. A received AR Check is similar to a printed AP Check. The Multi-Company concepts work in a similar fashion or the same. A Multi-Company AP Voucher keeps each company's Accounts Payable in balance by automatically writing pairs of Accounts Payable rows to the Voucher details when sub system journaling. When paying a check, the system proportionally applies the check amount (a check may not fully pay a voucher) to the detail lines of the Voucher. The system automatically uses the Multi-Company matrix to create pairs of "Due To/Due From" entries because the check that is written comes from one company's bank account, but may pay voucher detail lines for a different company. Debit Memos on the AP side are similar to Credit Memos on the AR side. The Debit Memos will not allow a forgiveness of a company expense for more than the outstanding balance of the company on the voucher.

Examples of Accounts Payable

Figure 2A:
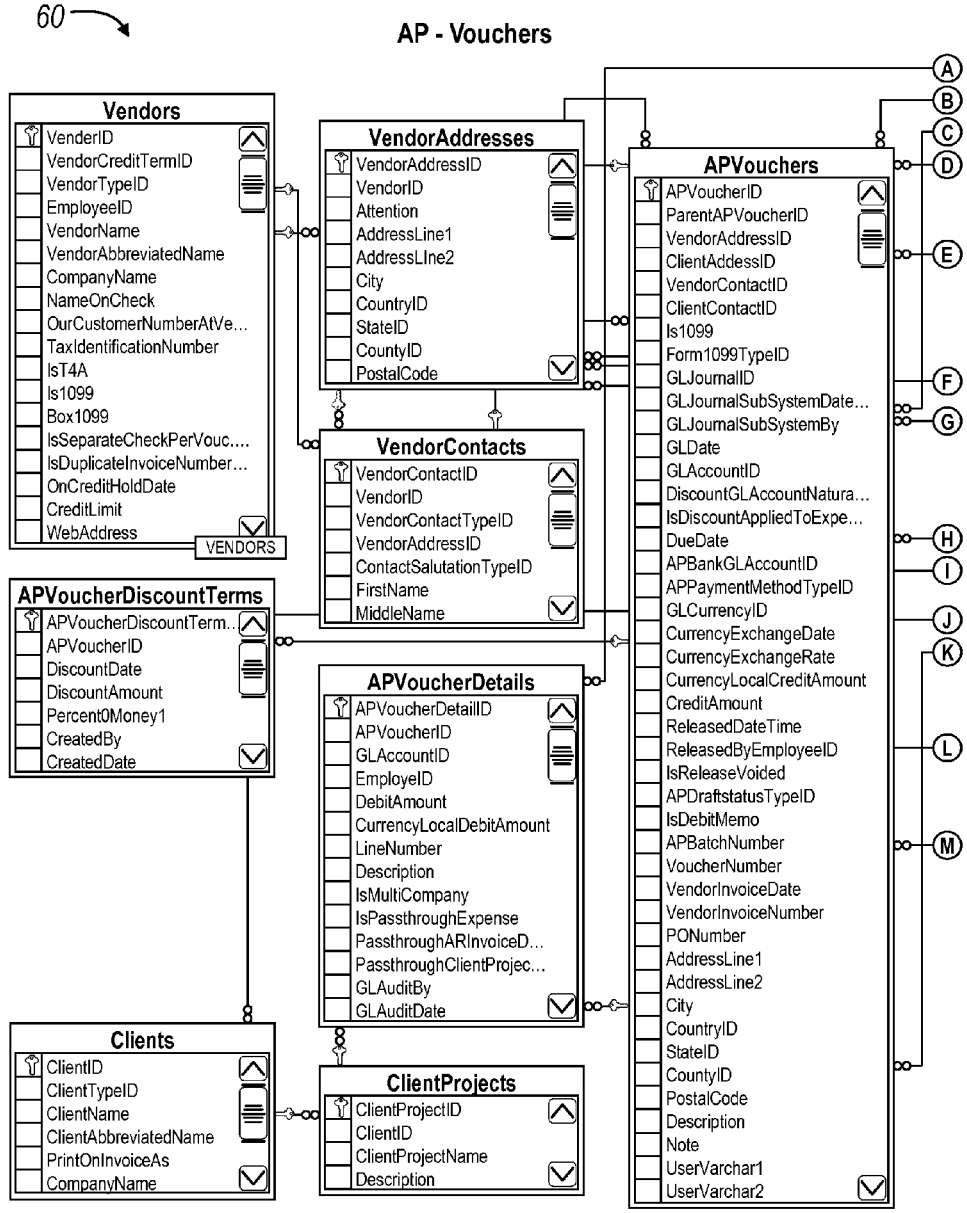
FIGS. 2a and 2b are an Entity-Relationship diagram in accordance with an embodiment of the present invention.
Figure 2B:
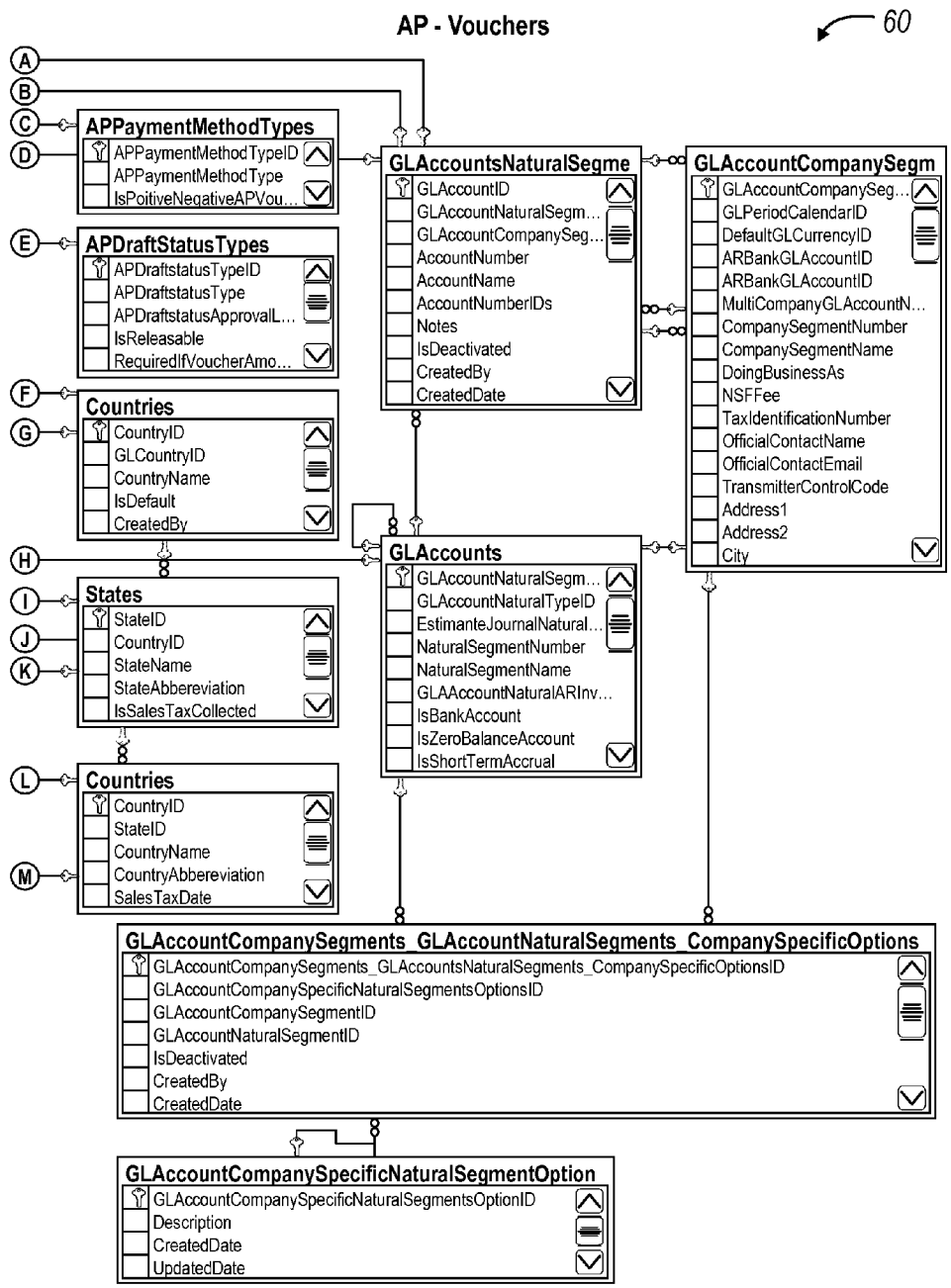
Figure 3A:
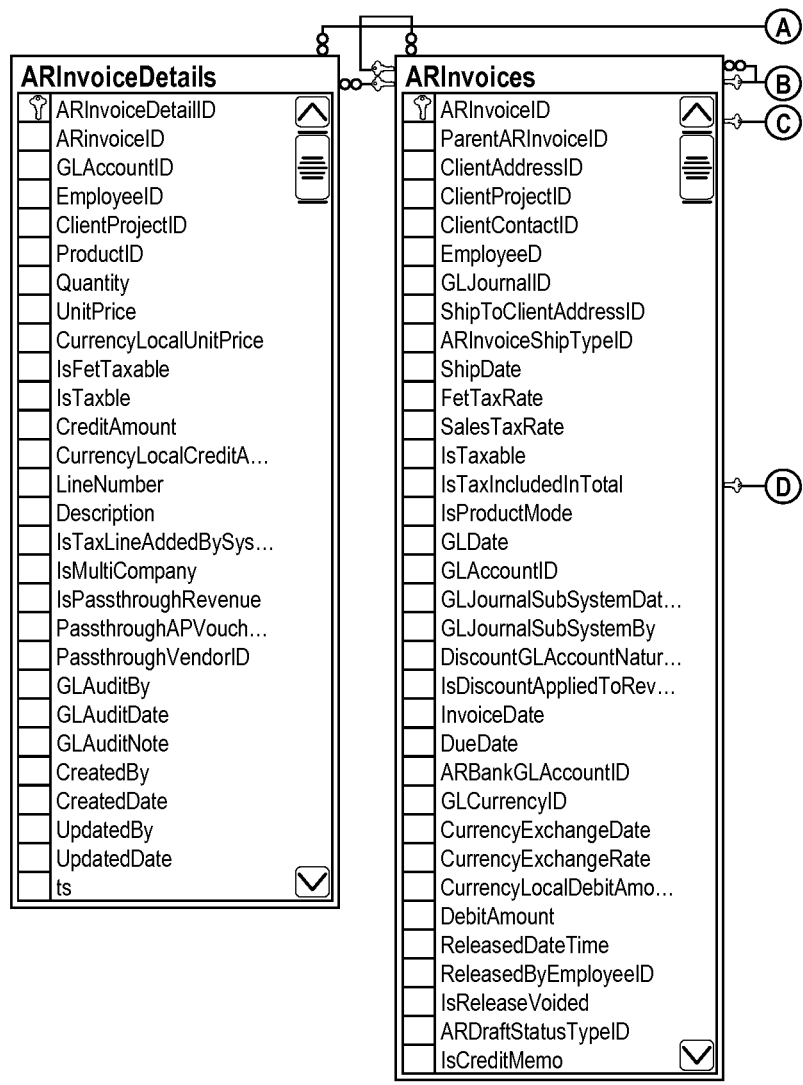
FIGS. 3a and 3b are an Entity-Relationship diagram in accordance with one embodiment of the present invention.
Figure 3B:
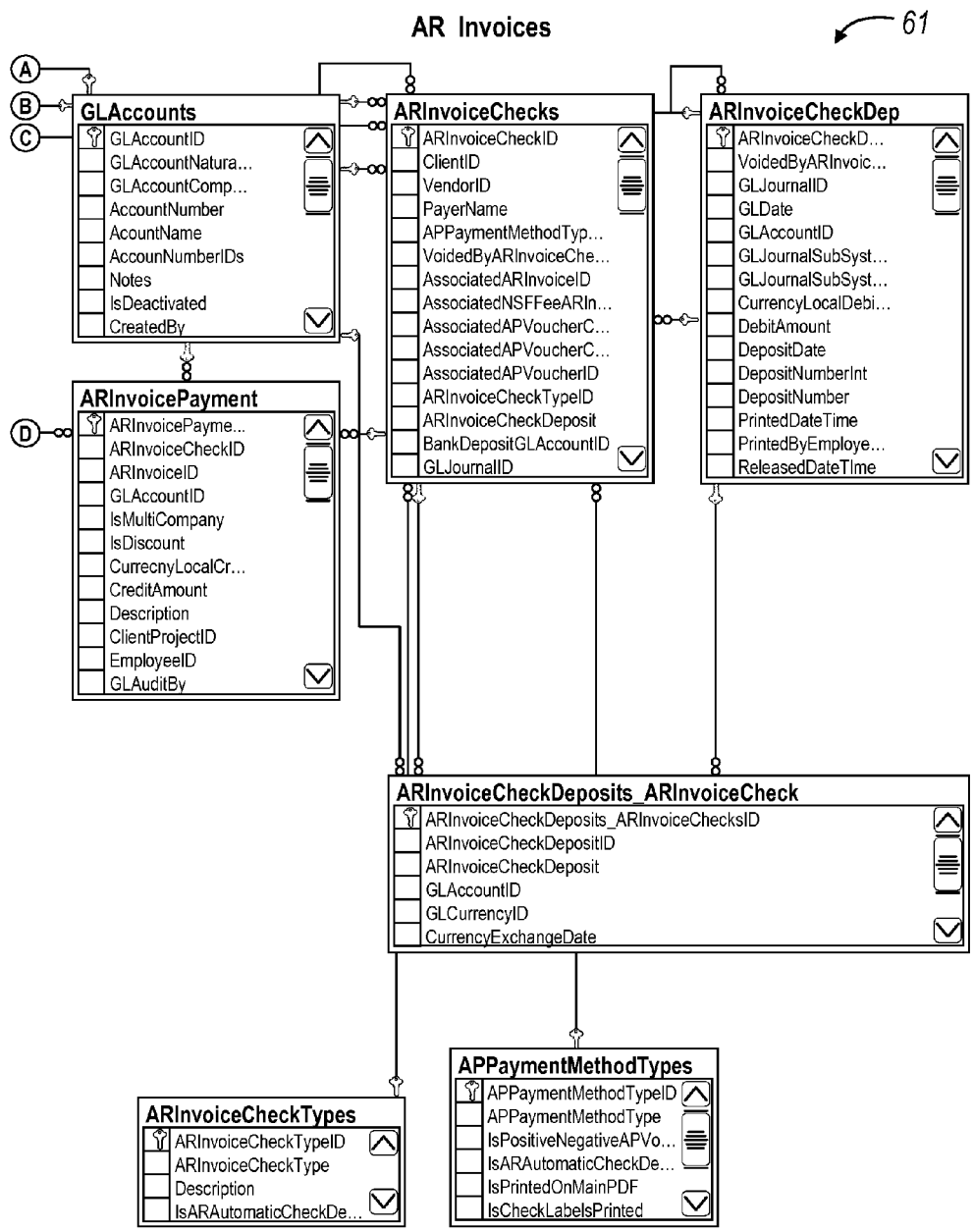
Figure 13:
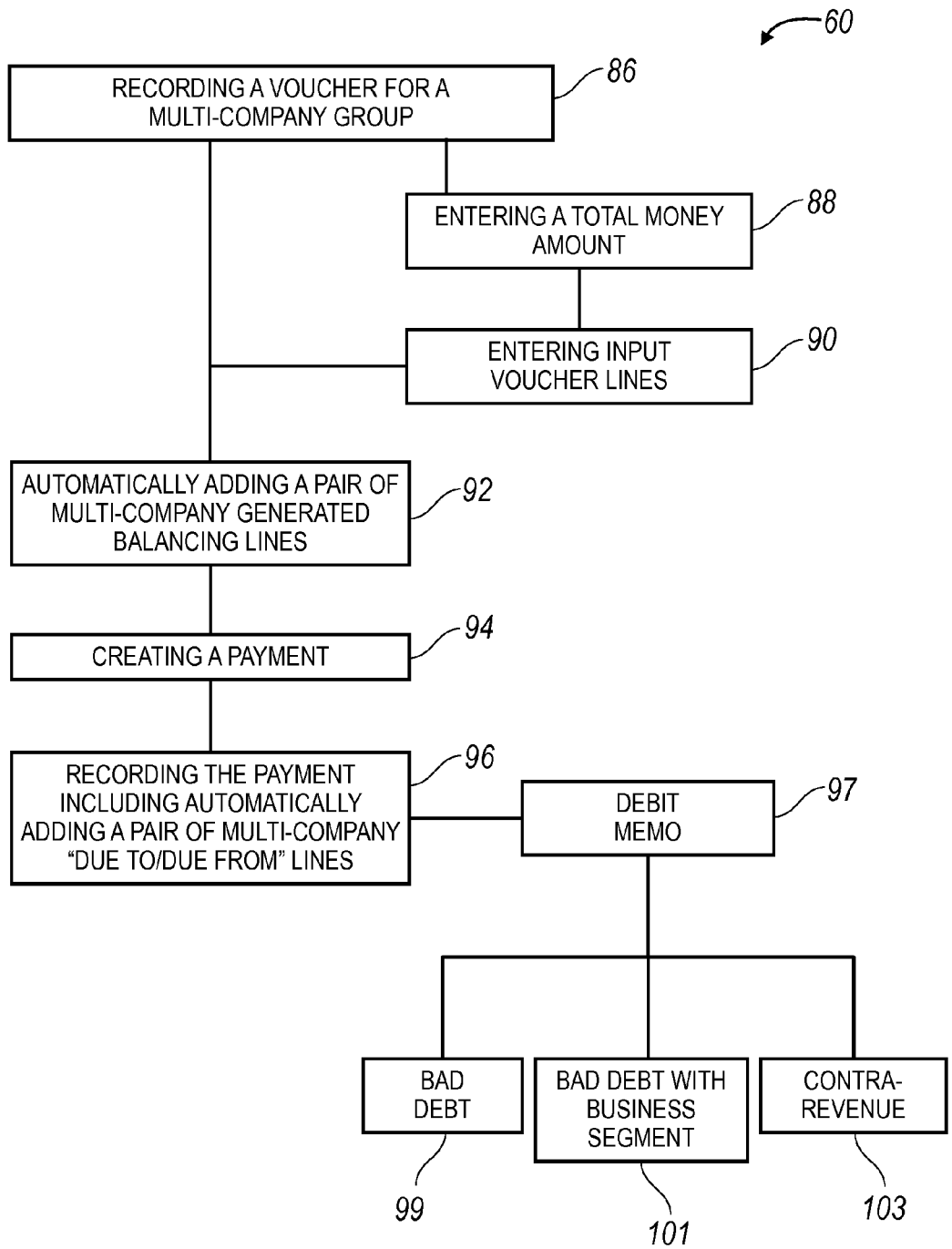
FIG. 13 is a flow chart of a method of Account Payable using a multi-company accounting system in accordance with another example of the present invention.

Referring to FIGS. 2a, 2b and 13, at least one embodiment of Accounts Payable 60 in accordance with the present invention is provided. The voucher is recorded at 86 within the multi-company accounting system by the accountant entering financial data into the system. In one example, the accountant enters a total money amount for the voucher at 88 and input voucher detail lines at 90. Each of the voucher detail lines 90 have an account associated with one of the companies of the multi-company group and an amount of money. At least two of the voucher detail lines are associated with two companies of the multi-company group.

The system automatically adds a pair of multi-company balancing lines at 92 which are associated with the voucher for balancing money owed by each of the two companies to define an outstanding balance for each of the two companies.

A payment is then created at 94 for paying the voucher. In particular, the accountant enters the amount of the payment into the accounting system to record the payment at 96. The system reduces the outstanding balances for the companies including automatically adding a pair of "Due To/Due From" entries using the Multi-Company matrix as discussed earlier to balance the money owed between the two companies.

When the payment is for the full amount of the current outstanding balance of the voucher total money amount, the system automatically applies a corresponding portion of the payment to each of the current outstanding balances of the two companies such that each of the current outstanding balances is zeroed and no rounding error occurs. When the payment is for less than the current outstanding balance of the full amount of the voucher total money amount, the system allows the accountant to choose between proportionally applying the payment to the current outstanding balances of the two companies or specifying the payment to the current outstanding balances of the two companies. Proportionally applying the payment includes the system proportionally applying the payment to each of the current outstanding balances for the two companies by multiplying the payment by the current outstanding balance for the corresponding company divided by the total current outstanding balance of the voucher and rounding the result to two decimal places. Specifying the payment includes allowing the accountant to specify what amount if any of the payment is to be applied to each of the current outstanding balances of the two companies.

Proportionally applying the payment can further include applying any rounding error resulting from totaling the rounded result to two decimal places relative to the total amount of the payment to the outstanding balance of the company with the largest amount of the payment applied to its outstanding balance.

Specifying the payment can further include the system checking that the amount of the payment specified by the accountant does not exceed the current outstanding balance of the corresponding distinct company. Moreover, specifying the payment can also include that if the amount of the payment specified by the accountant is negative, then the system checks that the negative amount of the payment does not remove more than a total of previously applied payments to that company for payment of the voucher.

In at least one embodiment, a debit memo at 97 is created when the corresponding outstanding balance of one or more of the companies of the voucher has not been paid in full. The system is preferably configured to generate a plurality of types of debit memos for reducing the current outstanding balance for one or more of the companies including a bad debt debit memo at 99, a bad debt using defined business segments debit memo at 101 and a contra-revenue debit memo at 103. Each of the bad debt debit memo, the bad debt using defined business segments debit memo and the contra-revenue debit memo have debit memo detail lines having a system generated account. Each of the system generated accounts has the Natural Account Segment, the Company Segment, and one or more Business Segments. The system generated account for the bad debt debit memo has a bad debt natural account segment defining the Natural Account Segment, the Company Segment corresponding to the Company Segment of one or more of the input voucher detail lines associated with the current outstanding balance and default values for the one or more Business Segments. The bad debt with business segments debit memo has the bad debt natural account segment defining the Natural Account Segment, the Company Segment and the one or more Business Segments corresponding respectively to the Company Segment and the one or more Business Segments of one or more of the input voucher detail lines associated with the current outstanding balance. The contra-revenue debit memo has natural account segment, the company segment and the one or more business segments corresponding respectively to the natural account segment, company segment and the one or more business segments of one or more of the input voucher detail lines associated with the current outstanding balance.

In one example, creating the debit memo includes the system evaluating each of the input voucher detail lines associated with the current outstanding balance for generating the system generated accounts and when two or more of the system generated accounts have the same natural account segment, the same company segment and the same one or more business segments, the system automatically aggregating the two or more of the system generated accounts into a single system generated account line including summing the money amounts associated with the two or more system generated accounts.

In one example, when the debit memo is for the full amount of the current outstanding balance of the voucher, the system automatically applies a corresponding money portion of the debit memo to each of the current outstanding balances of the one or more companies of the voucher such that each of the current outstanding balances is zeroed and no rounding error occurs.

Alternatively, when the debit memo is for less than the current outstanding balance of the full amount of the voucher, system allows the interface user to choose between proportionally applying the corresponding money portion of the debit memo to the current outstanding balances or specifying the corresponding money portion of the debit memo to the outstanding balances. Proportionally applying the corresponding money portion of the debit memo includes the system proportionally applying the corresponding money portion of the debit memo to each of the current outstanding balances for the one or more of the companies. Specifying the corresponding money portion of the debit memo includes allowing the accountant to specify what amount if any of the corresponding money portion of the debit memo is to be applied to each of the current outstanding balances of the one or more of the distinct companies. Preferably, proportionally applying the corresponding money portion of the debit memo includes applying any rounding error to the current outstanding balance of the company with the largest money amount associated with the debit memo applied to its current outstanding balance.

Specifying the corresponding money portion of the debit memo preferably includes the system checking that the corresponding money portion specified by the accountant does not exceed the current outstanding balance of the corresponding company. If the corresponding money portion specified by the accountant is negative, then the system can check that the negative amount does not exceed more than a total of previously applied payments to that company of the voucher.

Referring to FIG. 14, the voucher has a main company and the system has one or more rules 200 for creating the voucher that the accountant selects whether it applies or not. For example, a first rule 202 is for designating if a particular company of the multi-company group is a Holding Company and if not, then the system will not allow the accountant to record the voucher with the particular company as the main company of the voucher where none of the input voucher detail lines are associated with the particular company. The second rule 204 is for designating if the particular company can be the main company of the voucher where the voucher contains any of the input voucher detail lines associated with another of the companies. The third rule 206 is for designating if the particular company can be other than the main company of the voucher where the voucher can contain any of the input voucher detail lines associated with the particular company.

The System Security by Segments, Run As, and Grant or Deny

Overview

Figure 7A:
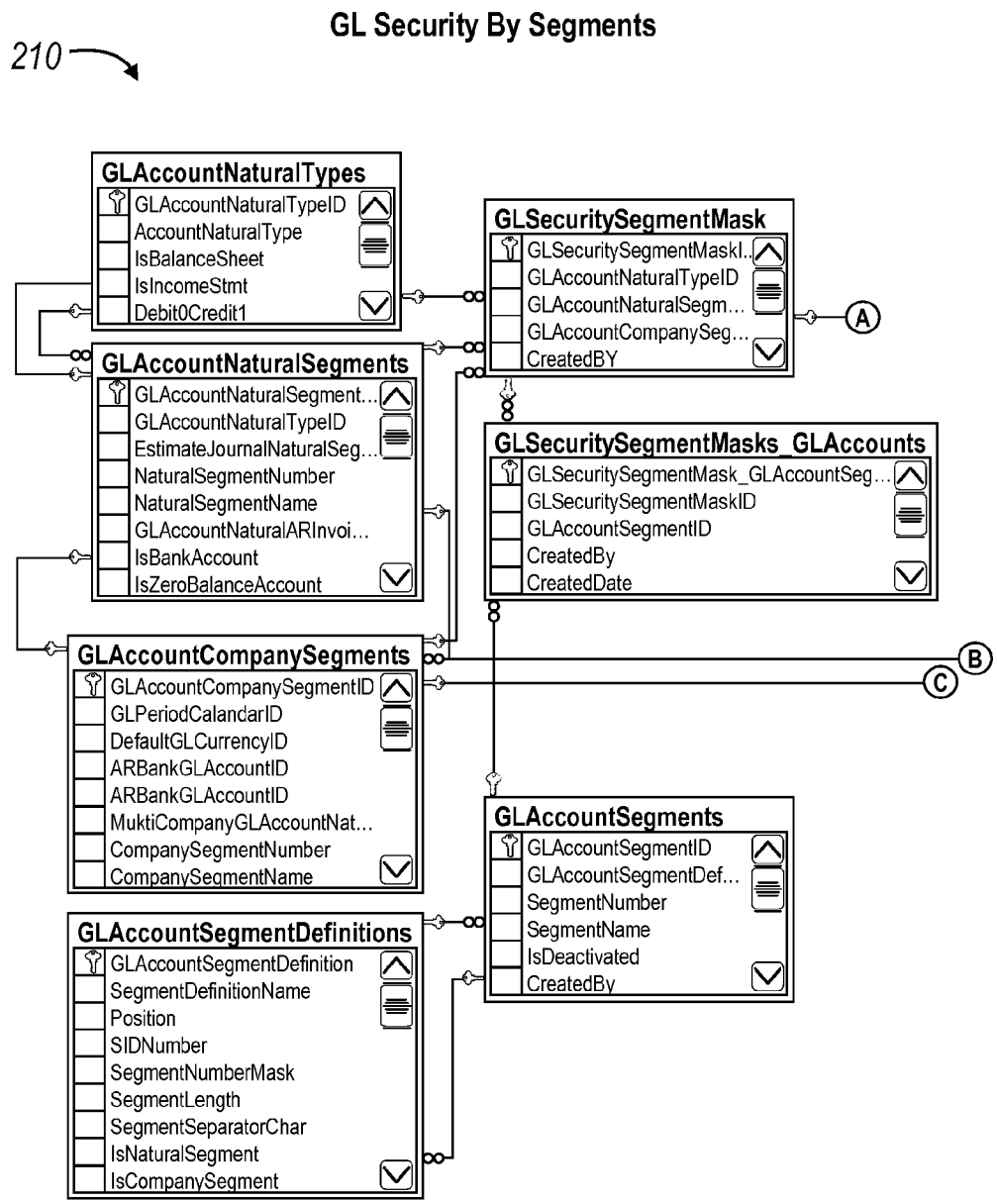
FIGS. 7a and 7b are an Entity-Relationship diagram in accordance with one embodiment of the present invention.
Figure 7B:
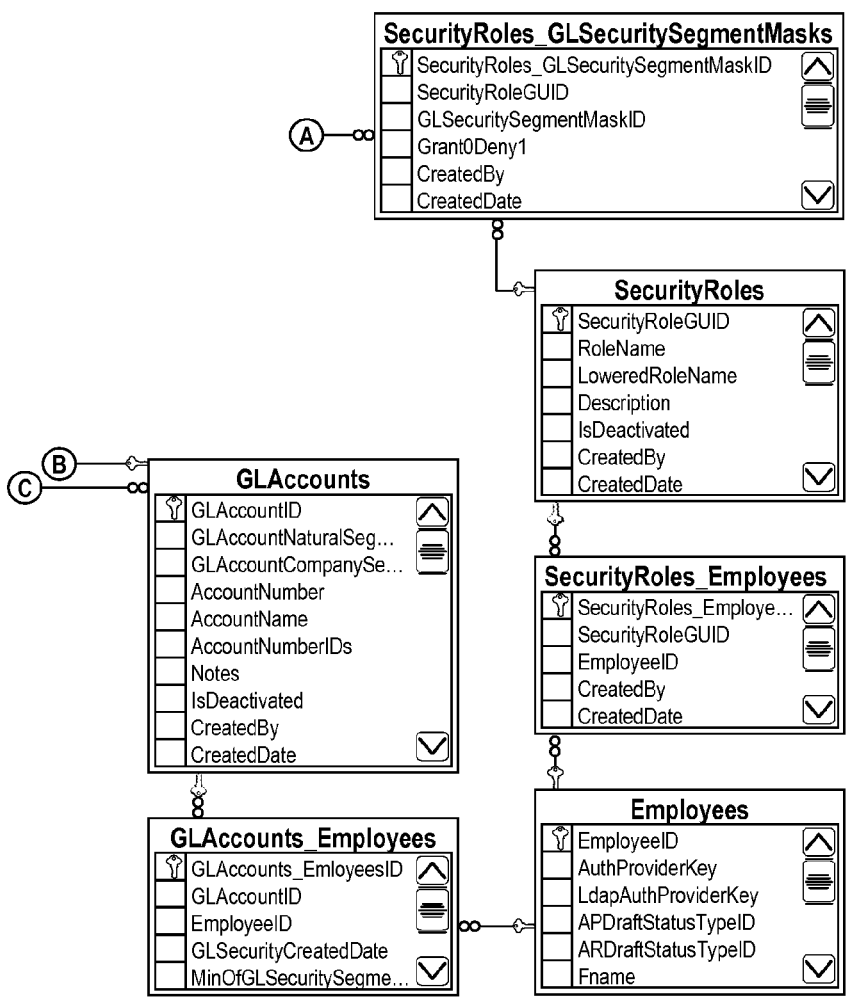
Figure 15:
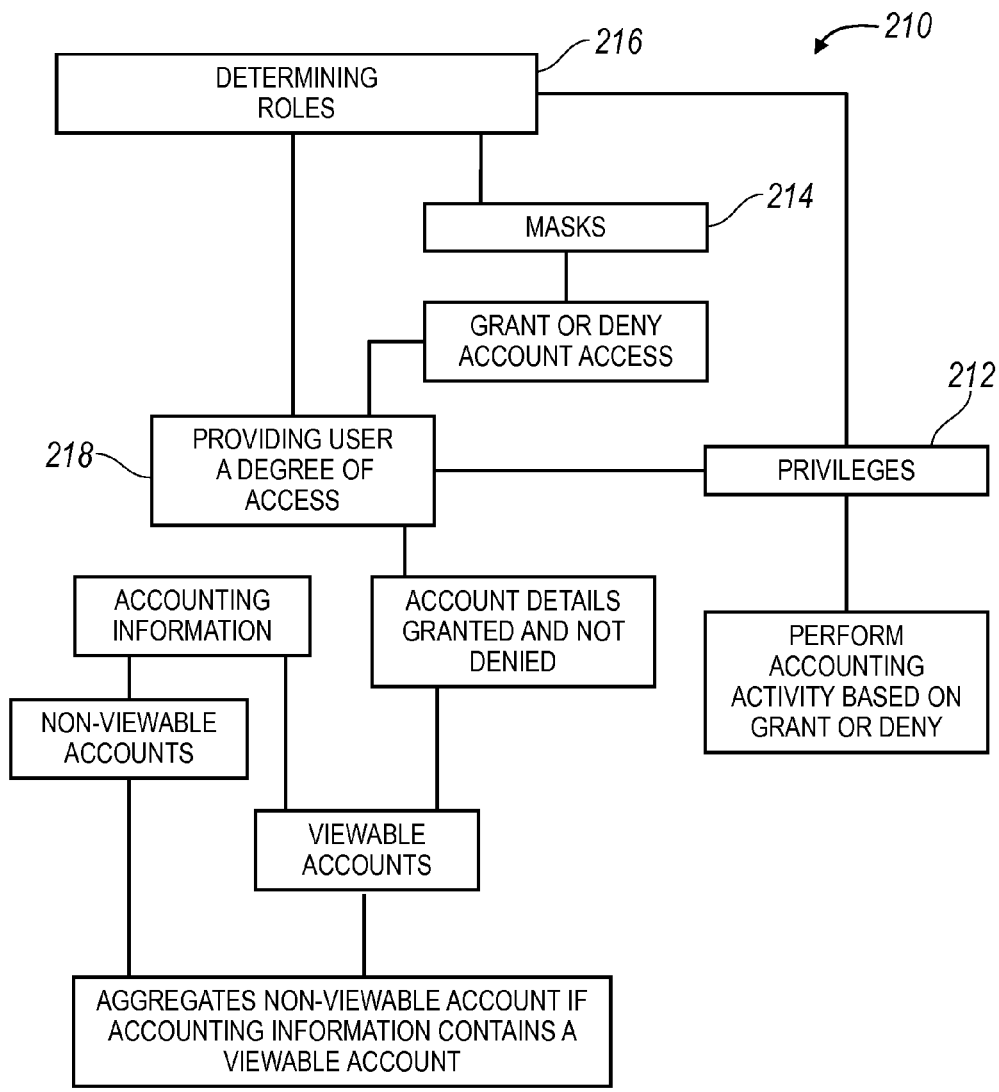
FIG. 15 is a flow chart of a method of security using a multi-company accounting system in accordance with an example of the present invention.

With reference to FIGS. 7a, 7b and 15 in at least one embodiment of the present invention, the system has an extensive security model 210 that allows administrators to set up what a person can do (security privileges 212), and what a person can see (security masks 214). If person A can see everything that person B can see, then the system allows person A to run the system as if he was person B.

The system may use two very powerful and unique ideas for controlling what a person can see using security account masks, and automatically allowing a person to run screens and reports as another person (Run As) if the other person can see a subset of what the logged in person can see.

Security Roles and Employees

Preferably, all users of the system can be assigned to as many security roles 216 as needed. The administrator sets up roles to either assign or deny security privileges or security masks. For example, an administrator may set up a security role for Junior Accountants or others with reduced security privileges to be able to enter draft vouchers, but not release vouchers into the General Ledger. Another role may be set up for Senior Accountants or others with enhanced security privileges to be able to release vouchers. A role may be set up to run financial reports for a specific business segment, such as office or region or department. The administrator would assign the business segment leader to that role.

Figure 19:
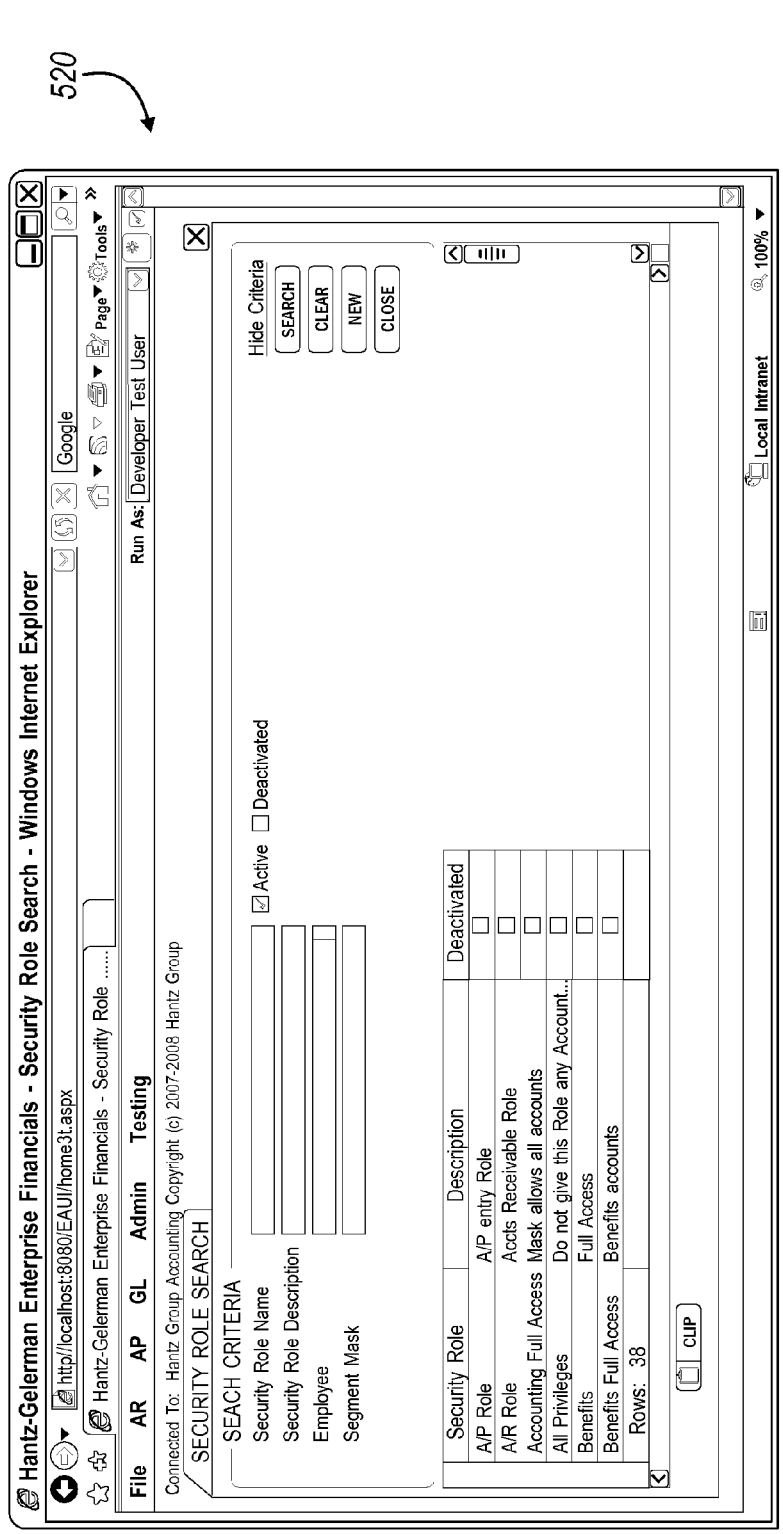
FIG. 19 is a second screen shot of another example of the present invention.

Referring also to FIG. 19 is an example of a screen shot (screen shot #2 at 520) of a Security Role Screen.

Security Roles and Privileges

In at least one embodiment of the present invention, each Security Role can have privileges specifically assigned or denied. This controls what that role can do at 218. Not every role must have every privilege assigned or denied.

For example, there may be a Security Role called "A/P accountant". This Security Role would have all of the Accounts Payable privileges granted to it.

In one illustrative example, a new AP clerk is hired, and the administrator does not want to give that person the ability to void or unvoid a check. The administrator could make a new role, just granting the AP privileges needed, or the administrator could add a new role called "A/P Clerk" just denying the Void and UnVoid privileges. The administrator could assign both the NP accountant and the NP Clerk roles to the new employee. The employee would then be able to do all activities in Accounts Payable, but not be able to Void or UnVoid a check.

In one example, to determine what an employee can do, the system looks at every role the employee is a member of comprising the steps of:

1) If any role contains a privilege that is specifically denied, then the employee is denied that privilege.

2) If the privilege is not denied, if any role specifically grants the privilege, the employee is granted the privilege.
3) If the privilege is not listed in any role for this employee, then grant or deny is based on the default for that privilege.

In one example the list of privileges includes AP-AP Check—Change Check Number, AP-AP Check—Delete, AP-AP Check—Print, AP-AP Check—UnVoid, AP-AP Check—Void, AP-Pay Vouchers, AP-Positive Pay All Checks, AP-Positive Pay Create, AP-Release Vouchers, AP-UnJournal Vouchers, AP-UnRelease Vouchers, AP-Void Release Voucher, AR-AR Check—Delete, AR-AR Check—Edit, AR-AR Check—NSF, AR-AR Check—UnNSF, AR-Release Deposits, AR-Release Invoices, AR-Soccer Application (Temp), AR-UnJournal Deposits, AR-Unjournal Invoices, AR-UnRelease Deposits, AR-UnRelease Invoices, AR-UnVoid a Deposit, AR-Void a Deposit, AR-Void Voucher Release, GL-Account Segments Manage, GL-Bank Statement, GL-Bank Statement Un-Reconcile, GL-Change Accounts on Posted items, GL-Create Accounts, GL-Custom Fields, GL-Debugging, GL-Enable Performance Monitoring, GL-Error Search, GL-External Segment Mapping, GL-GL Setup, GL-Natural Account Details, GL-Open/Close Periods, GL-Reports Admin, GL-Security Setup, GL-See Deactivated Accounts, GL-Select Max Rows For GL Search, GL-Small Lists, Journals-Delete Journals, Journals-Payroll—Import, Journals-Post Journals, Journals-Release Journals, Journals-Remove from Sub System, Journals-Sub System Journal, Journals-UnPost Journals, and Journals-UnRelease Journals. Other privileges may be added or substituted as required by particular embodiments. This list is exemplary only and is not intended to be exclusive or exhaustive.

Security Roles and Security Segment Masks

In at least one embodiment, each Security Role can also be assigned Security Masks at 214. A Security Mask defines a scope of GL Accounts. Every dollar in an accounting system is assigned to a General Ledger Account. Each General Ledger Account is made up of a Natural Account Segment. The Natural Account Segment defines the type of Account—Asset, Liability, Owner Equity, Revenue, or Expense. It also defines the specific type of account such as for example a Bank asset, or Equipment asset, or payroll expense, or services revenue. The system is a Multi-Company financial or accounting system, and defines a Company Segment or company balancing segment. This is the segment that defines the company, and can generate a balance sheet. In one embodiment, the administrator sets up the structure of the General Ledger Accounts by defining exactly what Business Segments will be used for the sub account. For example, the account structure may define that the Region, Office, Department, and Line of Business are to be used to track Revenue and Expenses. This means that each GL Account would be made up of exactly one Natural Account Segment, Company Segment, Region Segment, Office Segment, Department Segment, and Line of Business Segment.

Each Security Role can have as many Segment Masks as needed. Each mask can either grant or deny access to a series of accounts.

Existing Systems Security

The accounting systems that exist all have a user name and password to access the system. Once a person is authenticated (by having the correct password), that person can usually see all accounts in the system. Some more advanced systems that claim to be Multi-Company further limit the user to seeing accounts from one company. This technique is not really adequate for business to function. Because of this, management at the firm is not granted access to the accounting system. Business managers, such as office or region managers, or line of business managers, such as the vice president ("VP") of marketing/sales for a line of business such as insurance, or wholesale, or mortgages or whatever the firm sells are not given direct access to the accounting system. This limits access to sensitive or confidential information only to those having the necessary security privileges. Otherwise, for example, if one office manager had unlimited access to the system, he could run financial reports for other offices, or see sensitive financial data such as payroll information. These systems are typified by the Accounting Department releasing the relevant financials one time per month, to the business managers.

System Financial Security

In at least one embodiment in accordance with the present invention, the system allows the accounting administrators to set up security masks. A security mask may specify for example:
"All Accounts that have office "SFD" in the GL Account
Or
"All Accounts that have "Insurance" as the Line of Business
Each segment can be masked individually. The masks are assembled and assigned to Security Roles. Each Role can have the mask either grant or deny access at 220. For example, the administrator may give the head of Insurance Sales a mask that includes all accounts having Insurance as the Line of Business. The administrator may then create a mask that specifies all accounts that are related to payroll expense. If the administrator creates a roll where he grants the Insurance mask and denies the payroll mask, and assigns the head of Insurance Sales to that role, then that person can see everything related to Insurance, but he cannot see the individual details of payroll. The system will provide that the employee would have been able to see all of the Insurance details, except for the payroll details relating to insurance. In this case, the system will show the aggregate payroll squashed down to a single "security" line. This way the employee can see a true Profit and Loss for his line of business, but not see the details of the payroll data.

Defining Security Masks

As mentioned above, each security mask may be made up of exactly one of each type of segment. Wildcards can also be used, (e.g. the character string ****), to indicate that all of that type of segment is allowed to pass the security mask. The Natural Account Segment may also have a special type of mask at the type of account, Assets, Liabilities, Owner Equity, Revenue, and Expense.

Figure 20:
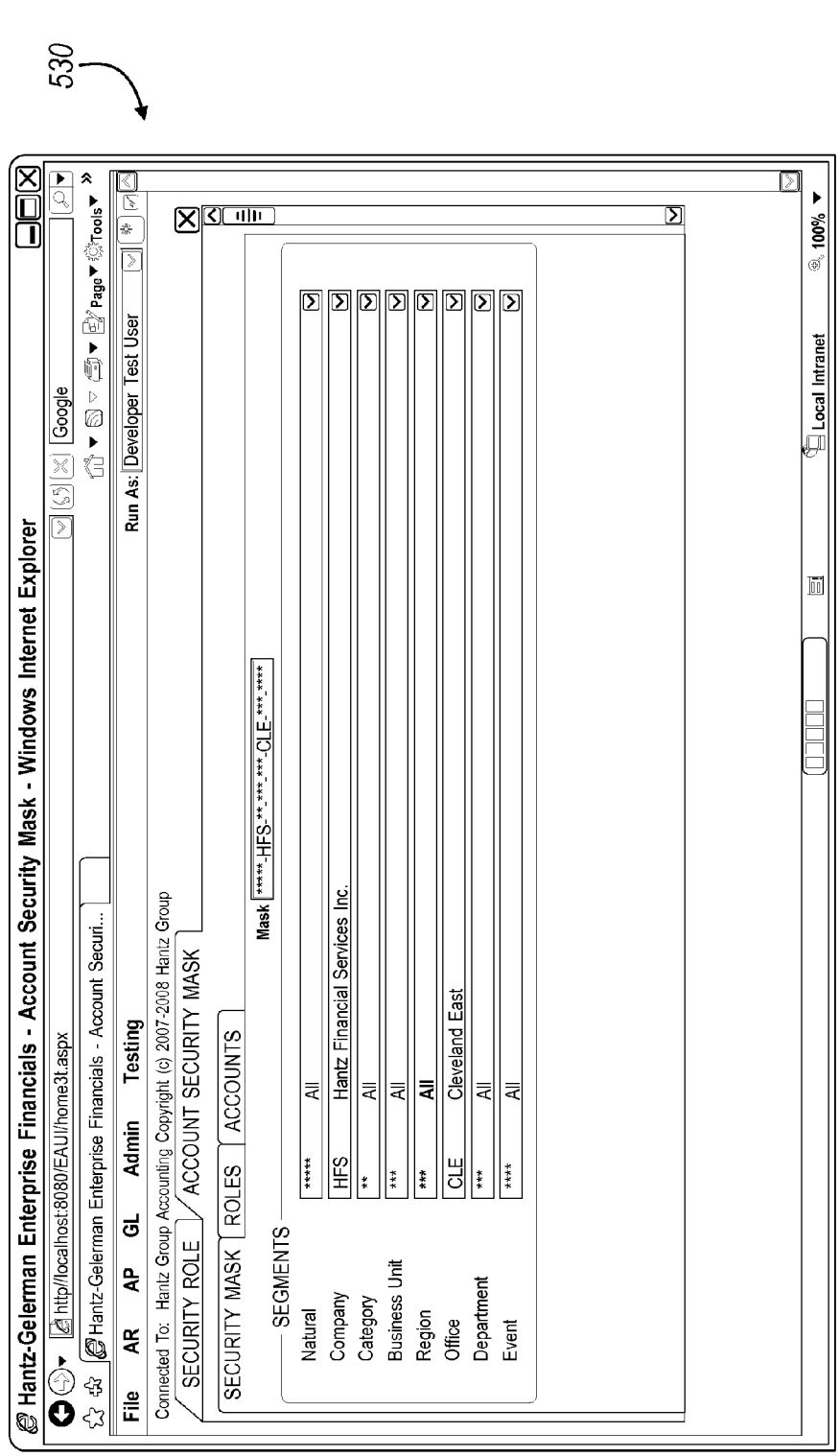
FIG. 20 is a third screen shot of one example of the present invention.

Referring also to FIG. 20 is an example of a screen shot (screen shot #3 at 530) showing a Security Mask definition for a company. As shown, the mask that would scope all GL Accounts that are for the HFS company, and in the CLE office.

Figure 21:
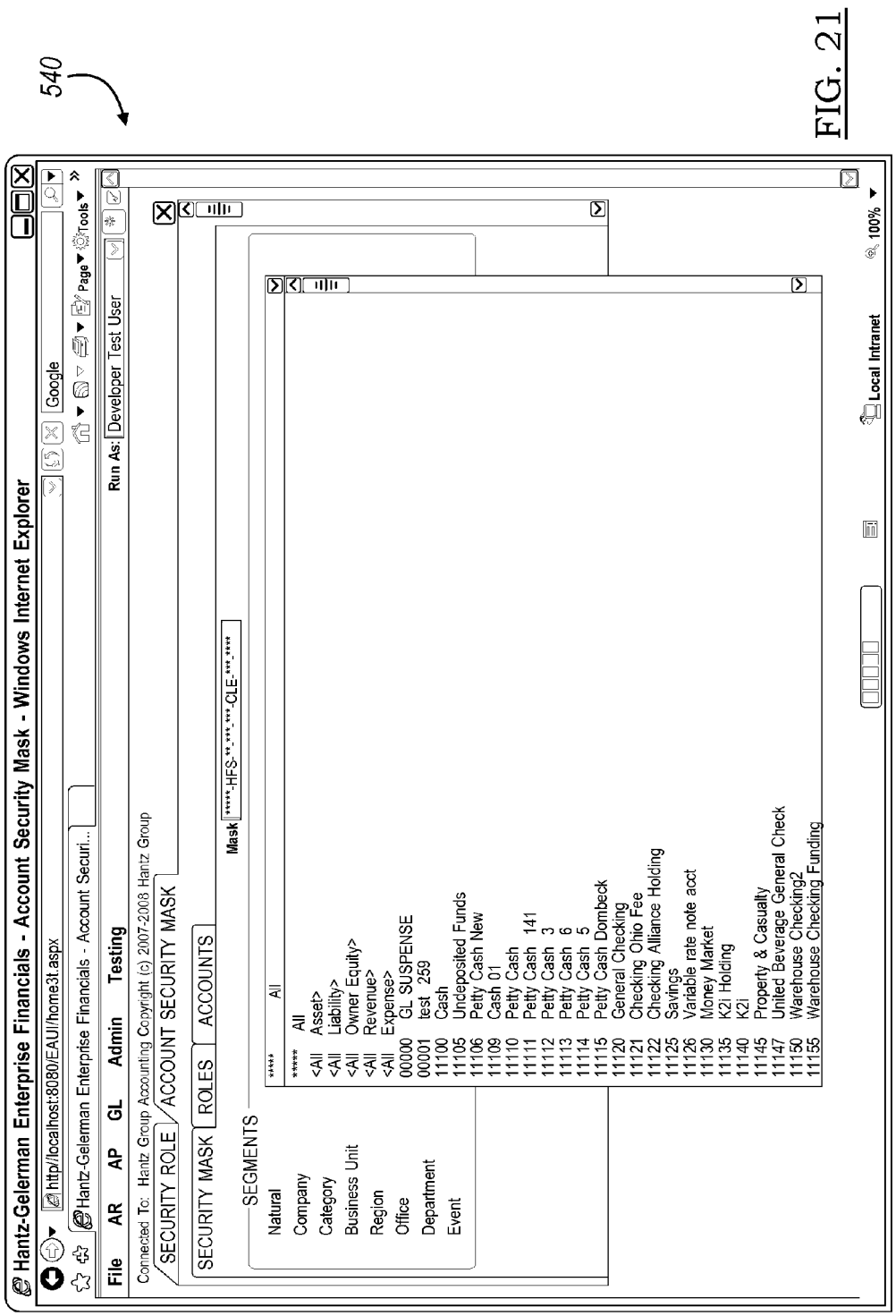
FIG. 21 is a fourth screen shot of an example of the present invention.

Referring also to FIG. 21 is an example of a screen shot (screen shot #4 at 540) showing the options for a Natural Segment mask. Note the 5 special types of Natural Segment masks starting with <All near the top of the list. The rest of the Natural Segment options are a typical chart of accounts for a company. The screen shot is only showing the first few Asset Natural Account Segments, but all of the Natural Account Segments are in the list.

An Example of How the System Uses Security Masks

The system has extensive search screens allowing the user to search for entries in the accounting system. A user can search for Invoices, Vouchers, AP Checks, Invoices, AR Checks, AR Check Deposits, Clients, Vendors, Journals and/or etc. Each time a user tries to search for an entry, the system may limit the user to seeing the entry if that entry has anything to do with the user. This means when searching, the exact same criteria will yield different results based on who the user is that is doing the search. By default, the user is the person logged in, but the logged in user can choose to Run As someone else, if the other person has a sub set of accounts that he can see. The Run As feature is described in further detail below.

Figure 22:
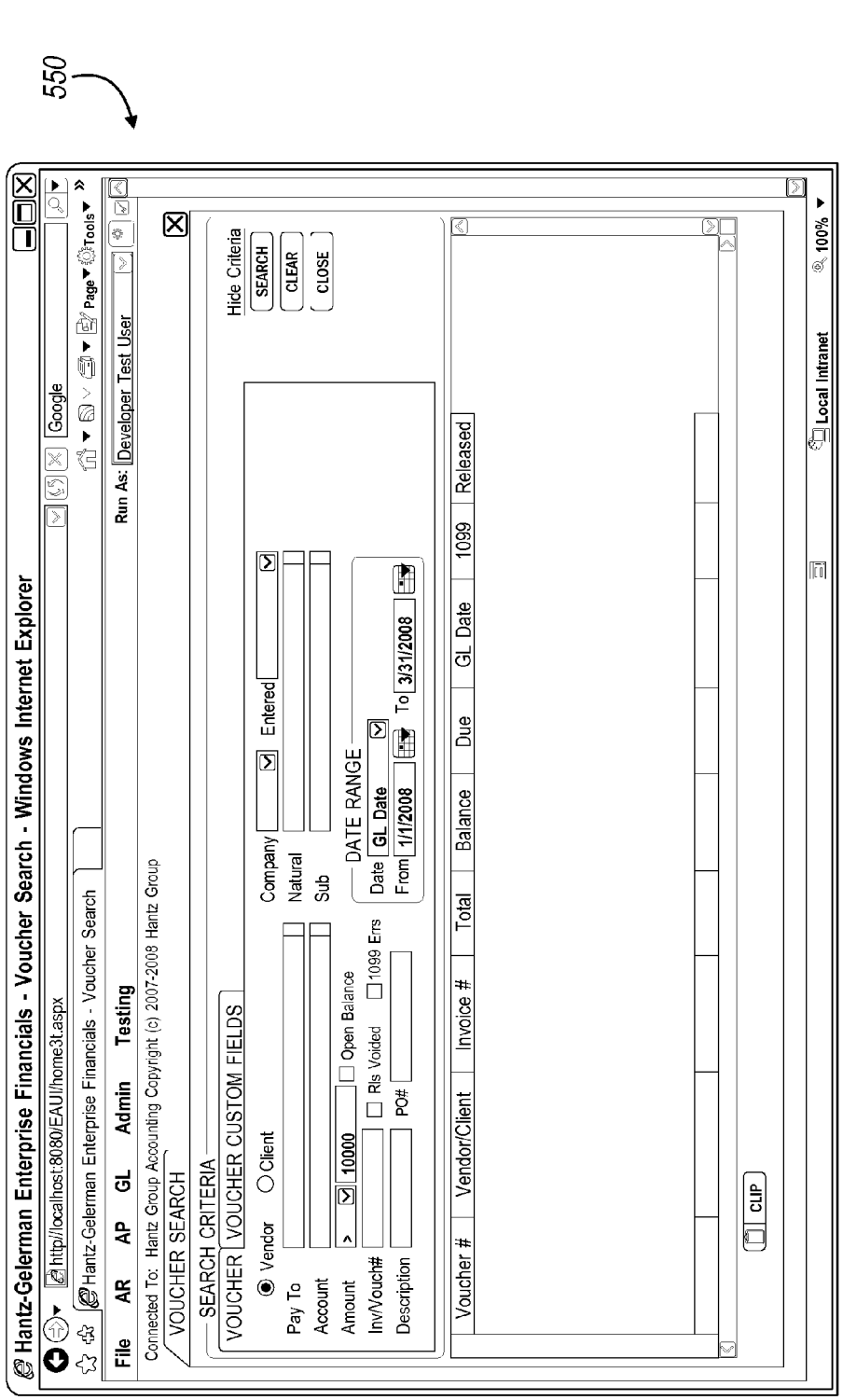
FIG. 22 is a fifth screen shot of one example of the present invention.

For example, assume a Search was made for Vouchers with a value greater than $10,000, with a GL Date in the $1^{st}$ quarter of 2008. The search screen before the search may look like screen shot #5 at 550 shown in FIG. 22.

In this example, if the head person of Insurance Sales is running the search, then the system will return Vouchers where the total amount of the Voucher is >10,000 and the GL Date is in the $1^{st}$ quarter of 2008, and the Voucher has at least detail one line using an account that has Insurance as the line of business.

If the SFD office manager ran the search, that person would see Vouchers that had an amount >10,000, and the GL Date was in the $1^{st}$ quarter of 2008, and the Voucher had at least one detail line using the SFD office.

This type of algorithm is used throughout the system to preferably make sure that the person only sees items relevant to them.

In the example above, if the end user does the search, and then drills into the data, if the Voucher has other detail lines that the end user cannot see, either because they are specifically denied, or they are not granted to him, then the system will aggregate those lines down to a single security line per company. This way, the end user still sees the whole Voucher Amount, but not the sensitive detail information.

Security Details of an Embodiment of the System

In at least one embodiment of the present invention, when a user logs into the system, the system goes through all Roles that the user is a member of. For each Role that the user is a member of, the system loops through all of the "deny" Security Masks for that role. The system records all of the accounts that are denied access by the mask. For each Role that the user is a member of, the system loops through all of the "grant" Security Masks for that role. The system grants access to the accounts that satisfy the mask if they were not previously denied above.

Each time a search is made in the system, the system may only include entries where at least one account used in the entry is available to the end user. When opening an item (drilling), the system looks at each detail line. If the account of the detail line is not granted to the user, then the system aggregates that detail line by company into a security detail line. This preferably blocks the details from the end user. When the end user is entering new items, such as new Vouchers or Invoices, the system only shows the end user accounts that user can see. This preferably prevents the head of an office from entering a voucher expense for a different office.

RunAs Security of the System

In at least one embodiment of the present invention, when logging in, the system identifies all other users in the system that are in security roles such that the accounts they can see are a proper sub-set of the accounts the person logging in can see. For example, a Regional Manager should be able to see all of the accounts of the offices in his region. The individual office managers should have security that is a sub set of the Regional manager. This means the system will allow the Regional Manager to Run As the office manager. This way, when the Regional Manager calls the Office Manager to discuss financial activity, the two people can both view identical reports and screens. It also allows an administrator to test the security, to see what a person can see. When running as someone else, the system even limits what accounts can be entered, based on the other person's security masks. When running as someone else, the system still stores the original person as the creator or editor of an item, so the audit trail is still accurate.

System Financial Reporting

Overview

Figure 1:
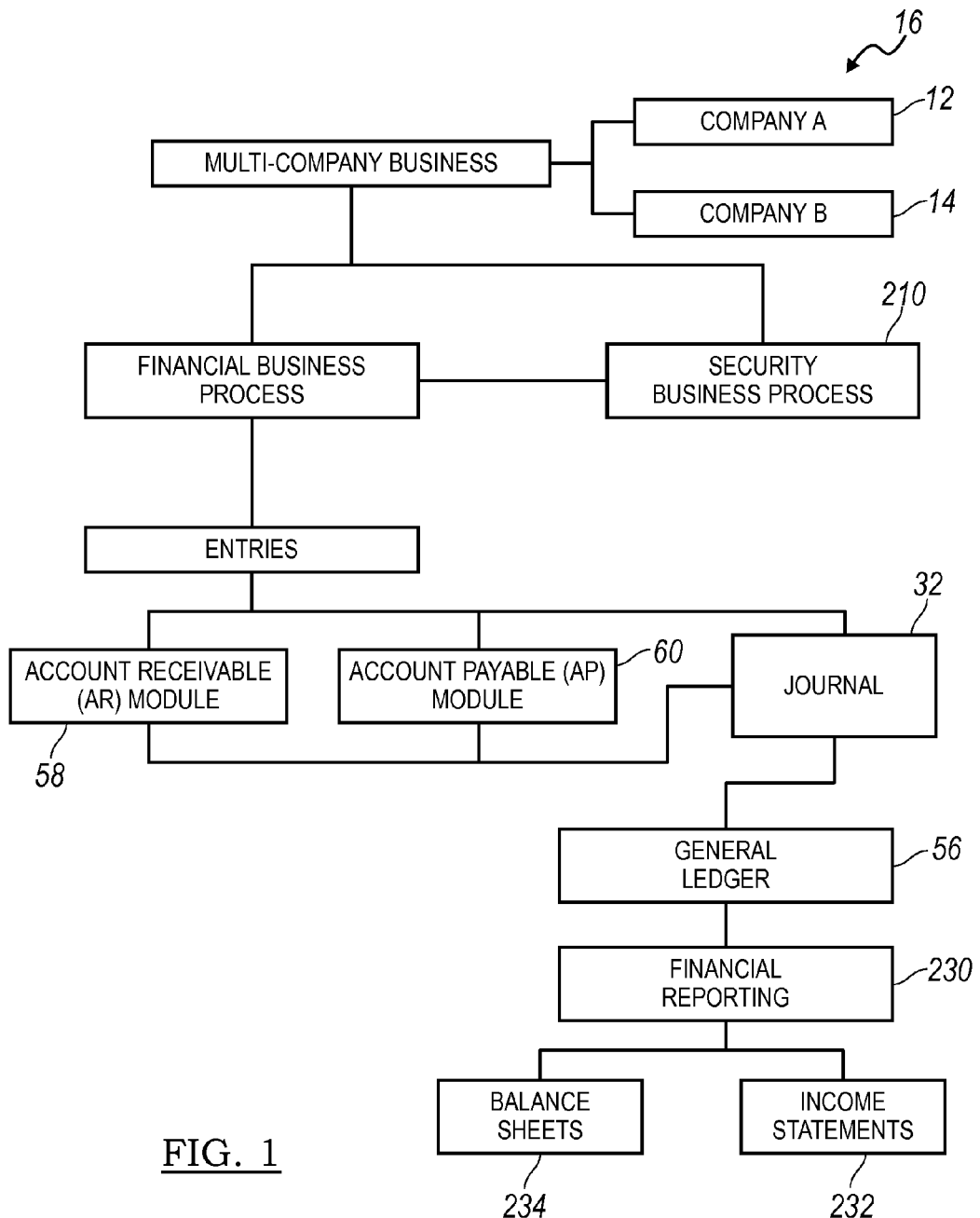
FIG. 1 is a flow chart of an accounting system for a multi-company business in accordance with an example of the present invention.
Figure 16:
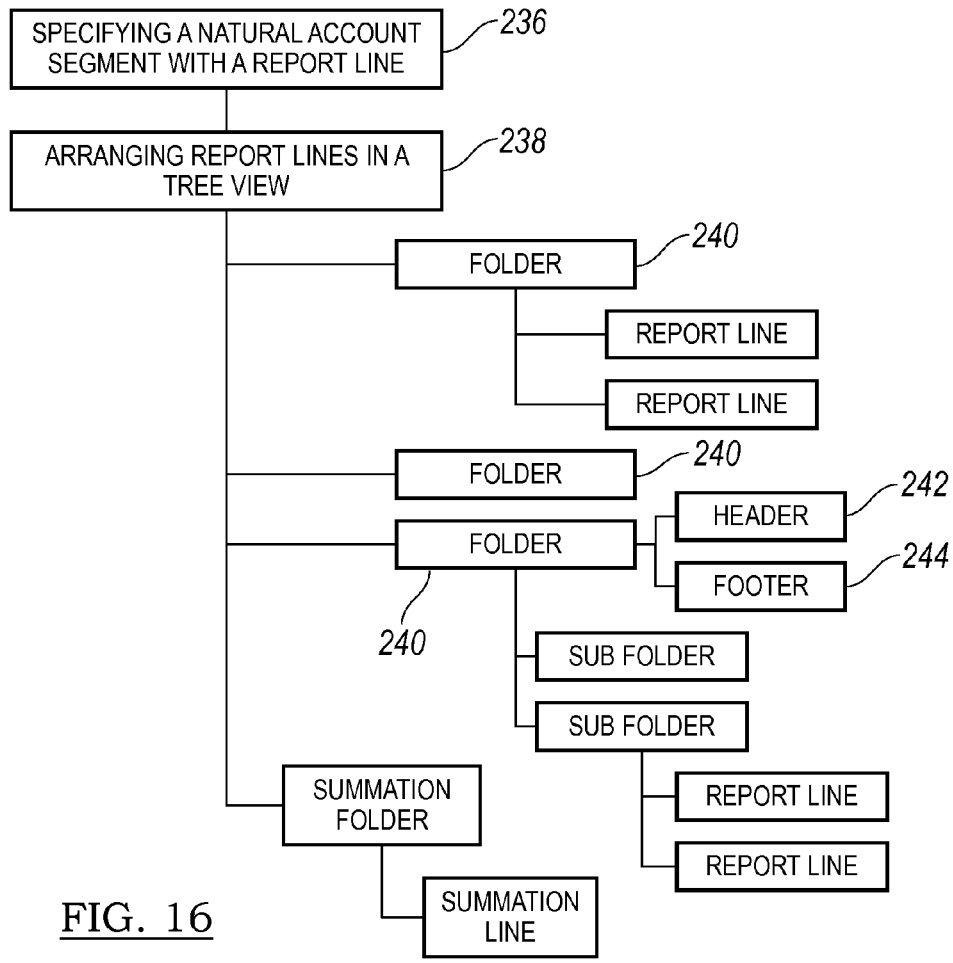
FIG. 16 is a flow chart of a method for Financial Reporting using a multi-company accounting system in accordance with one example of the present invention.
Figure 17:
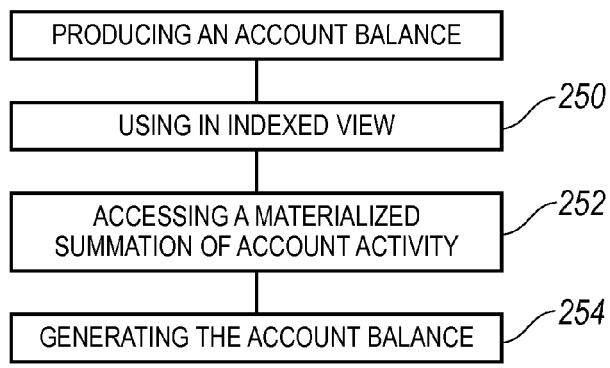
FIG. 17 is a flow chart of a method for producing an account balance using a multi-company accounting system in accordance with another example of the present invention.

With reference to FIGS. 1 and 16 in at least one embodiment, the system uses a very unique, and novel process for Financial Reporting at 230. This new process may be faster, more robust, easier to administer, more efficient use of network bandwidth, and more powerful than existing reporting methodologies. Financial Reporting means generating an Income Statement at 232 and/or Balance Sheet 234 from the General Ledger 56.

The Need for Financial Reporting

Companies often need to report Income Statements or Balance Sheets for a variety of reasons. Financial reports are used for Audits, for managing the firm at a global level, and for managing the firm at a smaller level, such as for example, a Region, Office, Department, or Line of Business (e.g. Business Segment). Although the bottom line results (net income) are the same, the formatting and grouping of the data (what rows are shown) are different for each reporting need.

Existing Accounting System Problems

Existing systems can create custom formats for reporting. The problem is in how they go about doing it. In existing systems, each line of the report is defined by a list of Natural Account Segments, or a range of Natural Account Segments. Total Lines are defined by specifying which detail lines should be totaled. This process creates a number of problems, such as for example, the following:
- When new Accounts are added, if they are not specified in the report definition (not in a range of Natural Account Segments), then the Accounting activity (GL Activity) for those accounts will not be on the report.
- If a new detail row is added, and the administrator forgets to update the summary row definition, then the sum will not add to the detail rows above.
- Existing systems can report on Sub Account Detail, but only if the sub account is defined in the report definition. For example, if you have a Region such as Lower Michigan, and several offices, such as Southfield, Ann Arbor, and Detroit, you must specify each line on the report. If you later open an office in another city in the Lower Michigan Region, such as Bloomfield, the report will not pick up the new data until the administrator updates the report definition.
- Existing systems also either do not drill to detail, or if they drill, they do it inefficiently, and only partially. Some existing systems do not drill at all. You can see the results on the report, but you cannot drill to find out where the information came from.
- Some existing systems take a data feed from the General Ledger of the Accounting system. These systems then get individual report line data as separate statements as defined in the report definition above. They return all of the data to the report writer and the report writer sums the rows and displays the one row that was asked for. When the user drills on that row, the report writer already has the data and expands the row to show the GL Detail. This presents at least two distinct problems:
  - Many rows are returned from the server eating up network bandwidth. A General Ledger may have millions of rows of information. One line of the report may be the result of thousands of rows of information. It is very inefficient to return these rows, and then have the report writer aggregate the information into a single row. Also the user will not drill to every row on the report, so the server is returning rows that will never be looked at.
  - The user may want to drill beyond the General Ledger Detail. If the row from the GL came from an AR Check, the user may want to drill to the AR check but will not be able to.
- It is believed that no existing system has the concept of security for some of the data. A company may have an executive that can see the income statement for a line of business, but not be allowed to see the sensitive payroll detail.
- An accountant may want an income line above the bottom line. For example, the accountant may want "income before extraordinary expense", and then list the expense, then the net income. The problem is that the accountant may not want to print the "income before extraordinary expense" if there was no extraordinary expense. Existing systems cannot print special lines based on the existence of data in other lines.
- Many financial reporting systems can only report on information in one company or on all companies at once. If an Accounting system is set up with 10 companies, the system cannot report on a selection of companies.
- Existing systems cannot report on any combination of business segments. For example, a Line of Business manager cannot report on his line of business as generated from a small selection of offices.

Financial Reporting Process via the System

In at least one embodiment of the present invention, the system can create multiple formats for Financial Statements. Preferably, the system enables the reports to be faster, more robust to changes, easier to administer, more efficient use of network bandwidth, and more powerful than existing systems and methods.

In one example, the system uses the following steps comprising:
1) Recognizes if an account is not defined in a report definition. The system will add the account in an appropriate place on the report. This keeps the financial reports valid.
2) Automatically adds summary lines guaranteeing accuracy.

3) The system may add sub detail lines at any level, without specifying the segments. For example, an accountant may want to break out the telephone expense by office. The accountant would want all of the offices to be included, even if that office did not exist when the report was created. The accountant may also want to show all offices, even if they had no telephone expense, or he may want to show only offices with telephone expenses incurred.
4) The system does the report line aggregates at the server and only returns what information is necessary to print the report. No extra rows of data are returned, preserving network bandwidth. Each row is tagged with information that can be used to drill to the next level of detail.
5) When drilling to the General Ledger, a new round trip request is made to the server to get the information. The system includes enough information with each line on the report to get the detail information in these drill queries.
6) The system can drill to any level of detail. For example, the system can drill from the income statement to the General Ledger, and then drill from the General Ledger to the AP Voucher, then drill from the AP Voucher to the check that paid the Voucher, and then drill to an image of the check.
7) The system can conditionally print special income, or revenue to this point, or expense to this point based on the existence of data that would cause the line to have meaningful information. The system can suppress a special line if it would not be needed.
8) The system can aggregate sensitive information, such as payroll information, into Security lines. The user still sees a complete Profit and Loss (P&L), but cannot see or drill to secured information.
9) The system can report on any Business Segment. This means a Regional Manager or a Line of Business Manager can report on all of their business, even if their business cuts across companies.
10) The system can generate a report on any combination of Business Segments. For example, any combination of the way money is tracked can be entered into the criteria of the report. A Line of Business Manager can run a report on his activity across a selection of offices, or any other combination thereof.
11) The system can produce a simple income statement just based on the Natural Account Segment setup. In this case no grouping is needed.

An Embodiment of the System's Financial Reporting Setup Technical Details

A report setup specifies the Natural Accounts for each report line at 236. The system uses a novel way of grouping the lines. Instead of making the end user specify what lines will be added together to make summary lines, the system uses an intuitive drag and drop tree view to group the lines at 238. Each folder 240 of the tree view specifies a level of grouping. The grouping can be arbitrarily deep, just like the folders in a computer for storing files. Each level can optionally put a heading at 242 or footer at 244 with a sub total. Root level folders at can also have Income, or Revenue or Expense totals before or after. The totals can be told to not print if the contents of the folder (e.g. lines of accounting activity) are empty when the report is run. Provided below are some examples for illustrating the foregoing description.

Assigning Natural Accounts to a report lines, the tooltip (e.g. box) shows the meaning of the natural account numbers when the mouse hovers over the accounts. Each line here will become a report line in the tree view shown in FIG. 23 as screen shot #6 at 560.

Figure 24:
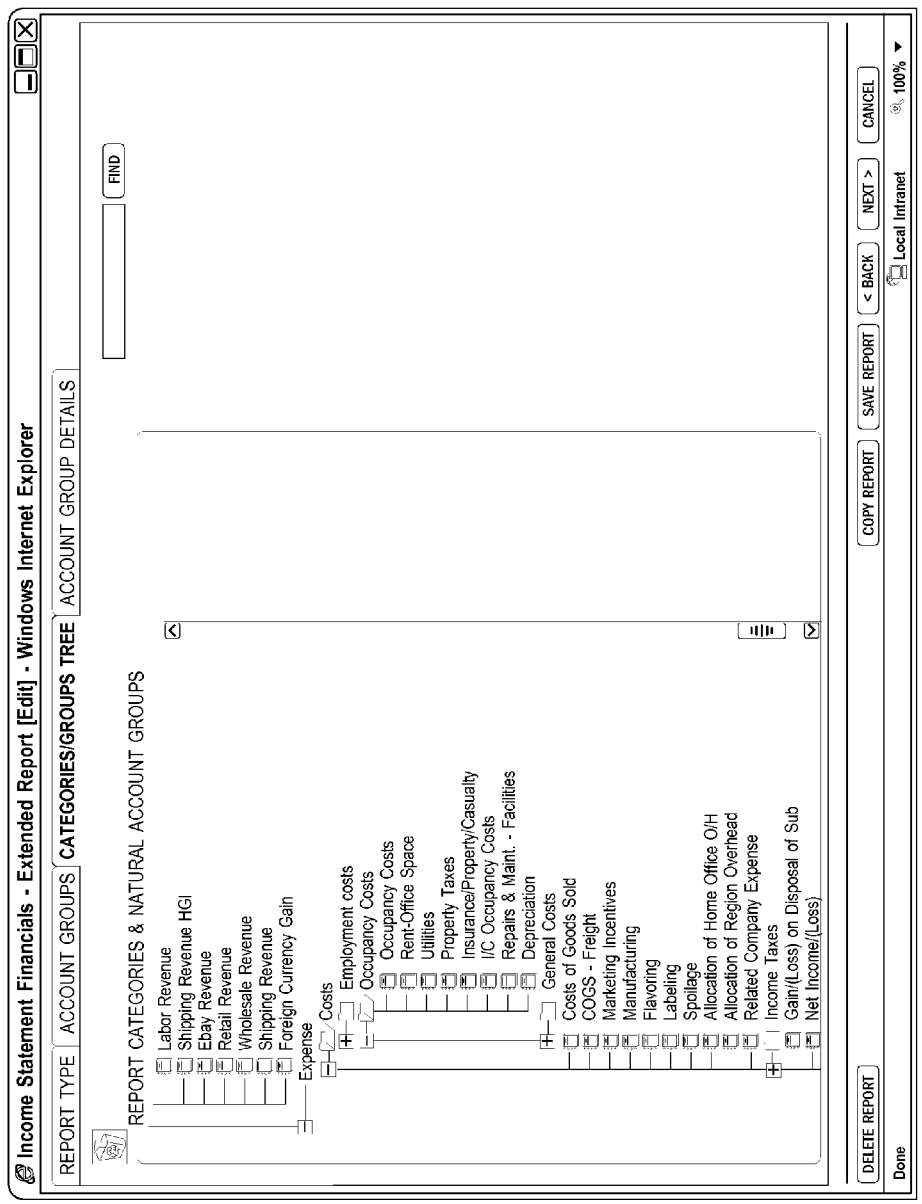
FIG. 24 is a seventh screen shot of yet another example of the present invention.

Referring to FIG. 24 is a screen shot (screen shot #7 at 570) illustrates an example of the novel use of a tree view to group the report lines. Further details will be described of the Costs folder and the Gain/Loss on Disposal of Sub in the next 2 screen shots.

Each folder is a grouping level. The groups can have optional headers and summary footers.

Figure 25:
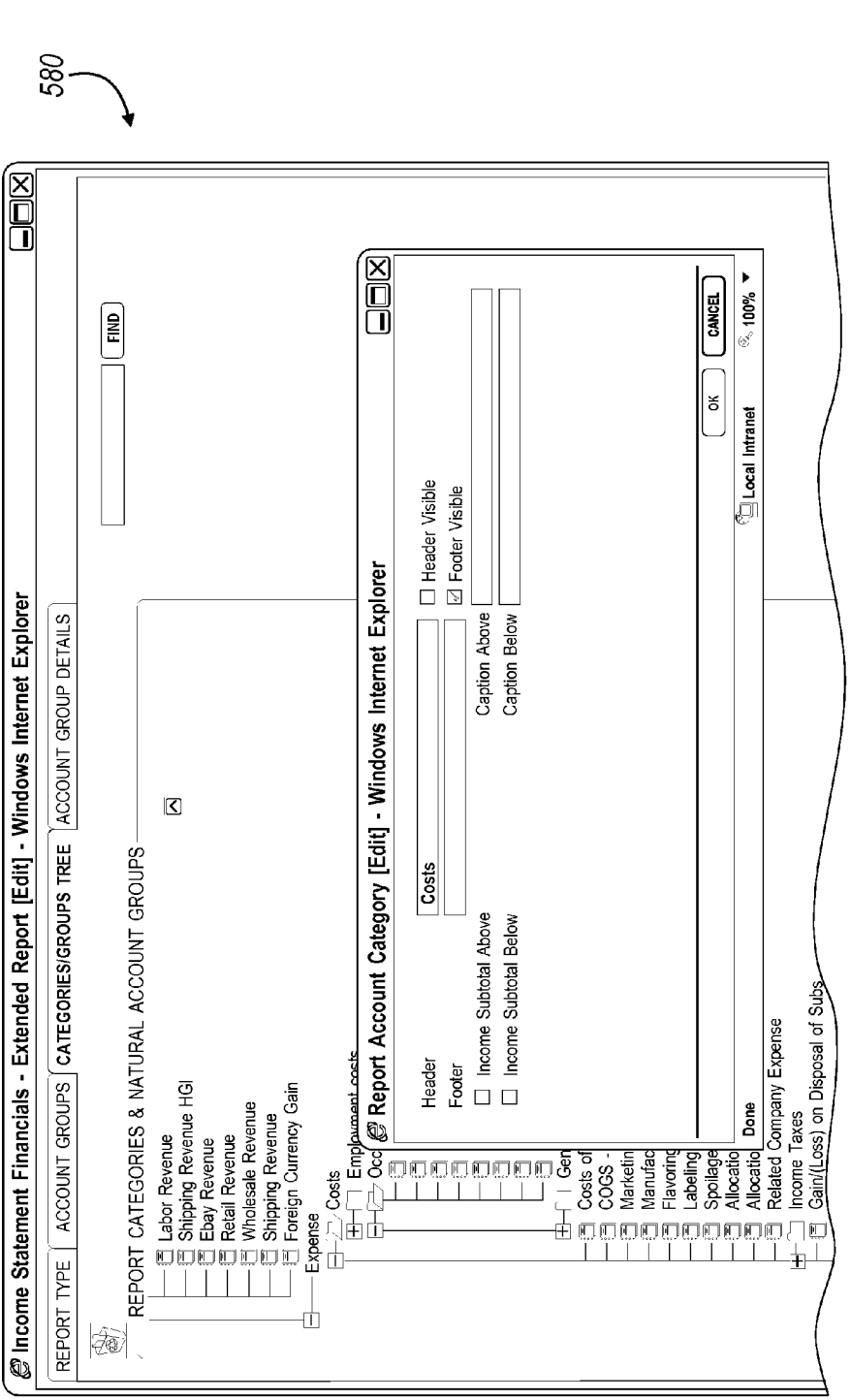
FIG. 25 is an eighth screen shot of an example of the present invention.

Referring to FIG. 25 is a screen shot (screen shot #8 at 580) after right clicking the Costs folder and selecting Properties.

The properties dialog allows optional Income Sub Totals above or below, and optional Headers and Footers. The Footer will automatically sum the details within the folder. The system will automatically use the Header Text for the caption above and below, if the header or footer is visible, and the caption is not overridden by the caption options shown.

Figure 26:
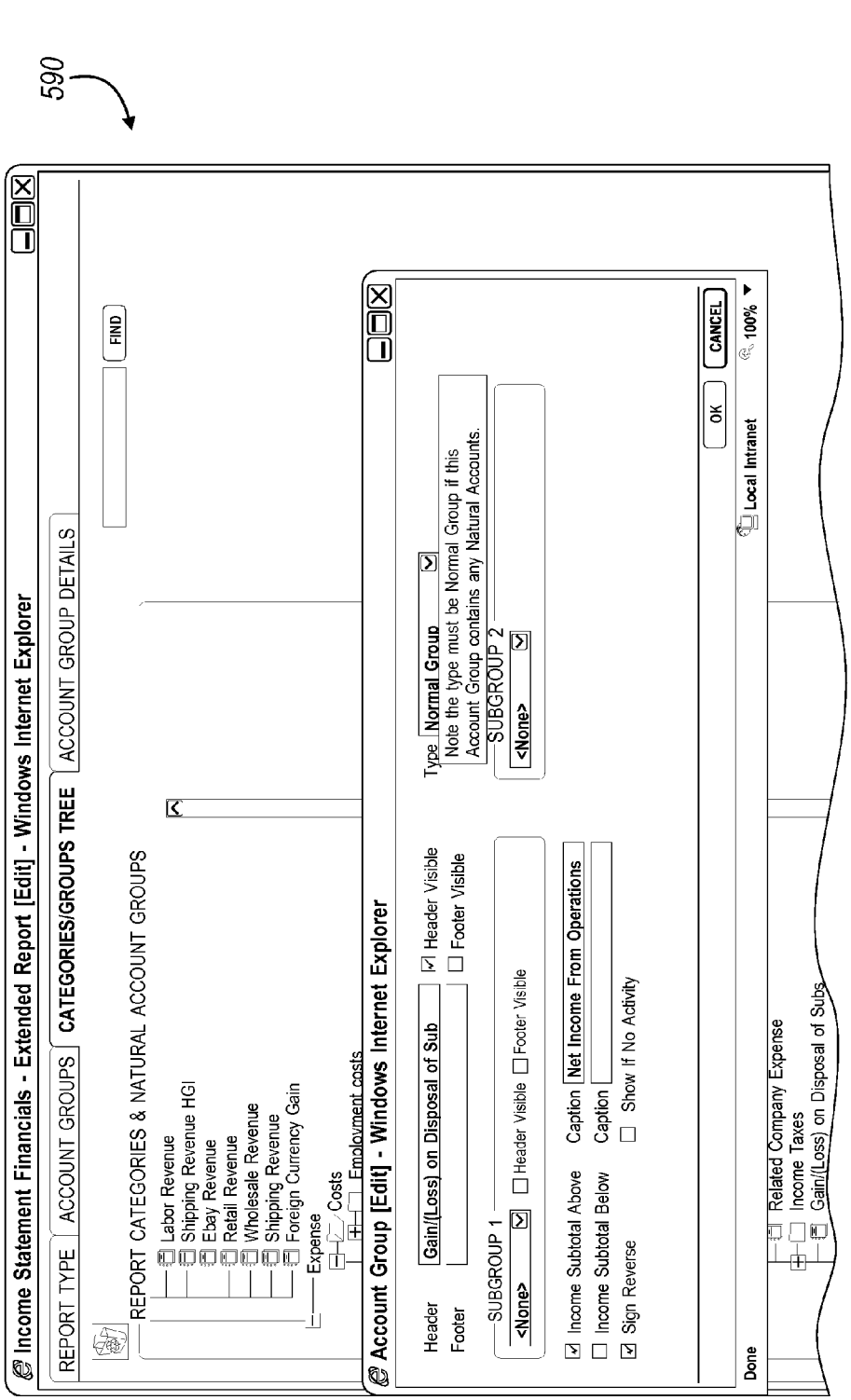
FIG. 26 is a ninth screen shot of another example of the present invention.

Referring to FIG. 26 is a screen shot #9 at 590, the Income Taxes folder, which is illustrated in screen shot #6 of FIG. 23, is the Gain/Loss on Disposal of Sub. This is a special line that the person using the report may not want to see if there was no Disposal of a sub company during the time frame. If there was a special disposal, the user of the report would want to see Net Income from Operations before this special event. The system preferably allows all of these options. Here is screen shot (screen shot #9 at 590) of the properties of the line labeled "Gain/Loss on Disposal of Sub".

It is apparent that if there is no activity (no sub company was disposed), the system would not bring the Income Subtotal "Net Income from Operations" above. The line would not be needed. Also, although not used here, it does show that each report line can be automatically broken down by 2 additional levels. The levels are the Sub Group 1 and Sub Group 2 shown in screen shot #9 at 590. For example, if this was a Telephone expense, the accountant may want Sub Group 1 to be Region and Sub Group 2 to be office. The report would automatically give drillable numbers for each office within each region.

An Embodiment of the System's Financial Reporting Income Statement Criteria

Specification

Technical details regarding the Income Statement in accordance with at least one embodiment of the present invention are provided. Security is used to limit what an end user can see. If a user can only see one Region, or can only see a set of Offices, then he will only be presented with those choices for the report criteria.

Figure 27:
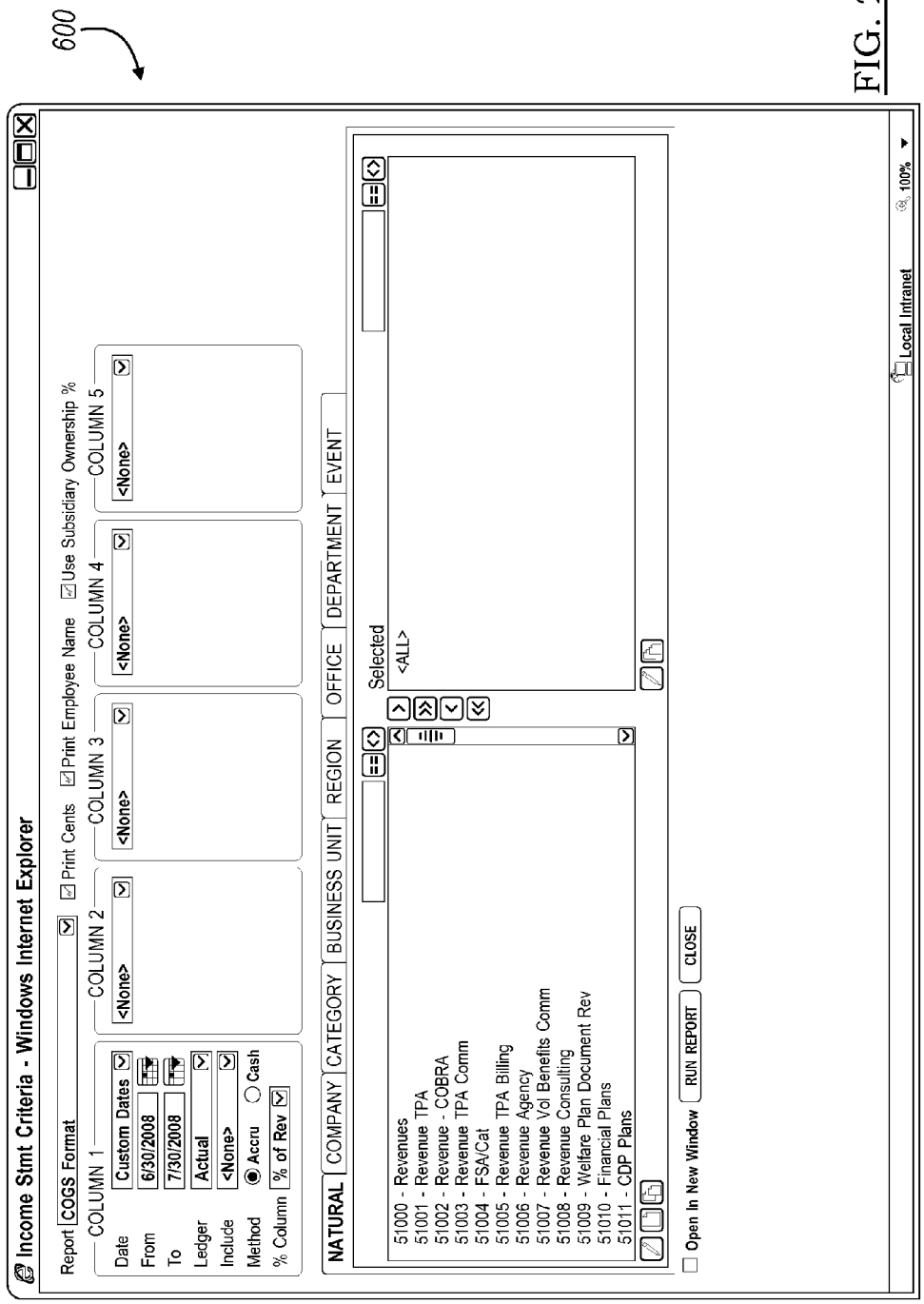
FIG. 27 is a tenth screen shot of yet another example of the present invention.

Referring to FIG. 27 is an example of the Income Statement Report Criteria screen (screen shot #10 at 600).

Each Business Segment can have any number of segments selected for the report. The system will figure out the accounting activity that satisfies the selections made by the user. In this example, the segments defined for use by the company are: Natural Account, Company, Category, Business Unit, Region, Office, Department, and Event. This means that each dollar that flows through the company can be tracked by these segments. The screen shot (screen shot #10 at 600) is showing the first few Revenue Accounts for the Natural Account Segment. Each tab has a list of available options. The end user makes a selection by moving the segments to the right "Selected" tab.

In one example, an income statement can have up to 5 columns of data for example, representing different time periods, or additions or subtractions of two previous columns. The additions or subtractions can combine or eliminate different General Ledger entries.

An Embodiment of the System's Report Processing Technical Details

When the end user wants to see the Income Statement by pressing Run Report, the system in at least one embodiment processes the report using the following process comprising:
This procedure works on either:
  The Natural Income Statement (Revenue and Expense by Natural SegmentID), Or
  On a custom Income Statement using the Tree View described above. ReportGroupBys are the lines in the Tree View described above. These group the Natural Account Segments into lines on the report (Detail Level 0).
ReportCategories (The folders of the tree view) form the hierarchy of the report Detail Level (−1, −2, −3 . . . ).
A ReportGroupBy can also be broken down to two further levels of detail (Detail Level 1 and 2) by some Segment Definition such as Region, Office, Event, and/or etc. These are the Sub Group 1 and Sub Group 2 mentioned above with the lines in the tree view.

The process comprises first getting the Raw Data for each column (time period) into 5 separate temporary tables. A Full Outer Join among the five tables creates another level of Raw Data with the five columns combined. A Full Outer Join means that if some account was used in one column (one time period) and it was not used in another column (another time period), the system will put place holders in the column that did not have the activity, so all of the activity will line up when reading across the report.

The Raw Data also uses Segment Mask Security to aggregate rows to a single security row, or a security row per natural segment based on the employee run as for the report. This means if the person running the report, or more specifically, the person chosen as the Run As person, does not have security to see sensitive data, such as payroll details, the system will aggregate the data into a single security line, and not allow drilling to the detail for that line.

After the Raw Data (e.g. report lines), and any detail level 1 or 2 is done, then applying the Report Categories is started. The Report Categories are the grouping headers and sub total footers. These were represented by the folders in the report definition tree view. The Report Categories are nested with a header and a footer. The Final Position is based on the entire path to an item.

For example, if a top level Report Category (ParentReportCategoryID=null) is Occupancy Costs, and its position is 60000, it may contain other Report Categories such as Rent and Utilities. If Rent is position 10 and Utilities is position 20 and if a ReportGroupBy Line is Electric with a position of 15 and a ReportCategory parent of Utilities, the FinalPosition of Electric would be A60000B20C15.

Basically, positions are relevant at the level of siblings. In the case above, both Rent and Utilities would have a Detail Level of −1 and OccupancyCosts would have a Detail Level of −2. Electric, the ReportGroupBy would have a Detail Level of 0, as all Report Group By rows have.

In at least one embodiment, the stored procedure processing the report does the following activities comprising:
1) Verify the parameters of the report including:
   a) Will not allow any SQL Injection or invalid selections, such as for example, a date range where the "From" date is later than the "To" date.
2) Get the Accounts that will be used in the report based on user selection including:
   a) The report will get the accounts to use based on the selected segments; and
   b) based on the security of the Run As person. A person cannot see more than the security segment masks allow.
3) Fill in the Header Fields including:
   a) The report will have titles based on user selection. For example, each column will show its date range. The report will show what segments were selected, who ran the report, and/or etc.
4) Get the Raw Data for the five columns by @StartDate @EndDate @Normal0Cash1 @GLStandardBudgetTypeID including:
   a) Each column specifies the Start and End Date.
   b) Specifies if the column should be the normal Accrual or Cash General Ledger.
   c) Specifies which General Ledger to use. The default GL is the most used, but a column may use a Budget or Estimate General Ledger.
5) Create RawResults by Full Outer Join of RawData. This creates one row per GL Account.
6) Fill in the companies for the header of the report. The companies may use a Company Group, such as Consolidated Group.
   a) The system (also referred to as "HantzGelerman") is a Multi-Company system. A typical group of companies may have many individual accounting companies. If so, the administrators may want to have named bundles of companies. Some example would be Manufacturing Consolidation, which could have 5 manufacturing companies. If the end user chose those 5 companies, instead of listing them at the top of the report, "Manufacturing Consolidation" could just be listed.
7) Create temporary #Results table with Data for (#Accounts) accounts the end user can see, and SecurityLine aggregates by Natural Account Segment for accounts that the end user cannot see the details of based on security. This may be grouped further later, if the Run As user cannot see Natural Segments for Accounts that are denied. Results may only include Revenue and Expense Accounts, even if RGB specifies a Balance Sheet Account to be used as a note on the report.
8) Create #ResultsReturned, including:
   a) Create the Detail Level 0 Rows for Report lines (ReportGroupBys). This is the first time that the Natural Account is not specified for data on the row. The reason is that there is now 1 row per ReportGroupBy Row. The ReportGroupByRows were defined in the report setup to be a list of Natural Accounts Segments, so we are starting to group the data into the custom rows defined by the report format the end user desires.
9) For the simple Income Statement by Natural Accounts skip to step 12. Do steps 10 and 11 for the custom report formats defined by the tree view in the report administration screens.
10) Create the Detail Level 1 and Detail Level 2 rows for further Detail breakdown of Report Group By rows by any Business Segment Definition.
   a) This is the Sub Group 1 and Sub Group 2 described in the properties window of a line on the tree view.
11) Get the Accounts with Natural Account Segments not defined by this Report (no rows in ReportGroupBys_GLAccountNaturalSegments for this report).

a) This is the part that picks up new accounts not specified in the report format. The new accounts will still be put on the report making the data valid.
12) Create Footer Rows as needed for the Detail Level 1 and 2 Segment Definition breakdown of the Report Group By rows. First create the Detail Level 0 footers by transferring the numbers from the header to the new inserted footer.
13) Report Categories including:
a) Add in the headers and summary footers as specified by the folders of the report tree view definition.
14) Insert the Total Line Placeholders before doing the Final Position.
a) This is the special Income or Expense or Revenue lines, such as Income before sale of a subsidiary.
15) Calculate the FinalPosition using the Category Hierarchy.
a) The category hierarchy is the relative position of folders and Report Group by lines as specified in the report tree view definition.
16) Indentation including:
a) Add a small indentation to each folder level of the report. Same for Sub Group 1 and Sub Group 2.
17) Calculate the Revenue and Expense totals for the report.
18) Insert Income Sub totals.
19) Insert total lines.
20) Set the percents.
a) The report can set percents as percent changes from previous periods, or as percent of revenue.
21) Clean up and return results.

An Embodiment of the System's Account Balance

Overview

The accounting systems need a way of generating an account balance for each GL Account. Some systems can only generate a balance for an arbitrary period, usually 1 month. Many systems can generate a balance for any day. The systems that can only generate the balance for a month are typically older systems.

One problem is that the balance for an account is not stored in a database table that stores the account information. This is because the balance must be calculated for any day. The balance of an account is actually the summation of all activity from the beginning of the system to the end of the day requested. A typical General Ledger will have millions of rows in it. It would be very inefficient to add up every transaction from the beginning of time to the day requested each time a balance is required.

Balance Sheet Accounts such as Assets, Liabilities, and Owner Equity (excluding Current Earnings and Retained Earnings) are logically calculated by adding every transaction from the beginning of time. Current and Retained Earnings involve adding up to the total of all Revenue Accounts–all Expense Accounts for all activity from the beginning of time (e.g. beginning of the company) to the day requested. Retained Earnings is the part of the Income (Revenue−Expense) that was calculated from the beginning of time to the most recent year end. Current Earnings is the part of Income that was realized from the date requested backwards to the most recent year beginning date.

Revenue and Expense Account balances should be reset to 0 when a year closes. This is commonly referred to as closing a year. This means Income starts at 0 at the beginning of a new fiscal year.

Existing Systems Use Different Techniques to Generate a Balance

Some systems store the balance at the end of each accounting period. A period is usually 1 month. If a balance is needed on the $3^{rd}$ of a month, the system gets the ending balance at the end of the previous month, and adds activity for the $1^{st}$ 3 days of the current month.

This may be efficient, but it is not very robust. If something happens that causes the period ending balances to get out of balance, it would be difficult to detect. For example, if an accountant entered a journal entry with a GL Date 2 years in the past, to correct a problem, every month ending date from that time forward would have to be adjusted. Once detected, the system could recover by recalculating the period ending balances for each account for every period for all time. Basically, storing the month end balances is a violation of database theory because it is storing a value that can be calculated from other values in the database.

Some other systems store a monthly activity summation. Then, if the balance of $3^{rd}$ day of the current month is needed, the system reads the monthly activity for all months from the beginning of time to the last ending month before the date needed, and then it adds the activity for the 3 days of the month. This is also efficient, as there are at most 12 numbers to read for an account per year. Even if the system were 50 years old that would still only be 600 reads for the monthly activity, plus the number of days in the month needed. Although this is efficient, it is also susceptible to problems. This may be relatively more robust than the previous method, as each month has just its own activity, so if a change were made in the past, only one monthly activity number must be adjusted. However, the system can still get out of balance, and the out of balance condition may be difficult to detect. This approach also violates database theory, as activity sums are stored from data that could otherwise be calculated by other data in the system. Also, this method is slightly less efficient than the first method, because it must add up the monthly activity as opposed to just reading the last month balance.

Existing Systems Current Earnings

Existing Systems write the sum of Revenue−Expense to Current Earnings for each entry into the General Ledger. This is another area that violates database normalization. The Current Earnings can be calculated from the sum of Revenue−Expense. The issue is calculating Current Earnings efficiently.

Existing Systems Closing a Year

Closing a year means moving all of the year's revenue and expense to Retained Earnings. The Revenue and Expense accounts should start at 0.00 for the fiscal year. Most systems do this by writing year end closing entries to the General Ledger for the Income Statement (Revenue and Expense) accounts. They also move Current Earnings to Retained Earnings at year end.

An Embodiment of the System's Account Balance Process

In at least one embodiment in accordance with the present invention, the system does not redundantly store information in monthly period tables. This means the system does not violate database normalization rules, and the system does not get out of balance.

The system uses a virtual close for yearend close. This means that the accountant does not need to do a year end closing entry. Nothing specific is written to the database to close out the balances of Revenue and Expense accounts and to move Current Earnings to Retained Earnings.

Some of the main issues addressed by this at least one embodiment of the present invention are to (1) have fast efficient processing and (2) not violate any database normalization rules, so the system does not get out of balance.

In one example, the system and method of accounting does this by using the capability of the SQL database engine, available on the SQL Server 2000 for example, and using the new and novel approach described below. The description includes the Indexed Views (e.g Materialized Views) and the algorithm used to get the account balance.

The System Using Indexed Views

With reference to FIG. 16 in at least one embodiment of the present invention, the system uses an Indexed View to generate an account balance at 250. An Indexed View (or Materialized View) is a not an index and it is not a view, but is rather instructions to the database server to maintain summary information in tables (e.g. materialized summations) maintained completely by the server by Declarative Data Definition Language. Preferably, no code or SQL is written when manipulating the data, when inserting, updating or deleting data. The server automatically maintains the values that are declared to be maintained. When reading the Indexed View at 250 to generate the account balance at 254, the server will already have the answer ready. The server does not need to calculate the answer at the moment of the read, as it would have to for a regular View. It does take server processing to maintain an Indexed View, so incorrect use of an Indexed View can have negative consequences on system performance. The Indexed View definitions are preferably easy for the server to maintain in order to not make new Data insertions and changes and deletes slow.

The system can store information for accounts on an Accrual or Cash basis. It can also store information for multiple General Ledgers, such as the default, and budget and estimate General Ledgers.

In one embodiment, the system uses a total of four Indexed Views plus a balance function defined below to get the Account Balance of any account for any day. For example, the four indexed views are two for Cash and two for Accrual (or Normal) Accounting. The only difference between the two for Cash and two for Accrual Accounting is the limit of Cash or Normal for the Indexed Views.

For the Normal Accrual Indexed Views, the two Indexed Views are of yearly and daily activity. The yearly activity Indexed View calculates the yearly activity for the normal General Ledger for each calendar year. Fiscal years ending on dates other than December 31 will still work, but this view will not change. In one example, the code definition of the yearly activity indexed view is as follows:

```
CREATE VIEW [dbo].[IV_GLNormal_AccountYearlyActivity] WITH SCHEMABINDING
    AS
SELECT GL.GLAccountID
, YEAR(GL.GLDate) as YearOfGLDate
, J.GLStandardBudgetTypeID
, SUM(GL.Debit-GL.Credit) as SumOfDebitCredit
, COUNT_BIG(*) as CountBig
FROM dbo.GLGeneralLedger GL
INNER JOIN dbo.GLJournals J ON GL.GLJournalID = J.GLJournalID
WHERE GL.IsGLNormal = 1
GROUP BY GL.GLAccountID, YEAR(GLDate), J.GLStandardBudgetTypeID
CREATE    UNIQUE    CLUSTERED    INDEX
[IV_GLNormal_AccountYearlyActivity_GLAccountID_GLDate_GLStandardBudgetTypeID]
ON [dbo].[IV_GLNormal_AccountYearlyActivity]
(
    [GLAccountID] ASC,
    [YearOfGLDate] ASC,
    [GLStandardBudgetTypeID] ASC
)
```

As can be seen in the code definition, the Indexed View sums the Debit-Credit activity and groups it by Account, by Year, and by the General Ledger Type (Normal, Budget, Estimate etc. . . . ). This means that the database server will declaratively maintain the sum of yearly activity for each account. This way the system does not get out of balance. The data is automatically maintained at all times, and it does not have to be recalculated each time as a normal view would be.

The "CREATE UNIQUE CLUSTERED INDEX . . . " and the "SCHEMABINDING" syntax are used to make the server maintain the information at all times.

The other Indexed View for Normal Accrual is for daily activity. In one example, it has a code defined as:

```
CREATE VIEW [dbo].[IV_GLNormal_AccountDailyActivity] WITH SCHEMABINDING
    AS
SELECT GL.GLAccountID, GL.GLDate, J.GLStandardBudgetTypeID
,SUM(GL.Debit-GL.Credit) as SumOfDebitCredit
,SUM(GL.Debit) as SumOfDebit
,SUM(GL.Credit) as SumOfCredit
,COUNT_BIG(*) as CountBig
FROM dbo.GLGeneralLedger GL
INNER JOIN dbo.GLJournals J ON GL.GLJournalID = J.GLJournalID
WHERE GL.IsGLNormal = 1
GROUP BY GL.GLAccountID, GL.GLDate, J.GLStandardBudgetTypeID
CREATE    UNIQUE    CLUSTERED    INDEX
```

```
[IV_GLNormal_AccountDailyActivity_GLAccountID_GLDate_GLStandardBudgetTypeID]
ON [dbo].[IV_GLNormal_AccountDailyActivity]
(
    [GLAccountID] ASC,
    [GLDate] ASC,
    [GLStandardBudgetTypeID] ASC
)
```

The only difference in the Indexed View for Normal Accrual for daily activity versus for yearly activity is that the daily activity is grouped by GLDate instead of by YEAR of GLDate.

An Embodiment of the System's Account Balance Algorithm

In at least one embodiment of the present invention, the system has an algorithm that uses the Indexed Views above to calculate the account balance. Basically, if a balance is needed for Feb. 15, 2008, the algorithm will use the Yearly Indexed View to calculate the sum of activity for all years for the account from the beginning of time to Dec. 31, 2007. It will then add the daily activity from Jan. 1 to Feb. 15, 2008. This is extremely efficient. Even if the system were 50 years old, the database would just have to read 50 values for the past years, then add in whatever days had activity for the account (not every day will have activity (e.g. Saturdays, Sundays, and Holidays such as Christmas).

In at least one embodiment in accordance with the present invention, the algorithm is very robust and there is no violation of database theory. That is, no data is stored that can be calculated.

An example of the algorithm is described below in code form:

```
CREATE FUNCTION [dbo].[fnGLAccountBalance]
(
    -- Add the parameters for the function here
    @GLAccountID int
    ,@GLDate datetime
    ,@Normal0Cash1 bit
    ,@GLStandardBudgetTypeID int
    ,@Normal0StartOfDay1 bit
    ,@CurrentEarningsBaseGLDate datetime --usually null, and
    will use GLDate).
```

In this example, the system calculates a balance based on the Account, the GL Date, Normal or Cash, the GL to use (default, budget, estimate etc. . . . ), whether the user wants the balance at the beginning of the day or at the end of the day. For a Balance Sheet, the accountant typically wants the balance at the end of a day. If the accountant is running an income statement, he typically wants the starting balance to be the beginning of a day, plus the daily activity, and then the balance at the end of a day.

The Current Earnings Base GL Date is special. Usually Revenue or Expense accounts are zeroed out when the end of Fiscal year comes. This is referred to as closing a year. But, if the accountant wants to run an income statement across fiscal years, say from December 1 to January 31 (and your fiscal year ends on December 31), then he does not want to zero out the Revenue and Expense accounts for that report on December 31.

In one example, the GLAccountBalance Function performs the following comprising:

(1) If the Current Earnings Base GL Date is not defined, then set it to the GLDate.
(2) Get the Year of the GLDate.
(3) Get the $1^{st}$ day of the calendar year of the GL Date.
(4) Using the GLAccountID, get the Type of Account (Asset, Liability, Owner Equity, Revenue or Expense), the Natural Account Segment, and the Company Account Segment. If this is a Revenue or Expense Account, then it is an Income Statement Account, otherwise it is a Balance Sheet account. Income Statement accounts are normally zeroed at year end. Balance sheet accounts are typically not.
(5) If the Natural Segment is the special Current Earnings or Retained Earnings Accounts, or the type of Account is an Income Statement account, then:
   (a) Get the Calendar that is being used by the company in the company segment for determining the fiscal year end.
   (b) Get the last Fiscal Year End date that is less than the GLDate asked for. This will be the break point for the Retained Earnings/Current Earnings.
   (c) Set the Current Earnings date to 3 milliseconds more than the Retained earnings date. 3 milliseconds was used because that is the smallest increment for the database engine for the DateTime field type used.
(6) If the start of day is needed, then subtract 3 milliseconds from the GL Date asked for. This will really calculate the balance as of 11:59:59.997 of the previous day, which is the start of the next day.
(7) If the end user is asking for the Normal General Ledger, then use the Normal Indexed Views described above. If the Cash GL, then use the Cash Indexed Views.
(8) If the Account is the special Current Earnings Account
   (a) This must be the sum of Revenue−Expense for the year of the GL Date, going back to the beginning of the fiscal year.
   (b) Set SumOfPreviousYears to 0.00.
   (c) Calculate SumOfCurrentYear using the Daily Indexed View for the specific GL Account, and the GLDate between the start of the fiscal year and the GLDate asked for, using the GL Type asked for (e.g. default, budget, estimate, etc. . . . ). In one embodiment, a normal view or views are written over the Indexed Views to provide the Current Earnings.
(9) If the Account is the special Retained Earnings Account
   (a) This must be the sum of Revenue−Expense for the time before the most recent year end of the GL Date, going back to the beginning of time.
   (b) Set SumOfPreviousYears to sum of the activity from the yearly Indexed View. Look by GL Account, Sum for years before the last fiscal year end.
   (c) The fiscal year may not line up with the calendar year.
   (d) Calculate SumOfCurrentYear using the Daily Indexed View for the specific GL Account, and the GLDate between the start of the calendar year and the end of the fiscal year prior to the GLDate asked for, using the GL Type asked for (e.g. default, budget, estimate, etc. . . . ).
(10) If this is an income Statement Account, then:
  (a) This is the sum of account activity for the current year starting with the fiscal year beginning.
  (b) Set SumOfPreviousYears to 0.00
  (c) Calculate Sum of Current Year using the Daily Indexed View with GLDates between the CurrentEarnings Start Date and the GLDate asked for.
(11) If this is a balance sheet account, then:
  (a) This is the sum of account activity from the beginning of time.
  (b) Set SumOfPreviousYears to sum of Account Yearly activity using the Yearly Indexed View. Use no beginning date. Look for Years less than the Year of the GL Date asked for.
  (c) Calculate Sum of Current Year using the Daily Indexed View with GLDates between the First of the Year for the GLDate asked for and the GLDate asked for. In one embodiment, a normal view or views are written over the Indexed Views to provide the Retained Earnings.
(10) Store the SumOfPreviousYears+SumOfCurrentYear to an AccountBalance variable.

The Indexed Views described above calculate the Debits−Credits. This is good for Assets and Expenses. Liability, Owner Equity and Revenue grow on the Credit Side. Accordingly, the following steps are performed:
  (11) If the account type was Liability, Owner Equity or Revenue, then multiply the AccountBalance by −1.
  (12) Return the AccountBalance. This is the Balance of the Account.

Account Number Maintenance

Overview

Account Number maintenance may be used for either a computer implemented single or multi-company accounting system. In one embodiment, the system uses Account Numbers for security and reporting. The system allows Income Statements to be reported on by any Business Segment, or any Natural or Company Segment. Preferably, the data is kept clean and pertinent by using the correct Account Number when recording activity such as invoices, vouchers and/or journals.

The Problem

Through the normal course of business, it may be discovered that a certain Account was used incorrectly. For example, an office may have been assigned to an incorrect region. In typical accounting systems, once an entry (e.g. Account Number) is made into the General Ledger, the entry cannot be changed. Rather, accountants will do correcting journals to amend the incorrect entry. Correcting journals are often confusing especially when viewing financial reports. Moreover, correcting journals only affect the current accounting period while the data from previous accounting periods is still incorrect.

Overview Solution

In at least one embodiment of the present invention, the computer implemented accounting system allows multiple solutions to maintaining data cleanliness and pertinence.

Figure 28:
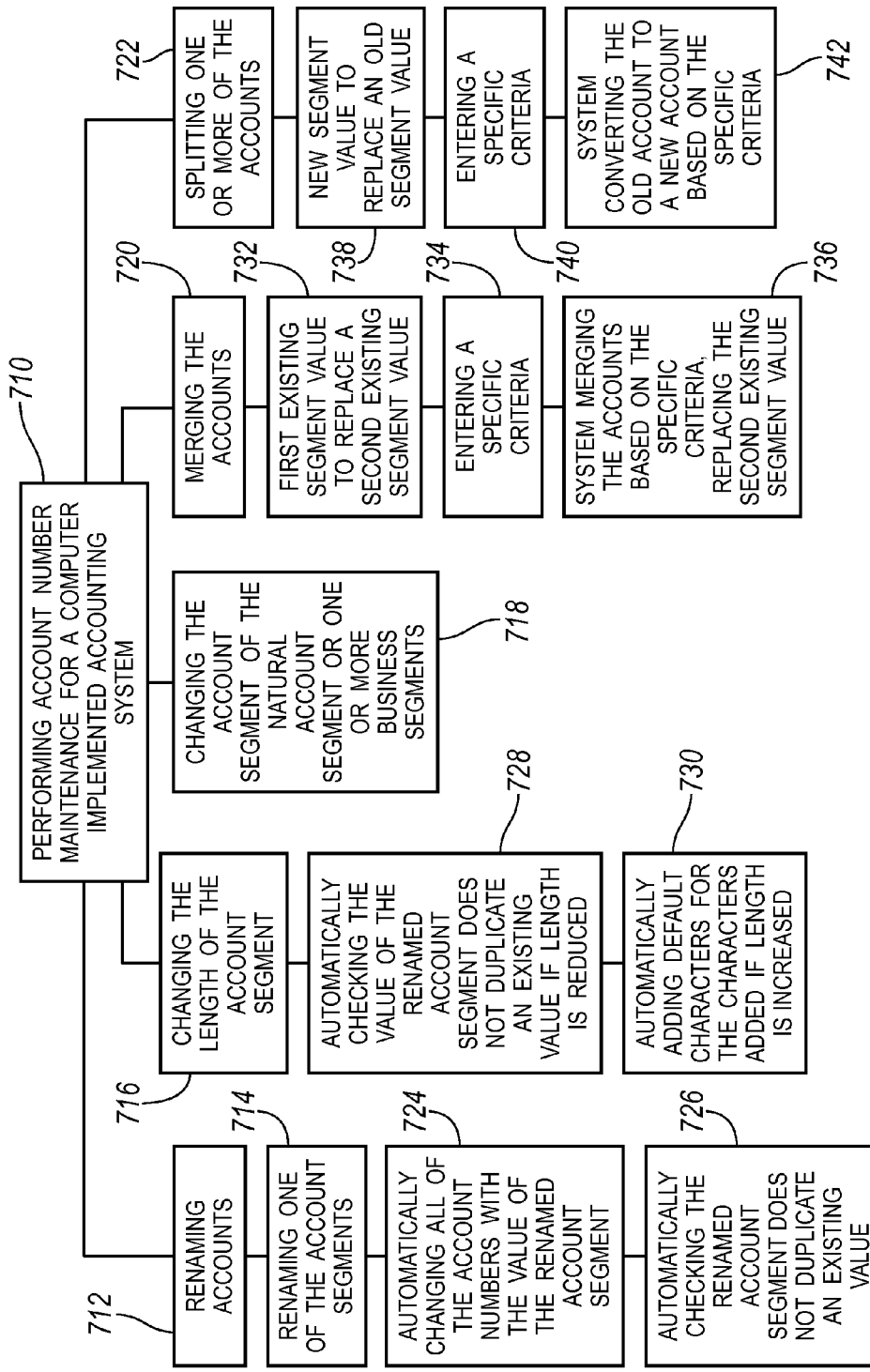
FIG. 28 is an operational flow diagram of a method for performing account number maintenance for a computer implemented accounting system in accordance with an example of the present invention.

Referring to FIG. 28, the system can perform one or more of the following for maintenance of Account Numbers at 710:
  1. Rename an Account at 712 by renaming an Account Segment at 714 of the Account.
    a. Including renaming a Natural Account Segment number, a Company Segment number, and/or any Business Segment number.
      i. In the case of a Natural Account Segment number, the system allows the Natural Account Segment to be changed between Revenue and Expense, or between Asset, Liability and Owner Equity.
      ii. The system also allows the Natural Account Segment to be changed from an Income Statement type Account (e.g. Revenue or Expense) to a Balance Sheet type Account (e.g. Asset, Liability, Owner Equity). This is possible because the system calculates the Current and Retained Earnings on demand by adding all Revenue and Expense activities.
  2. Changing the length of an Account Segment at 716.
  3. Changing an Account Segment at 718 used on an Account.
    a. Any or all of the Segments except for the Company Segment can be changed.
  4. Merging 2 different Accounts into 1 Account at 720.
  5. Splitting one Account into 2 different Accounts at 722.

Items 1-3 from above do not require a change to the General Ledger. Rather, these items change the definition of an Account that the General Ledger points to or references. However, items 4 and 5 do change the General Ledger, and this change is audited.

Renaming an Account Segment, Changing the Length of an Account Segment, or Changing an Account Segment Used on an Account In at least one embodiment of the present invention, performing Account Number maintenance by renaming an Account at 712 or changing the length of an Account Segment at 716 or changing an Account Segment at 718 used on an Account does not change the General Ledger. Rather, the General Ledger holds pointers (e.g. GLAccountID) to the Account, and the actual Account Number is not stored in the General Ledger. Each Account itself effectively points to a Natural Account Segment, a Company Segment, and one of each of the Business Segment defined.

Rename an Account Segment

Renaming an Account Segment at 712 can be done for any segment including the Natural Account Segment, the Company Segment, and any Business Segment. Renaming an Account Segment renames the segment number or the segment name that is displayed to the interface user. For example, a Business Segment may be renamed by renaming an office segment number from AAA to ARB, or renaming the segment name from "AnnArbor" to "Ann Arbor", which adds a space.

When renaming an account segment number or an account segment name, the system automatically checks at 726 to make sure that the interface user has not created a duplicate value within the same segment definition. For example, if both office segments AAA and ARB were already created, the system would not allow the interface user to rename the account segment AAA to ARB. Rather, the account segments AAA and ARB would preferably be combined together into one Account using Merge Accounts, which is discussed in more detail below.

Renaming a segment automatically changes the Account Number at 724 for all accounts that use the corresponding segment. This is because the Account Number is dynamically generated based on the segments that make up the Account. Renaming the segment will have an instant affect on all Account Numbers that use the segment because the Account Number display is created on demand by the system.

Change the Length of an Account Segment

Each segment of the Account Number has a specific defined length (e.g. number of digits or characters). For example, the Account Number may have a 5 digit Natural Account Segment, and a 3 character Company Segment, and a 2 character Business Region Segment, and a 3 character Business Office Segment. The system allows the interface user to change the length of any segment definition at 716.

If the length of a segment is to be increased (e.g. increasing the number of digits or characters), then the system adds a default character at 730 correspondingly to the end of each existing segment. For example, if a 3 character Business Office Segment is to be changed to a 4 character Business Office Segment, then the system will automatically add an underscore "_" to the end of each existing Business Office Segment number. The default character is definable for each segment. In one example, the default character for a Natural Account number is a zero "0" while the default character for the Company Segment and each Business Segment is an underscore "_". Other suitable default characters may also be used for any of the segments.

If the length of the segment is to be decreased or reduced (e.g. decreasing the number of digits or characters), then the system automatically checks at 728 that the shorter segment will not create a duplicate value. For a 3 character Business Office Segment, for example, where there are 2 offices defined in the system using segment numbers "AAA" and "AAB", reducing the Business Office Segment to 2 characters would create a duplicate segment number of "AA". In this example, the system would automatically block the interface user from making the change.

Change an Account Segment Used on an Account

In one example in accordance with the present invention, an Account may have been originally set up incorrectly. For instance, an office may be used on an Account with an incorrect region. In this scenario, the interface user may want to change the region for that Account to the correct region and have this change affect all past and future information. By changing the corresponding segment on the Account at 718 (e.g. to the correct region), the General Ledger is not being changed. Rather, just the Account that the General Ledger points to is having its definition changed. The system allows changes to the Natural Segment, and any Business Segment. The system however does not allow changes to the Company Segment because the Company Segment is used as the balancing segment for Balance Sheets, and a change to the Company Segment may cause an imbalance in accounting to occur.

When changing any Business Segment, such as changing the region in the example mentioned, the system will automatically check to make sure that the interface user has not creating a duplicate Account with one that already existed. If the system finds that a duplicate Account is not being created by the change, then the system allows the change. By changing one or more of the segments that the Account points to, this will have an immediate effect on all past and future entries, as the Account Number is effectively created on demand by the system from the segments that are pointed to, e.g., by the GLAccountID.

Typical accounting systems do not allow changes to the Natural Account Segment and therefore, do not allow changes to the account type of an Account (e.g. account type being an Asset, a Liability, an Owner Equity, a Revenue or an Expense). For example, these systems do not allow a Revenue Account to be changed from anything other than a Revenue account.

In at least one embodiment of the present invention, the system allows an interface user to freely change the Natural Account Segment of an Account at any time between any of an Asset, Liability, Owner Equity, Revenue or Expense. Since Revenue and Expense Accounts are Income Statement Accounts, and Asset, Liability, and Owner Equity Accounts are Balance Sheet Accounts, the system allows not only a change in the account type within a Balance Sheet type account or within an Income Sheet type account, but also a change between a Balance Sheet type account and an Income Sheet type account. This is because the system calculates the Current and Retained Earnings on demand by summing all past Revenue and Expense Accounts.

Merging 2 Accounts into 1 Account or Splitting 1 Account into 2 Accounts

In at least one embodiment of the present invention, both merging and splitting Accounts via the system changes the General Ledger. In particular, the GLAccountID used within the General Ledger is changed (unlike renaming an Account or changing the length of an Account Segment or changing an Account Segment) so as to point to a different Account. This activity is extensive within the system and therefore, the system logs the change. When Accounts are merged or split, the GLAccountID is changed throughout the entire system. This means changing the GLAccountID everywhere within the system including the General Ledger, Journals, Invoices, Vouchers, Credit Memos, Debit Memos, Quick AR Checks, Quick AP Checks, AP Checks, AR, Checks, Deposits, and Investments.

Merging 2 Accounts into 1 Account

In at least one embodiment of the present invention, the system allows an interface user to merge 2 or more Accounts into a single Account at 720. The interface user enters into the system a first segment number to replace a second segment number at 732 for the Accounts of interest, and enters a specified criteria at 734 (e.g. specified time period, etc.) for merging the Accounts. The system then merges the Accounts at 736 based on the specified criteria and by replacing the second segment number with the first segment number.

In one example of merging Accounts, during the normal course of business there are multiple Accounts created where it is later decided that these Accounts should have been the same Account. For instance, an accountant creates an Expense Account for rent for an office and also adds in details at the department level by adding in a specific value for a department. Later, it is determined that rent is a type of overhead expense and therefore, the Account should not have details at the department level. If there was more than one department in that office, then changing each Account to use the default department (e.g. underscores for the Business Segment number) would create duplicate Accounts when the specific department segment values are changed.

To further illustrate the above example, assume that the originally created 2 Accounts are as follows:

Rent-MyCompany-MyRegion-MyOffice-MortageDepartment
Rent-MyCompany-MyRegion-MyOffice-MutualFund-Department.

Replacing the department level details with the default department for the corresponding Business Segment for these 2 Accounts, results in the following 2 Accounts:

Rent-MyCompany-MyRegion-MyOffice-DefaultDepartment
Rent-MyCompany-MyRegion-MyOffice-DefaultDepartment.

Clearly, the 2 accounts using the default department have the same Account Number. Here, the system enforces that each Account Number is unique and therefore, the 2 Accounts can be merged together when their corresponding Business Segments are changed.

In another example of merging Accounts, Accounts Receivable accounts are created which includes defined Business Segments including a specific office Business Segment. Accounts Receivable is an Asset type account. By Generally Accepted Accounting Principles (GAAP), Balance Sheet type accounts, which include Assets, Liability, and Owner Equity Accounts, do not use Business Segments. Rather, Balance Sheet type accounts usually just use Natural Account Segments and Company Segments. Accordingly, upon an accounting audit or review it will likely be determined that these Accounts should be cleaned up and merged within the system such that the Accounts Receivable accounts that use a specific Business Segments are merged into an Accounts Receivable account that uses default Business Segments.

In the first example of merging Accounts (e.g. merging because there was no interest in recording rent or otherwise at the department level), the system allows the interface user to leave data from the previous closed years alone, and only merge the account data from a specific point in time, such as the beginning of a fiscal year.

Splitting 1 Account into 2 Accounts

In at least one embodiment of the present invention, the system allows the interface user to split 1 Account into 2 different Accounts at 722. This includes the interface user entering into the system a new segment number to replace an old segment number at 738 of an existing Account, and entering a specified criteria for splitting the Account at 740. The system then converts the old Account to a new Account at 742 based on the specified criteria and by replacing the old segment number with the new segment number. The specified criteria can be the Natural Account Segment, the Company Segment, the one or more Business Segments, a time period, or a combination thereof. If the specified criteria includes the time period, then prior to the time period specified the old Account exists and for the time period specified the new account exists.

In one example of splitting an Account, during the normal course of business the company may decide to restructure the management hierarchy to be better align with changing customer needs. For instance, this may involve moving an office from one region to another region at a specified time, such as the beginning of a fiscal year or the beginning of a quarter. The accounting data entry people may not fully understand the change, and may continue to record business using the older structure. Assume for example, that it takes 2 months before finding the error. In this scenario, the data for the Account that was entered for the past 2 months should be associated with a corrected Account using the correct region while leaving the data for the Account that is older than 2 months within the Account to represent the older management hierarchy at that time. Accordingly, the system allows the Account to be split where a new Account has only the last 2 months of data and the original Account has the older than 2 months of data.

Merging or Splitting Account(s)

Technical Details

Figure 29:
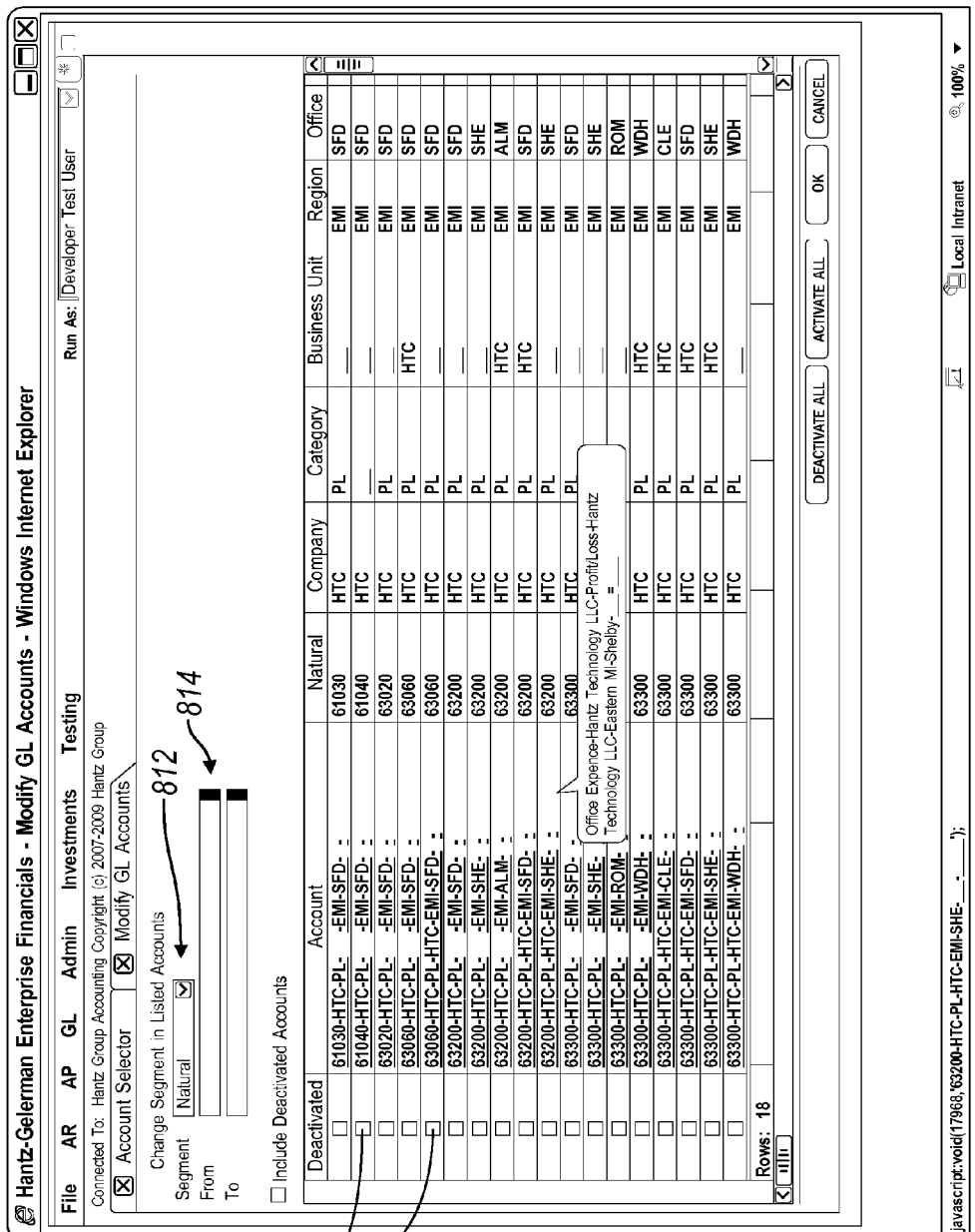
FIG. 29 is an eleventh screen shot of an example of the present invention.

Referring to FIG. 29 at least one embodiment of the present invention is provided. The following steps are preformed for either merging Accounts or splitting an Account:

1. The Account(s) to be changed is/are identified. The system has an Account search screen (screen shot #11 at 800) that allows the interface user to specify account masks using segment masks to identify which Accounts are of interest.
2. After the search, the interface user can further use check boxes at 810 to specifically select Accounts that should be merged or split.
3. The interface user may also specify a date range for merging or splitting Account(s). Only activities with GL Dates between the specified date range are affected.
4. The interface user then specifies which Business or Natural Segments at 812 are to be changed. The system does not allow changes to the Company Segments as this would cause the system to become out of balance. The interface user chooses specific "From" and "To" Business Segment values at 814.
5. For the Accounts that are to be changed and for the date range specified, the system then searches through every table such as the General Ledger, Journals, Invoices, AR Checks, Deposits, Vouchers, AP Checks, Investments, Credit Memos, Debit Memos. When an Account is found that is to be changed, the system changes the Account pointed to within that table to point to the new Account desired. That is, the GLAccountID is changed in those tables.

Vendor Account Maintenance

Overview

Through the normal course of business, it may be discovered that a certain Vendor Account or Vendor Accounts were used incorrectly and preferably should be cleaned up. In at least one embodiment of the present invention, the system is used to clean up or maintain the Vendor Accounts. The system uses Vendor Accounts for issuing checks that pay vouchers to pay Vendors. The system allows the Vendor Accounts to be changed, split or merged preferably to keep the data clean and pertinent by using the correct Vendor Accounts when recording activity and issuing checks.

In at least one embodiment, the system allows an interface user to change Vendors by an AP check or checks. An AP check may pay multiple vouchers. Each voucher paid by an AP check uses the same Vendor as the check that pays the voucher. If for example a mistake is made for a Vendor used on 1 or more checks, the system allows the interface user to make a change to the Vendor such that the Vendor changes on the check and any voucher paid by the check. In some cases, the vouchers that are being changed have been paid by more than 1 check. In this situation, the system preferably changes the corresponding checks at the same time to prevent the possibility of a voucher being paid by multiple checks to different vendors.

The system can split Vendors because the search for checks in the system can include other criteria based on any Account Segment. For example, if there are two distinct Vendors but both are identified in the system as ABC Manufacturing, and there is one office (e.g. AA) in the company paying one of the Vendors and another office (e.g. BB) in the company paying the other Vendor, then when the mistake is discovered a correction could be made to correct the mistake in the past. The system allows an interface user to search for checks that paid vouchers where the voucher detail lines contain an Account using a specific Business Segment. That is, the interface user could search for checks paid to the Vendor that pay vouchers having a specific Business Office Segment (e.g. AA), and specify that those checks change the Vendor (e.g. ABC Manufacturing) to some other Vendor (e.g. DEF Manufacturing). The system would change the corresponding checks and the vouchers paid by the checks. If the check or voucher being paid was previously posted to the General Ledger, the Vendor Attribute at the General Ledger will also be changed.

In at least one embodiment of the present invention, the system also allows an interface user to merge Vendors by searching for checks paid to a Vendor. The Vendor on those checks may then be changed to another existing Vendor.

Spitting 1 Vendor into 2 Vendors

Figure 30:
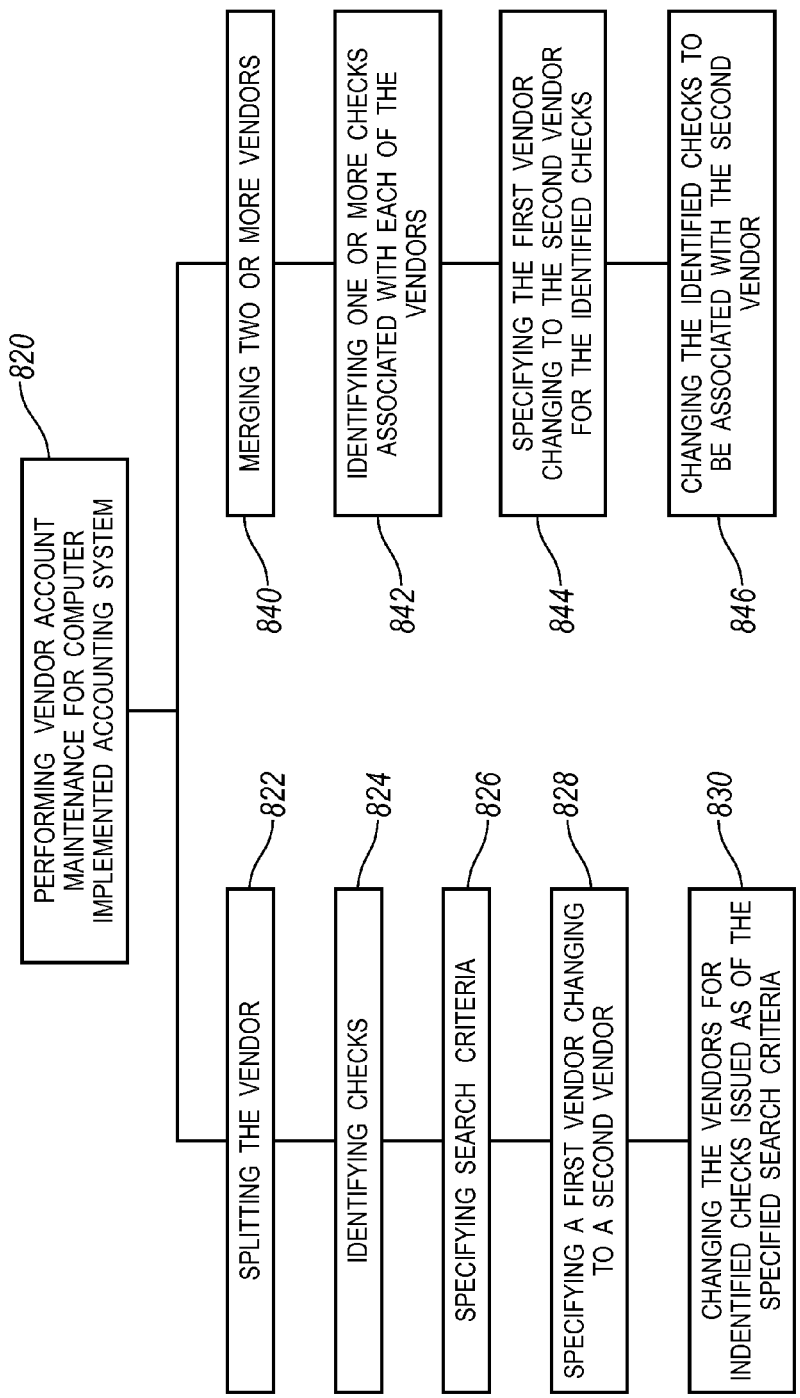
FIG. 30 is an operational flow diagram of a method of performing vendor account maintenance for a computer implemented accounting system in accordance with an example of the present invention.

Referring to FIG. 30, at least one embodiment of a method of performing Vendor Account maintenance on one or more Vendors within a single or multi-company accounting system at 820 is provided. In one example, the Vendor within the system is associated with a particular address of a business entity.

The method includes splitting a first Vendor into first and second Vendors at 822 such that, for example, the first Vendor is one business entity with an address different than the address of the business entity of the second Vendor. The first and second Vendors may correspond to the same business entity with different addresses or alternatively, they may correspond to different business entities with different addresses.

The method further includes the interface user using the system to identify checks at 824 that pay the vouchers associated with the first Vendor defining identified checks. In particular, the interface user uses the system to search for the checks that pay vouchers having voucher detail lines containing an Account with a specific Business Segment of the company. The interface user also specifies search criteria at 826 for changing the first Vendor to the second Vendor at 828 associated with the identified checks. Non-limiting examples of the search criteria are a specified bank account, a specified amount of money, a specified check number, a specified description, a specified company, a specified interface user who entered data into the system, a specified check type, a specified subaccount, or a specified date range.

The system then changes the first Vendor to the second Vendor at 830 for the identified checks issued as of the specified search criteria, and for the vouchers associated with the identified checks.

Merging 2 or More Vendors into 1 Vendor

At least one other embodiment of a method of performing Vendor Account maintenance on one or more Vendors within a single or multi-company accounting system at 820 is provided. The method includes merging two or more Vendors at 840 including first and second Vendors into a single Vendor within the system as of a specified search criteria based on one or more checks that pay one or more vouchers associated with each of the two or more Vendors. In one example, each of the Vendors corresponds is associated with a particular address of a business entity. Moreover, non-limiting examples of the specified search criteria are a specified bank account, a specified amount of money, a specified check number, a specified description, a specified company, a specified interface user who entered data into the system, a specified check type, a specified subaccount, or a specified date range.

The method includes the interface user using the system to identify one or more checks at 842 that pay one or more vouchers associated with the first Vendor to define first identified checks. The one or more checks that pay the one or more vouchers associated with the second Vendor are also identified to define second identified checks. In one example, the system searches for the checks that pay the vouchers having voucher detail lines containing an Account with a specific Business Segment in order to associate the checks with either the first or second Vendor.

The method further includes the interface user using the system to specify the first Vendor changing to the second Vendor for the first identified checks at 844. The system then changes the first Vendor to the second Vendor at 846 for the first identified checks so that the first and second identified checks are associated with the second Vendor. The system can also change the vouchers associated with the first identified checks to be associated with the second Vendor.

In one embodiment, if the first identified checks or the associated vouchers are posted to the General Ledger, then a Vendor Attribute will change to correspond to the second Vendor instead of the first Vendor.

Example of Merging Vendors

Figure 31:
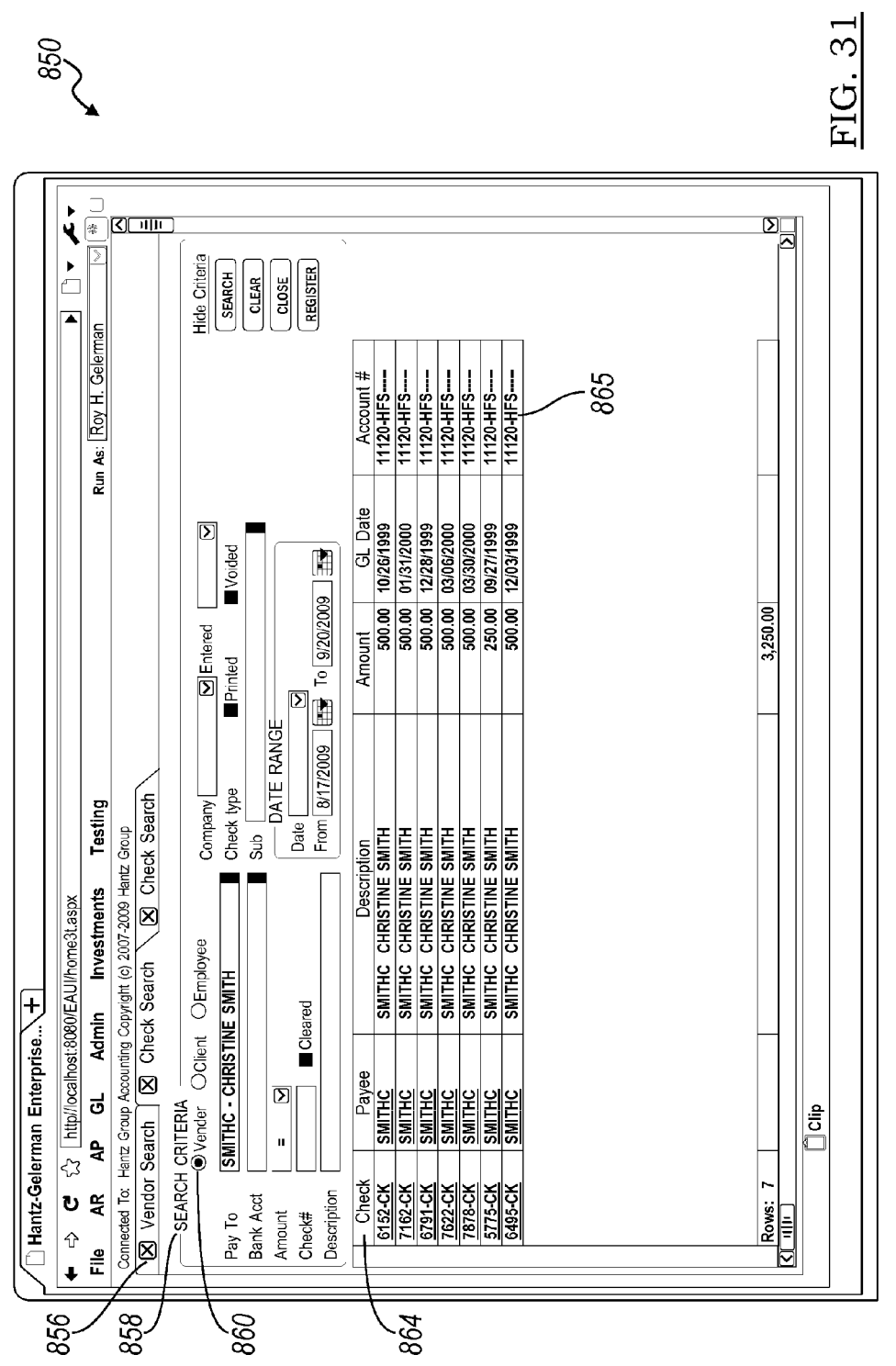
Figure 32:
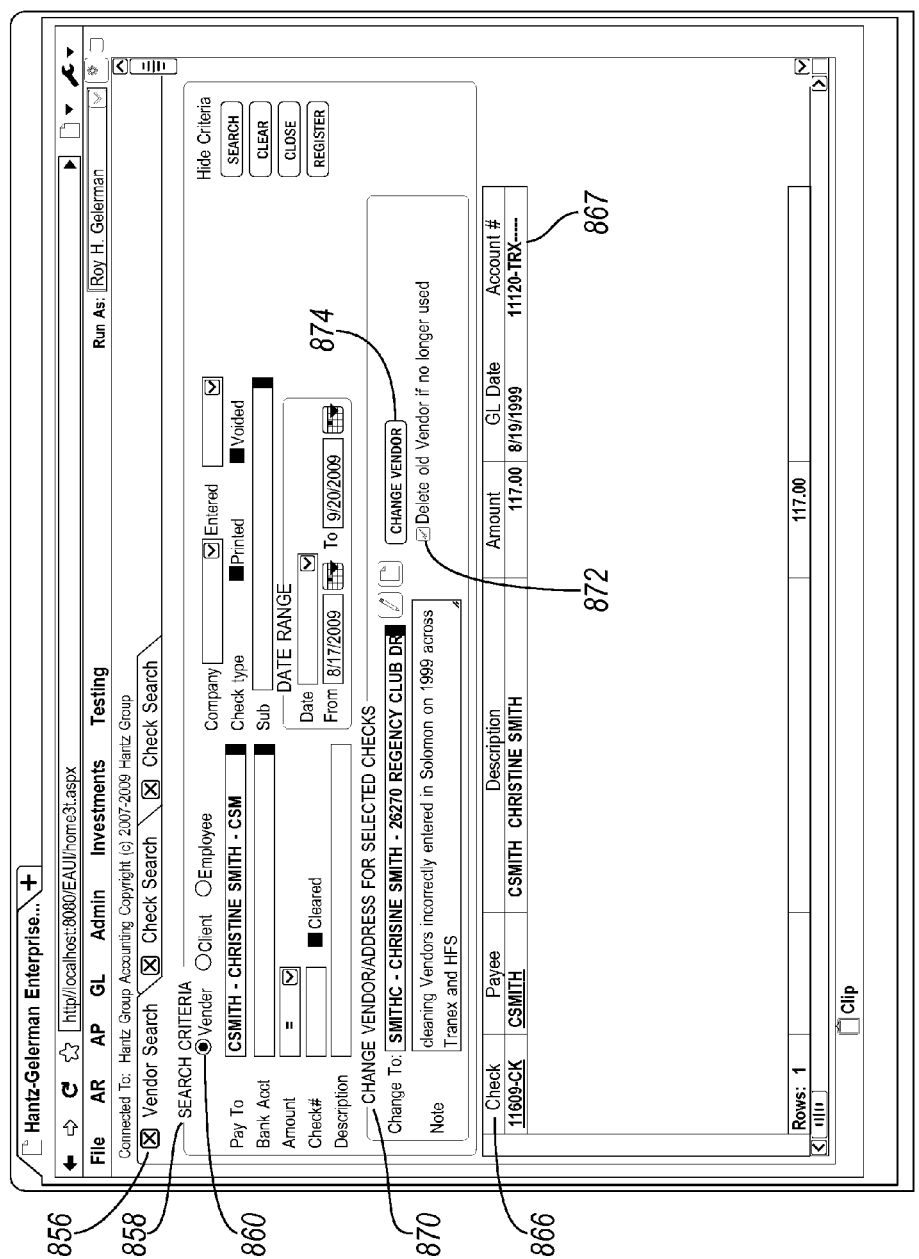
FIG. 32 is a thirteenth screen shot of another example of the present invention.
Figure 33:
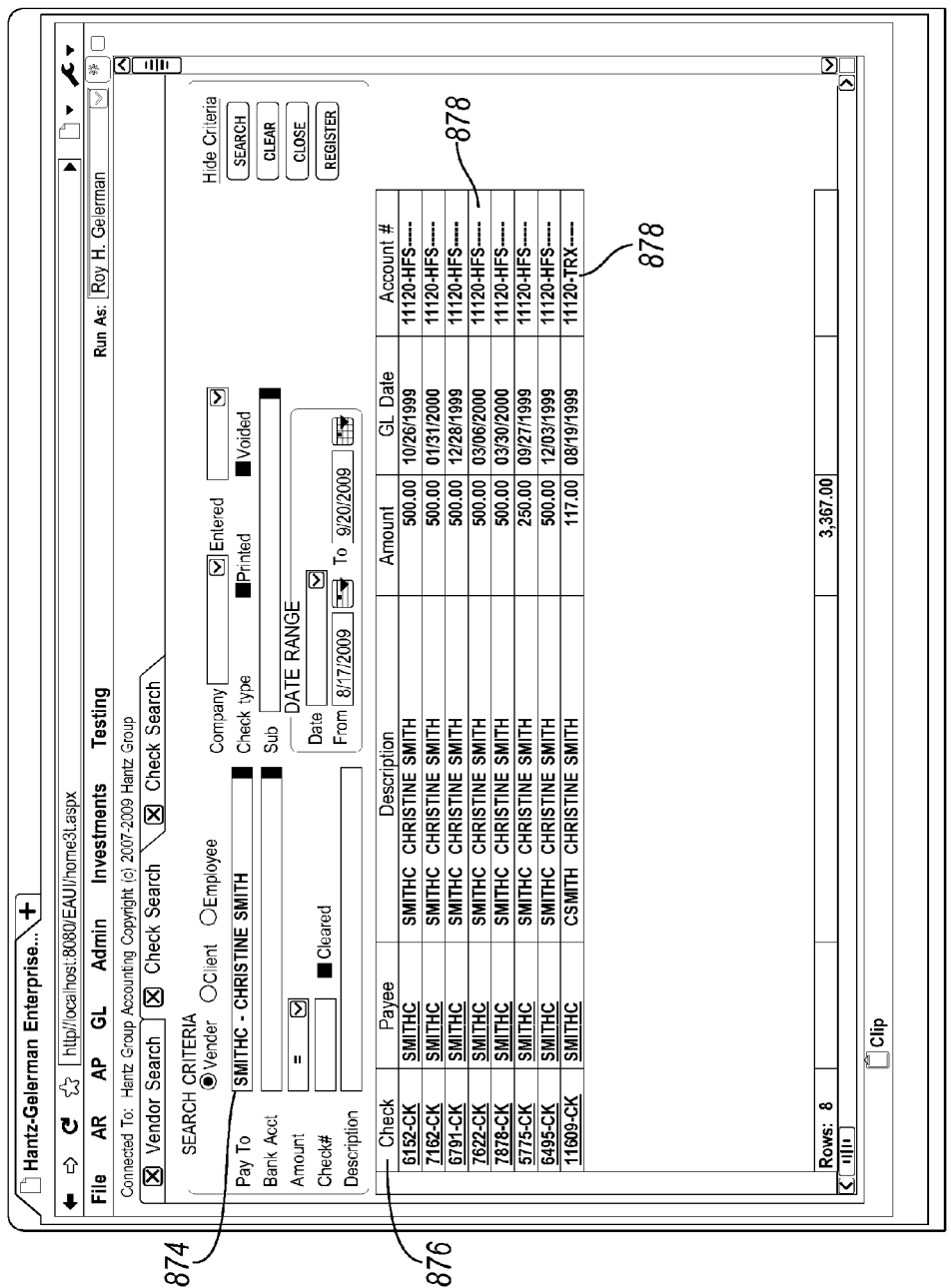
FIG. 33 is a fourteenth screen shot of yet another example of the present invention.

Referring to FIGS. 31-33, an example of merging 2 Vendors into a single Vendor to perform Vendor Account maintenance within the system is provided. In particular, FIG. 31 is an example of a system screen shot (screen shot #12 at 850) of a Vendor Merger Check Search Screen for Vendor SMITHC—CHRISTINE SMITH; FIG. 32 is an example of a system screen shot (screen shot #13 at 852) of a Vendor Split Merge Screen Vendor CSMITH—CHRISTINE SMITH; and FIG. 33 is an example of a system screen shot (screen shot #14 at 854) after Vendor CSMITH—CHRISTINE SMITH is merged with Vendor SMITHC—CHRISTINE SMITH.

Initially, an interface user conducts an AP Vendor search at 856 in the system for Christine Smith with search criteria at 858 of "Vender" at 860. Results of the search indicate that two Vendors are being used by the system, one for SMITHC—CHRISTINE SMITH where checks at 864 associated with Account Segment HFS (e.g. Financial Services) at 865 have been issued, and the other for CSMITH—CHRISTINE SMITH where checks at 866 associated with Account Segment TRX (e.g. Mortgage Services) at 867 have been issued. Upon further investigation, assume it is determined that both CSMITH—CHRISTINE SMITH and SMITHC—CHRISTINE SMITH are the same Vendor and that the system should be cleaned up to reflect them as a single Vendor.

Referring to FIG. 32, the interface user selects the Vendor CSMITH—CHRISTINE SMITH changing to the Vendor SMITHC—CHRISTINE SMITH at 870, and then selects "Delete old Vendor if no longer used" at 872 and "Change Vendor" at 874. As illustrated in FIG. 33, this results in merging the Vendor CSMITH—CHRISTINE SMITH with the Vendor SMITHC—CHRISTINE SMITH into one Vendor which is identified in the system as SMITHC—CHRISTINE SMITH at 874. Notably, all of the checks at 876 that were formally for both Vendors CSMITH—CHRISTINE SMITH and SMITHC—CHRISTINE SMITH are now associated with SMITHC—CHRISTINE SMITH while maintaining the proper Account Segments at 878 that issued the checks to each of the Vendors, thereby merging the 2 Vendors into 1 Vendor within the system.

The Computer Arrangement for Operation of the Accounting System

Figure 10:
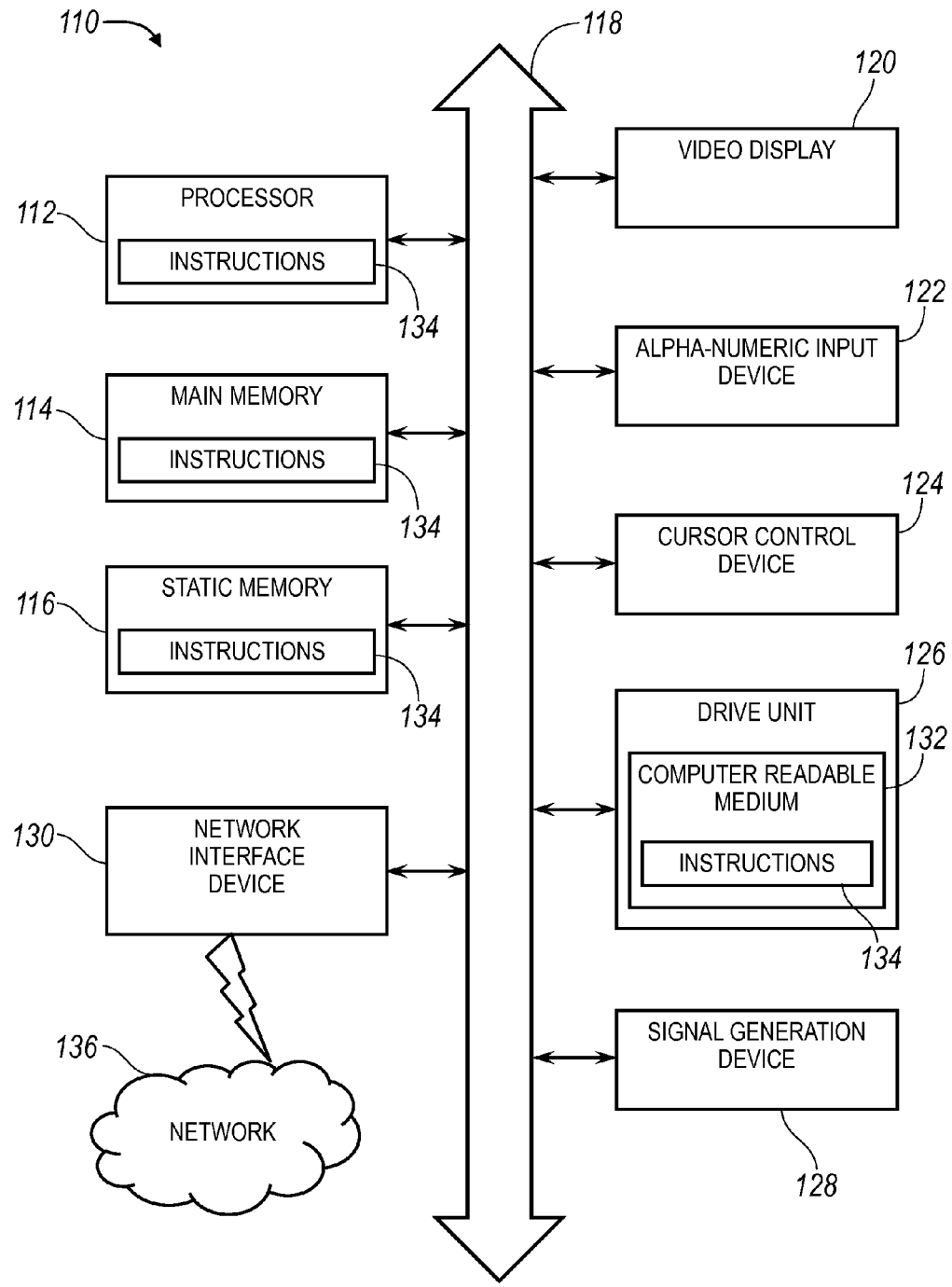
FIG. 10 is an illustrative embodiment of a computer arrangement for implementing various embodiments of the accounting method and system in accordance with the present invention.

Referring to FIG. 10, an illustrative embodiment of a general computer arrangement is shown and is designated 110. The computer arrangement 110 can include a set of instructions that can be executed to cause the computer arrangement 110 to perform any one or more of the system methods or computer based functions disclosed herein. The computer arrangement 110 may operate as a standalone device or may be connected, e.g., using a network, to other computer arrangements or peripheral devices.

In a networked deployment, the computer arrangement may operate in the capacity of a server or as a client user computer in a server-client user network environment, or as a peer computer arrangement in a peer-to-peer (or distributed) network environment. The computer arrangement 110 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer arrangement 110 can be implemented using electronic devices that provide voice, video or data communication. Further, while a single computer arrangement 110 is illustrated, the term "arrangement" shall also be taken to include any collection of systems or sub-systems that individually or jointly execute a set, or multiple sets, of instructions to perform one or more computer functions.

As illustrated in FIG. 10, the computer arrangement 110 may include a processor 112, e.g., a central processing unit (CPU), a graphics processing unit (GPU), or both. Moreover, the computer arrangement 110 can include a main memory 114 and a static memory 116 that can communicate with each other via a bus 118. As shown, the computer arrangement 110 may further include a video display unit 120, such as a liquid crystal display (LCD), an organic light emitting diode (OLED), a flat panel display, a solid state display, or a cathode ray tube (CRT). Additionally, the computer arrangement 110 may include an input device 122, such as a keyboard, and a cursor control device 124, such as a mouse. The computer arrangement 110 can also include a disk drive unit 126, a signal generation device 128, such as a speaker or remote control, and a network interface device 130.

In a particular embodiment, as depicted in FIG. 10, the disk drive unit 126 may include a computer-readable medium 132 in which one or more sets of instructions 134, e.g., embodiments of the Multi-Company accounting system and related methods of the present invention embedded in software, can be embedded. Further, the instructions 134 may embody one or more of the methods or logic as described herein. In a particular embodiment, the instructions 134 may reside completely, or at least partially, within the main memory 114, the static memory 116, and/or within the processor 112 during execution by the computer arrangement 110. The main memory 114 and the processor 82 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer arrangements. One or more embodiments described herein may implement functions using two or more specific interconnected hardware modules or devices with related control and data signals that can be communicated between and through the modules, or as portions of an application-specific integrated circuit. Accordingly, the present arrangement encompasses software, firmware, and hardware implementations.

In accordance with various embodiments of the present disclosure, the methods described herein may be implemented by software programs executable by the computer arrangement 110. Further, in an exemplary, non-limited embodiment, implementations can include distributed processing, component/object distributed processing, and parallel processing. Alternatively, virtual computer arrangement processing can be constructed to implement one or more of the methods or functionality as described herein.

The present disclosure contemplates a computer-readable medium that includes instructions 134 or receives and executes instructions 134 responsive to a propagated signal so that a device connected to a network 136 can communicate voice, video or data over the network 136. Further, the instructions 134 may be transmitted or received over the network 136 via the network interface device 130.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer arrangement to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A computer implemented method for account number maintenance used within a single or multi-company accounting system that operates on a computer arrangement and which is accessible by one or more persons defining an interface user, the method comprising:
at a processor, performing the account number maintenance on at least one of a plurality of accounts within the single or multi-company accounting system, each of the accounts having a plurality of account segments defining the account including a natural account segment, a company segment, and one or more business segments, the natural account segment defining a specific type of one of an asset, a liability, an owner equity, a revenue and an expense, the company segment associated with one of one or more companies associated with the accounting system, and the one or more business segments each having a definable category for tracking money within the accounting system, wherein performing the account number maintenance comprises:
  i) the interface user entering into the single or multi-company accounting system via the computer arrangement a specified criteria for splitting one or more of the accounts, wherein the specified criteria specifies:
     segments used in the one or more of the accounts comprising the natural account segment, the company segment, the one or more business segments, or a combination thereof; and
     optionally a time period that defines a specific number of days;
  ii) identifying the one or more of the accounts to be split via a search using the specified criteria; and
  iii) splitting the one or more of the accounts each into two different accounts that includes an old account and a new account, wherein the step of splitting one or more of the accounts comprises:
     the interface user entering into the single or multi-company accounting system via the computer arrangement a new segment value to replace an old segment value of the natural account segment or one of the business segments;
     the single or multi-company accounting system converting the old account to a new account based on the specified criteria including replacing the old segment value for the old account with the new segment value of the natural account segment or the one of the business segments to define the new account, wherein if the specified criteria includes the time period, then no change is made to a General Ledger before or after the time period and splitting of each of the one or more of the accounts is done in the General Ledger only for activity with a General Ledger date within the time period; and
     the single or multi-company accounting system automatically changing a GL Account ID within the General Ledger to point to the new account with the new account segment instead of the old account based on the specified criteria.

2. The method according to claim 1 wherein the step of splitting one of the accounts into two different accounts includes:
the interface user entering into the single or multi-company accounting system via the computer arrangement the new segment value to replace the old segment value of the natural account segment; and
the single or multi-company accounting system converting the old account to the new account based on the specified criteria including replacing the old segment value for the old account with the new segment value of the natural account segment to define the new account.

3. The method according to claim 2 wherein the single or multi-company accounting system automatically creates the new account if the new account did not already exist.

4. The method according to claim 2 wherein one of the business segments can be specified to merge at least one additional account into the new account.

5. The method according to claim 1 wherein the step of splitting one of the accounts into two different accounts includes:
the interface user entering into the single or multi-company accounting system via the computer arrangement the new segment value to replace the old segment value of a first business segment; and the single or multi-company accounting system converting the old account to the new account based on the specified criteria including replacing the old segment value for the old account with the new segment value of the first business segment to define the new account.

6. The method according to claim 5 wherein the single or multi-company accounting system automatically creates the new account if the new account did not already exist.

7. The method according to claim 5 wherein a second business segment can be specified to merge at least one additional account into the new account.

8. A single or multi-company accounting system for providing a computer implemented method for account number maintenance and which is accessible by one or more persons defining an interface user, the system comprising:
   a computer arrangement operative to:
      perform the account number maintenance on at least one of a plurality of accounts within the single or multi-company accounting system, each of the accounts having a plurality of account segments defining the account including a natural account segment, a company segment, and one or more business segments, the natural account segment defining a specific type of one of an asset, a liability, an owner equity, a revenue and an expense, the company segment associated with one of one or more companies associated with the accounting system, and the one or more business segments each having a definable category for tracking money within the accounting system, wherein performing the account number maintenance comprises:
         i) the interface user entering into the single or multi-company accounting system via the computer arrangement a specified criteria for splitting one or more of the accounts, wherein the specified criteria specifies:
            segments used in the one or more of the accounts comprising the natural account segment, the company segment, the one or more business segments, or a combination thereof; and
            optionally a time period that defines a specific number of days;
         ii) identifying the one or more of the accounts to be split via a search using the specified criteria; and
         iii) splitting the one or more of the accounts each into two different accounts that includes an old account and a new account, wherein the step of splitting one or more of the accounts comprises:
            the interface user entering into the single or multi-company accounting system via the computer arrangement a new segment value to replace an old segment value of the natural account segment or one of the business segments;
            the single or multi-company accounting system converting the old account to a new account based on the specified criteria including replacing the old segment value for the old account with the new segment value of the natural account segment or the one of the business segments to define the new account, wherein if the specified criteria includes the time period, then no change is made to a General Ledger before or after the time period and splitting of each of the one or more of the accounts is done in the General Ledger only for activity with a General Ledger date within the time period; and
            the single or multi-company accounting system automatically changing a GL Account ID within the General Ledger to point to the new account with the new account segment instead of the old account based on the specified criteria.

9. A non-transitory computer-readable storage medium comprising a set of instructions for providing a computer implemented method for account number maintenance used within a single or multi-company accounting system which is accessible by one or more persons defining an interface user, the set of instructions to direct a processor to perform acts of:
   performing the account number maintenance on at least one of a plurality of accounts within the single or multi-company accounting system, each of the accounts having a plurality of account segments defining the account including a natural account segment, a company segment, and one or more business segments, the natural account segment defining a specific type of one of an asset, a liability, an owner equity, a revenue and an expense, the company segment associated with one of one or more companies associated with the accounting system, and the one or more business segments each having a definable category for tracking money within the accounting system, wherein performing the account number maintenance comprises:
      i) the interface user entering into the single or multi-company accounting system via the computer arrangement a specified criteria for splitting one or more of the accounts, wherein the specified criteria specifies:
         segments used in the one or more of the accounts comprising the natural account segment, the company segment, the one or more business segments, or a combination thereof; and
         optionally a time period that defines a specific number of days;
      ii) identifying the one or more of the accounts to be split via a search using the specified criteria; and
      iii) splitting the one or more of the accounts each into two different accounts that includes an old account and a new account, wherein the step of splitting one or more of the accounts comprises:
         the interface user entering into the single or multi-company accounting system via the computer arrangement a new segment value to replace an old segment value of the natural account segment or one of the business segments;
         the single or multi-company accounting system converting the old account to a new account based on the specified criteria including replacing the old segment value for the old account with the new segment value of the natural account segment or the one of the business segments to define the new account, wherein if the specified criteria includes the time period, then no change is made to a General Ledger before or after the time period and splitting of each of the one or more of the accounts is done in the General Ledger only for activity with a General Ledger date within the time period; and
         the single or multi-company accounting system automatically changing a GL Account ID within the General Ledger to point to the new account with the new account segment instead of the old account based on the specified criteria.

* * * * *